United States Patent
Brant et al.

(10) Patent No.: US 8,283,428 B2
(45) Date of Patent: Oct. 9, 2012

(54) POLYMACROMONOMER AND PROCESS FOR PRODUCTION THEREOF

(75) Inventors: Patrick Brant, Seabrook, TX (US); Andrew G. Narvaez, Jr., League City, TX (US); Donna J. Crowther, Seabrook, TX (US)

(73) Assignee: ExxonMobil Chemical Patents Inc., Houston, TX (US)

( * ) Notice: Subject to any disclaimer, the term of this patent is extended or adjusted under 35 U.S.C. 154(b) by 491 days.

(21) Appl. No.: 12/488,066

(22) Filed: Jun. 19, 2009

(65) Prior Publication Data

US 2009/0318640 A1 Dec. 24, 2009

Related U.S. Application Data

(63) Continuation-in-part of application No. 12/143,663, filed on Jun. 20, 2008.

(51) Int. Cl.
C08F 4/72 (2006.01)
C08F 210/06 (2006.01)
C08F 210/16 (2006.01)
C08F 10/06 (2006.01)

(52) U.S. Cl. ........ 526/170; 526/172; 526/160; 526/161; 526/943; 526/941; 526/348; 526/351; 526/348.2; 526/348.3; 526/348.5; 526/348.6

(58) Field of Classification Search ................. 526/348, 526/160, 170, 351

See application file for complete search history.

(56) References Cited

U.S. PATENT DOCUMENTS

| | | |
|---|---|---|
| 3,235,484 A | 2/1966 | Colfer |
| 3,382,291 A | 5/1968 | Brennan |
| 3,742,082 A | 6/1973 | Brennan |
| 3,769,363 A | 10/1973 | Brennan |
| 3,780,128 A | 12/1973 | Shubkin |
| 3,876,720 A | 4/1975 | Heilman et al. |
| 4,069,023 A | 1/1978 | Brois et al. |
| 4,172,855 A | 10/1979 | Shubkin |
| 4,197,398 A | 4/1980 | Floyd et al. |
| 4,239,930 A | 12/1980 | Allphin et al. |

(Continued)

FOREIGN PATENT DOCUMENTS

EP 0 283 958 9/1988

(Continued)

OTHER PUBLICATIONS

Shiono, T.; Moriki, Y.; Ikeda, T. Macromol. Chem. Phys., 1997, 198, 3229-3237.*

(Continued)

*Primary Examiner* — Rip A. Lee
(74) *Attorney, Agent, or Firm* — Catherine L. Bell

(57) ABSTRACT

This invention relates to a polymacromonomer comprising at least one macromonomer and from 0 to 20 wt % of a $C_2$ to $C_{12}$ comonomer, wherein the macromonomer has vinyl termination of at least 70%, and wherein the polymacromonomer has: a) a g value of less than 0.6, b) an Mw of greater than 30,000 g/mol, c) an Mn of greater than 20,000 g/mol, d) a branching index $(g')_{vis}$ of less than 0.5, e) less than 25% vinyl terminations, f) at least 70 wt % macromonomer, based upon the weight of the polymacromonomer, g) from 0 to 20 wt % aromatic containing monomer, based upon the weight of the polymacromonomer and h) optionally, a melting point of 50° C. or more. This invention also relates to processes to make such polymacromonomers.

52 Claims, 3 Drawing Sheets

U.S. PATENT DOCUMENTS

| | | | |
|---|---|---|---|
| 4,367,352 A | 1/1983 | Watts, Jr. et al. | |
| 4,413,156 A | 11/1983 | Watts, Jr. et al. | |
| 4,568,663 A | 2/1986 | Mauldin | |
| 4,619,756 A | 10/1986 | Dickakian | |
| 4,619,758 A | 10/1986 | Pratt et al. | |
| 4,704,491 A | 11/1987 | Tsutsui et al. | |
| 4,814,540 A | 3/1989 | Watanabe et al. | |
| 4,827,064 A | 5/1989 | Wu | |
| 4,827,073 A | 5/1989 | Wu | |
| 4,910,355 A | 3/1990 | Shubkin et al. | |
| 4,914,254 A | 4/1990 | Pelrine | |
| 4,926,004 A | 5/1990 | Pelrine et al. | |
| 4,956,122 A | 9/1990 | Watts et al. | |
| 4,967,032 A | 10/1990 | Ho | |
| 4,973,414 A | 11/1990 | Nerger et al. | |
| 4,988,764 A | 1/1991 | Nishio et al. | |
| 4,999,403 A | 3/1991 | Datta et al. | |
| 5,068,487 A | 11/1991 | Theriot | |
| 5,087,788 A | 2/1992 | Wu | |
| 5,145,819 A | 9/1992 | Winter et al. | |
| 5,211,834 A | 5/1993 | Forester | |
| 5,229,022 A | 7/1993 | Song et al. | |
| 5,241,025 A | 8/1993 | Hlatky et al. | |
| 5,252,677 A | 10/1993 | Tomita et al. | |
| 5,266,186 A | 11/1993 | Kaplan | |
| 5,348,982 A | 9/1994 | Herbolzheimer et al. | |
| 5,350,817 A | 9/1994 | Winter et al. | |
| 5,382,634 A * | 1/1995 | Koyama et al. | 525/286 |
| 5,439,607 A | 8/1995 | Patil | |
| 5,504,171 A | 4/1996 | Etherton et al. | |
| 5,514,761 A | 5/1996 | Etherton et al. | |
| 5,545,674 A | 8/1996 | Behrmann et al. | |
| 5,616,153 A | 4/1997 | Mike et al. | |
| 5,670,595 A | 9/1997 | Meka et al. | |
| 5,688,887 A | 11/1997 | Bagheri et al. | |
| 5,696,045 A | 12/1997 | Winter et al. | |
| 5,741,946 A | 4/1998 | Wei | |
| 5,756,428 A | 5/1998 | Emert et al. | |
| 5,756,609 A | 5/1998 | Cohen | |
| 5,856,256 A | 1/1999 | Marks et al. | |
| 5,874,661 A | 2/1999 | Verrelst et al. | |
| 5,998,547 A | 12/1999 | Hohner | |
| 6,022,929 A | 2/2000 | Chen et al. | |
| 6,043,401 A | 3/2000 | Bagheri et al. | |
| 6,049,017 A | 4/2000 | Vora et al. | |
| 6,114,457 A | 9/2000 | Markel et al. | |
| 6,114,477 A | 9/2000 | Merrill et al. | |
| 6,117,962 A * | 9/2000 | Weng et al. | 526/351 |
| 6,133,209 A | 10/2000 | Rath et al. | |
| 6,143,846 A | 11/2000 | Herrmann et al. | |
| 6,143,942 A | 11/2000 | Verrelst et al. | |
| 6,147,173 A | 11/2000 | Holtcamp | |
| 6,147,180 A | 11/2000 | Markel et al. | |
| 6,184,327 B1 | 2/2001 | Weng et al. | |
| 6,197,910 B1 * | 3/2001 | Weng et al. | 526/351 |
| 6,207,606 B1 | 3/2001 | Lue et al. | |
| 6,211,108 B1 * | 4/2001 | Bishop et al. | 502/152 |
| 6,225,432 B1 | 5/2001 | Weng et al. | |
| 6,248,832 B1 | 6/2001 | Peacock | |
| 6,258,903 B1 | 7/2001 | Mawson et al. | |
| 6,262,202 B1 | 7/2001 | Walzer, Jr. et al. | |
| 6,271,323 B1 | 8/2001 | Loveday et al. | |
| 6,291,695 B1 | 9/2001 | Marks et al. | |
| 6,297,301 B1 | 10/2001 | Erderly et al. | |
| 6,323,284 B1 | 11/2001 | Peacock | |
| 6,342,574 B1 | 1/2002 | Weng et al. | |
| 6,407,189 B1 | 6/2002 | Herrmann | |
| 6,414,090 B2 | 7/2002 | Minami et al. | |
| 6,414,091 B2 | 7/2002 | Moritomi et al. | |
| 6,423,793 B1 | 7/2002 | Weng et al. | |
| 6,444,773 B1 * | 9/2002 | Markel | 526/348 |
| 6,476,167 B2 | 11/2002 | Peters | |
| 6,548,724 B2 | 4/2003 | Bagheri et al. | |
| 6,555,635 B2 * | 4/2003 | Markel | 526/165 |
| 6,569,965 B2 | 5/2003 | Markel et al. | |
| 6,573,350 B1 | 6/2003 | Markel et al. | |
| 6,576,306 B2 | 6/2003 | Mehta et al. | |
| 6,635,597 B1 | 10/2003 | Marks et al. | |
| 6,646,081 B2 | 11/2003 | Godschalx et al. | |
| 6,660,809 B1 * | 12/2003 | Weng et al. | 525/245 |
| 6,703,457 B2 | 3/2004 | Van Baar et al. | |
| 6,706,828 B2 | 3/2004 | DiMaio | |
| 6,713,438 B1 | 3/2004 | Baillargeon et al. | |
| 6,750,307 B2 | 6/2004 | Weng et al. | |
| 6,774,191 B2 | 8/2004 | Weng et al. | |
| 6,780,936 B1 | 8/2004 | Agarwal et al. | |
| 6,809,168 B2 | 10/2004 | Agarwal et al. | |
| 6,884,914 B2 | 4/2005 | Mathys et al. | |
| 6,897,261 B1 * | 5/2005 | Machida et al. | 525/242 |
| 6,927,265 B2 | 8/2005 | Kaspar et al. | |
| 6,977,287 B2 | 12/2005 | Agarwal et al. | |
| 7,005,491 B2 | 2/2006 | Weng et al. | |
| 7,101,936 B2 | 9/2006 | Weng et al. | |
| 7,126,031 B2 | 10/2006 | Boussie et al. | |
| 7,183,359 B2 | 2/2007 | Hanna et al. | |
| 7,223,822 B2 * | 5/2007 | Abhari et al. | 526/65 |
| 7,256,240 B1 | 8/2007 | Jiang | |
| 7,294,681 B2 * | 11/2007 | Jiang et al. | 526/348.2 |
| 7,297,653 B2 | 11/2007 | Rodriguez | |
| 7,297,806 B2 | 11/2007 | Brookhart, III et al. | |
| 7,339,018 B2 | 3/2008 | Arjunan | |
| 7,524,910 B2 * | 4/2009 | Jiang et al. | 526/348 |
| 7,541,402 B2 | 6/2009 | Abhari et al. | |
| 7,550,528 B2 | 6/2009 | Abhari et al. | |
| 7,700,707 B2 | 4/2010 | Abhari et al. | |
| 2001/0007896 A1 | 7/2001 | Agarwal et al. | |
| 2001/0053837 A1 | 12/2001 | Agarwal et al. | |
| 2002/0013440 A1 | 1/2002 | Agarwal et al. | |
| 2002/0137978 A1 | 9/2002 | Grubbs et al. | |
| 2003/0055184 A1 | 3/2003 | Song et al. | |
| 2003/0161752 A1 | 8/2003 | Luk et al. | |
| 2004/0127614 A1 | 7/2004 | Jiang et al. | |
| 2004/0127654 A1 | 7/2004 | Brant et al. | |
| 2004/0138392 A1 | 7/2004 | Jiang et al. | |
| 2004/0220320 A1 | 11/2004 | Abhari et al. | |
| 2004/0220336 A1 | 11/2004 | Abhari et al. | |
| 2004/0249046 A1 | 12/2004 | Abhari et al. | |
| 2005/0159299 A1 | 7/2005 | Rodriguez et al. | |
| 2005/0261440 A1 | 11/2005 | Dickakian et al. | |
| 2006/0149008 A1 * | 7/2006 | Razavi | 526/160 |
| 2006/0199873 A1 | 9/2006 | Mehta et al. | |
| 2006/0293453 A1 | 12/2006 | Jiang et al. | |
| 2006/0293455 A1 | 12/2006 | Jiang et al. | |
| 2006/0293460 A1 | 12/2006 | Jacob et al. | |
| 2006/0293461 A1 | 12/2006 | Jiang et al. | |
| 2006/0293462 A1 | 12/2006 | Jacob et al. | |
| 2007/0129497 A1 | 6/2007 | Jiang et al. | |
| 2007/0265178 A1 | 11/2007 | Patil et al. | |
| 2007/0282073 A1 | 12/2007 | Weng et al. | |
| 2007/0284787 A1 | 12/2007 | Weng et al. | |
| 2007/0293640 A1 | 12/2007 | Jiang et al. | |
| 2008/0177121 A1 | 7/2008 | Wu et al. | |
| 2009/0105423 A1 | 4/2009 | Pawlow et al. | |
| 2009/0247441 A1 | 10/2009 | Baum | |
| 2009/0318644 A1 | 12/2009 | Brant et al. | |
| 2009/0318647 A1 | 12/2009 | Hagadorn et al. | |

FOREIGN PATENT DOCUMENTS

| | | |
|---|---|---|
| EP | 283 958 A2 * | 9/1988 |
| EP | 0 485 822 | 5/1992 |
| EP | 0 485 823 | 5/1992 |
| EP | 0 604 917 | 7/1994 |
| EP | 0 613 873 | 7/1994 |
| EP | 0 619 325 | 10/1994 |
| EP | 0 767 182 | 4/1997 |
| EP | 0719802 B1 | 5/2000 |
| EP | 1 361 232 | 11/2003 |
| GB | 1 310 847 | 3/1973 |
| JP | 05-320260 A * | 3/1993 |
| JP | 1993/320260 | 3/1993 |
| JP | 2000/038418 | 2/2000 |
| JP | 2000-38418 A * | 2/2000 |
| JP | 2000/080134 | 3/2000 |
| JP | 2000-80134 A * | 3/2000 |
| JP | 2005/009158 | 1/2005 |
| JP | 2005/139284 | 6/2005 |
| JP | 2005-336092 | 12/2005 |

| | | |
|---|---|---|
| JP | 2006/002057 | 1/2006 |
| JP | 2006-02057 A * | 1/2006 |
| JP | 2009/299045 | 12/2009 |
| WO | WO 93/12151 | 6/1993 |
| WO | WO 93/21242 | 10/1993 |
| WO | WO 95/27717 | 10/1995 |
| WO | WO 96/23751 | 8/1996 |
| WO | WO 97/09296 | 3/1997 |
| WO | WO 98/32784 | 7/1998 |
| WO | WO 98/49229 | 11/1998 |
| WO | WO 99/07788 | 2/1999 |
| WO | WO 00/00576 | 1/2000 |
| WO | WO 00/37514 | 6/2000 |
| WO | WO 01/09200 | 2/2001 |
| WO | WO 01/42322 | 6/2001 |
| WO | WO 01/81493 | 11/2001 |
| WO | WO 02/34795 | 5/2002 |
| WO | WO 02/50145 | 6/2002 |
| WO | WO 2004/026923 | 4/2004 |
| WO | WO 2006/127483 | 11/2006 |
| WO | WO 2007/003238 | 1/2007 |
| WO | WO 2007/011459 | 1/2007 |
| WO | WO 2007/018743 | 2/2007 |
| WO | WO 2009/009158 | 1/2009 |
| WO | WO 2009/155517 | 12/2009 |

OTHER PUBLICATIONS

Weng, W.; Masrkel, E.J., Dekmezian, A. H. Macromol. Rapid Commun., 2001, 22, 1488-1492.*

Kolodka, E.; Wang, W.-J.; Zhu, S.; Hamielec, A. Macromol. Rapid Commun., 2003, 24, 311-315.*

Rose, J.M.; Mourey, T.H.; Slater, L. A.; Keresztes, I.; Fetters, L.J.; Coates, G.W. Macromolecules 2008, 41, 559-567.*

Resconi et al. (Topics in Catalysis, 1999, 7, 145-163).*

Resconi et al. (J. Am. Chem. Soc., 1992, 114, 1025-1032).*

Weng et al. (Macromol. Rapid Commun., 2000, 21, 1103-1107).*

Mathers et al., *Cross Metathesis Functionalization of Polyolefins*, Chemical Communications—Chemcom, Royal Society of Chemistry, 2004, No. 4, pp. 422-423.

Cosyns, et al., "*Process for Upgrading $C_3$, $C_4$ and $C_5$ Olefinic Streams*", Pet. & Coal, 1995, vol. 37, No. 4, pp. 23-33.

Elvers et al., Ullmann's Encyclopedia of Industrial Chemistry, vol. A13, VCH Verlagsgesellschaft mbH, Weinheim, 1989, pp. 243-247 and 275-276.

Vogt, Oligomerization of Ethylene to Higher Linear α-Olefins, B. Cornils et al., Editors, Applied Homogeneous Catalysis with Organometallic Compounds, A Comprehensive Handbook, vol. 1, VCH Verlagsgesellschaft mbH, Weinheim, 1996, pp. 245-258.

Rathgeber, et al., "*Bottle-brush Macromolecules in Solution: Comparison Between Results Obtained from Scattering Experiments and Computer Simulations*", Polymer, 2006, vol. 47, pp. 7318-7327.

Rulhoff, et al., "*Synthesis and Characterization of Defined Branched Poly(propylene)s with Different Microstructures by Copolymerization of Propylene and Linear Ethylene Oligomers ($C_n$=26-28) with Metallocenes*", Macromolecular Chemistry and Physics, 2006, vol. 207, pp. 1450-1460.

Kaneyoshi, Hiromu et al., Synthesis of Block and Graft Copolymers with Linear Polyethylene Segments by Combination of Degenerative Transfer Coordination Polymerization and Atom Transfer Radical Polymerization, Macromolecules, 38, 2005, pp. 5425-5435.

Eshuis, et al., "*Catalytic Olefin Oligomerization and polymerization with cationic group IV metal complexes $[Cp*_2Mme(THT)]^+$ $[BPH_4]^-$, M=Ti, Zr and Hf*", Journal of Molecular Catalysis, 1990, vol. 62, pp. 277-287.

Yang et al., "*Cationic Metallocene Polymerization Catalysts, Synthesis and Properties of the First Base-Free Zirconocene Hydride*", Angew. Chem. Intl. Edn. Engl., 1992, vol. 31, pp. 1375-1377.

Resconi, et al., "*Olefin Polymerization at Bis(pentamethylcyclopentadienyl)zirconium and—hafnium Centers: Chain Transfer Mechanisms*," J. Am. Chem. Soc., 1992, vol. 114, pp. 1025-1032.

Moscardi et al., "*Propene Polymerization with the Isospecfic, Highly Regioselective rac-$Me_2C(3$-t-$Bu$-$1$-$Ind)_2ZrCl_2$/MAO Catalyst. 2. Combined DFT/MM Analysis of Chain Propagation and Chain Release Reactions*", Organometallics 2001, vol. 20, pp. 1918-1931.

Zhu et al., Synthesis and Characterization of Long-Chain-Branched Polyolefins with Metallocene Catalysts: Copolymerization of Ethylene with Poly(ethylene-*co*-propylene) Macromonomer, Macromol. Rap. Commun., 2003, 24, pp. 311-315.

Brintzinger et al., Stereospecific Olefin Polymerization with Chiral Metallocene Catalysts, Angew. Chem. Int. Ed. Engl., 1995, 34, pp. 1143-1170.

Resconi et al., Selectivity in Propene Polymerization with Metallocene Catalysts, Chem. Rev., 2000, 100, pp. 1253-1345.

Coates, Precise Control of Polyolefin Stereochemistry Using Single-Site Metal Catalysts, Chem. Rev., 2000, 100, pp. 1223-1252.

Ewen et al., Syndiospecific Propylene Polymerizations with Group 4 Metallocenes, J. Am. Chem. Soc., 1988, 110, pp. 6255-6256.

Weng et al., Synthesis of Vinyl-Terminated Isotactic Poly(propylene), Macromol. Rapid Commun., 2000, 21, No. 16, pp. 1103-1107.

Labinger et al., Metal-Hydride and Metal-Alkyl Bond Strengths: The Influence of Electronegativity Differences, Organometallics, 1988, 7 pp. 926-928.

Toyota et al., Synthesis of terminally functionalized polyolefins, Polymer Bulletin 48, 2002, pp. 213-219.

Janiak et al., Metallocene Catalysts for Olefin Oligomerization, Macromol. Symp., 2006, vol. 236, pp. 14-22.

Shiono et al., *Copolymerization of poly(propylene) macromonomer with ethylene by (tert-butanamide)dimethyl(tetramethyl-qscyclopentadienyl) silane titanium dichloride/methylaluminoxane catalyst*, Macromol. Chem. Phys., 1997, vol. 198, pp. 3229-3237.

Kolodka et al., *Copolymerization of Propylene with Poly(ethylene-co-propylene) Macromonomer and Branch Chain-Length Dependence of Rheological Properties*, Macromol., 2002, vol. 35, No. 27, pp. 10062-10070.

Weng et al., *Synthesis of Long-Chain Branched Propylene Polymers via Macromonomer Incorporation*, Macromol. Rapid Commun., 2001, vol. 22, No. 18, pp. 1488-1492.

Sainath et al., *Synthesis and Characteristics of Succinic Anhydride- and Disodium Succinate-Terminated Low Molecular Weight Polyethylenes*, Macromolecules, Communication to the Editor, 2009, pp. A-C.

Sainath et al., *Supporting Information for Synthesis and Characteristics of Succinic Anhydride- and Disodium Succinate-Terminated Low Molecular Weight Polyethylenes*, Research Center, Mitsui Chemicals, Inc., Japan, pp. S1-S12, 2009.

Amin et al., *Versatile Pathways for In Situ Polyolefin Functionalization with Heteroatoms: Catalytic Chain Transfer*, Angew. Chem. Int. Ed., 2008, vol. 47, No. 11, pp. 2006-2025.

Chung, *Synthesis of Functional Polyolefin Copolymers with Graft and Block Structures*, Progress in Polymer Science, 2002, vol. 27, No. 1, pp. 39-85.

Lopez et al., *Synthesis of Well-defined Polymer Architectures by Successive Catalytic Olefin Polymerization and Living/Controlled Polymerization Reactions*, Progress in Polymer Science, 2007, vol. 32, No. 4, pp. 419-454.

Ornelas et al., *Efficient Mono- and Bifunctionalization of Poly-olefin Dendrimers by Olefin Metathesis*, Angew. Chem. Int. Ed., 2005, vol. 44, No. 45, pp. 7399-7404.

Ornelas et al., *Cross Olefin Metathesis for the Selective Functionalization, Ferrocenylation, and Solubilization in Water of Olefin-Terminated Dendrimers, Polymers, and Gold Nanoparticles and for a Divergent Dendrimer Constructions*, Journal of American Chemical Society, 2008, vol. 130, No. 4, pp. 1495-1506.

Brant et al., U.S. Appl. No. 12/143,663, filed Jun. 20, 2008.

Brant et al., U.S. Appl. No. 12/487,739, filed Jun. 19, 2009.

U.S. Appl. No. 12/335,252, filed Dec. 15, 2008, Jiang et al.

Advincula et al., Polymer Brushes: Synthesis, Characterization, Applications, Materials Characterization, 2005, vol. 55, pp. 249.

Alonzo et al., Structure and Scaling Behavior of Polymer Brushes with Multiple Tethers, Polymer Preprints, 2007, vol. 48, No. 1, pp. 781-782.

Britovsek et al., Novel Olefin Polymerization Catalysts Based on Iron and Cobalt, Chemical Communications, 1998, No. 7, pp. 849-850.

Busico et al., $^1$H NMR Analysis of Chain Unsaturations in Ethene/1-Octene Copolymers Prepared with Metallocene Catalysts at High Temperature, Macromolecules, 2005, vol. 38, No. 16, pp. 6988-6996.

Chen et al., Entropically Driven Phase Separation of Highly Branched/Linear Polyolefin Blends, Journal of Polymer Science, Part B: Polymer Physics, 2000, vol. 38, No. 22, pp. 2965-2975.

Cheng et al., Facile One-Pot Synthesis of Brush Polymers through Tandem Catalysis Using Grubbs' Catalyst for Both Ring-Opening Metathesis and Atom Transfer Radical Polymerizations, Nano Letters, 2006, vol. 6, No. 8, pp. 1741-1746.

Cherian et al., Synthesis of Allyl-Terminated Syndiotactic Polypropylene: macromonomers for the Synthesis of Branched Polyolefins, Macromolecules, 2005, vol. 38, No. 15, pp. 6259-6268.

Ciolino et al., Novel Synthesis of Polyethylene-Poly(dimethylsiloxane) Copolymers with a Metallocene Catalyst, Journal of Polymer Science, Part A: Polymer Chemistry, 2004. vol. 42, No. 10, pp. 2462-2473.

Dekmezian et al., Characterization and Modeling of Metallocene-Based Branch-Block Copolymers, Macromolecules, 2002, vol. 35, No. 25, pp. 9586-9594.

Djalali et al., Amphipolar Core-shell Cylindrical Brushes, Macromolecular Rapid Communications, 1999, vol. 20, No. 8, pp. 444-449.

Flory, Molecular Size Distribution in Ethylene Oxide Polymers, Journal of American Chemical Society, 1940, vol. 62, No. 6, pp. 1561-1565.

Hajela et al., Competitive Chain Transfer by β-Hydrogen and β-Methyl Elimination for the Model Ziegler-Natta Olefin Polymerization System $[Me_2Si(\eta^5-C_5Me_4)_{2]Sc\{CH_2}CH(CH_3)_2\}$ (PMe$_3$), Organometallics, 1994, vol. 13, No. 4, pp. 1147-1154.

Jagtap et al., Atomic Force Microscopy (AFM): Basics and Its Important Applications for Polymer Characterization: An Overview, Journal of Polymer Material, 2005, vol. 21, No. 1, pp. 1-26.

Johnson et al., Copolymerization of Ethylene and Propylene with Functionalized Vinyl Monomers by Palladium(II) Catalysts, Journal of American Chemical Society, 1996, vol. 118, No. 1, pp. 267-268.

Kaneyoshi et al., Synthesis of a Linear Polyethylene Macromonomer and Preparation of Polystyrene-*graft*-Polyethylene Copolymers via Grafting—Through Atom Transfer Radical Polymerization, Journal of Applied Polymer Science, 2007, vol. 105, No. 1, pp. 3-13.

Kim et al., The Synthesis of Random Brush for Nanostructure of Block Copolymer, Macromol. Symp., 2007, vol. 249-250, pp. 303-306.

Klep et al., Nanoparticles: Synthesis, Passivation, Stabilization and Functionalization, The 233$^{rd}$ ACS National Meeting, Chicago, IL, Mar. 25-29, 2007, COLL 124, Abstract.

Lahitte et al., Homopolymerization of ω-Styryl-Polystyrene Macromonomers in the Presence of CpTiF$_3$/MAO, Macromolecular Rapid Communications, 2004, vol. 25, No. 10, pp. 1010-1014.

Lahitte et al., Design of New Styrene Enriched Polyethylenes via Coordination Copolymerization of Ethylene with Mono- or α,ω-difunctional Polystyrene Macromonomers, Polymer, 2006, vol. 47, No. 4, pp. 1063-1072.

McNamee et al., Preparation and Characterization of Pure and Mixed Monolayers of Poly(ethylene Glycol) Brushes Chemically Adsorbed to Silica Surfaces, Langmuir, 2007, vol. 23, No. 8, pp. 4389-4399.

Markel et al., Metallocene-Based Branch-Block Thermoplastic Elastomers, Macromolecules, 2000, vol. 33, No. 23, pp. 8541-8548.

Matyjaszewski, Functional Star, Comb, Brush and (Hyper)Branched Polymers by ATRP, Polymeric Materials: Science & Engineering, 2001, vol. 84, pp. 363-364.

Patil et al., New Monomers and Comb Polymers, The 233$^{rd}$ ACS National Meeting, Chicago, IL, Mar. 25-29, 2007, BMGT 17, Abstract.

Rathgebar et al., On the Shape of Bottle-Brush Macromolecules: Systematic Variation of Architectural Parameters, The Journal of Chemical Physics, 2005, vol. 122, No. 12, pp. 124904-1 to 124904-13.

Resconi et al., Chain Transfer Reactions in Propylene Polymerization with Zirconocene Catalysts, Topics in Catalysis, 1999, vol. 7, No. 1-4, pp. 145-163.

Rose et al., Poly(ethylene-*co*-propylene macromonomer)s: Synthesis and Evidence for Starlike Conformations in Dilute Solution, Macromolecules, 2008, vol. 41, No. 3, pp. 559-567.

Schulze et al., Synthesis of Poly(propene-*g*-styrene) Graft Copolymers by Metallocene Catalyzed Copolymerization of Propene with Allyl-Terminated Polystyrene Macromonomer Obtained via Quasiliving Atom Transfer Radical Polymerization and the Effect of the Grafts on Blending Polypropene with Polystyrene, macromolecules, 2003, vol. 36, No. 13, pp. 4719-4726.

Shiono et al., Copolymerization of Atactic Polypropene Macromonomer with Propene by an Isospecific Metallocene Catalyst, Macromolecules, 1999, vol. 32, No. 18, pp. 5723-5727.

Small et al., Polymerization of Propylene by a New Generation of Iron Catalysts: Mechanisms of chain Initiation, Propagation, and Termination, Macromolecules, 1999, vol. 32, No. 7, pp. 2120-2130.

Small et al., Highly Active Iron and Cobalt Catalysts for the Polymerization of Ethylene, Journal of American Chemical Society, 1998, vol. 120, No. 16, pp. 4049-4050.

Sokoloff, Theory of Friction Between Neutral Polymer Brushes, Macromolecules, 2007, vol. 40, No. 11, pp. 4053-4058.

Sun et al., Iron Complexes Bearing 2-Imino-1,10-phenanthrolinyl Ligands as Highly Active Catalysts for Ethylene Oligomerization, Organometallics, 2006, vol. 25, No. 3, pp. 666-677.

Sun et al., Effect of Short Chain Branching on the Coil Dimensions of Polyolefins in Dilute Solution, Macromolecules, 2001, vol. 34, No. 19, pp. 6812-6820.

Tellmann et al., Selective Dimerization/Oligomerization of α-Olefins by Cobalt Bis(imino)pyridine Catalysts Stabilized by Trifluoromethyl Substituents: Group 9 Metal Catalysts with Productivities Matching Those of Iron Systems, Organometallics, 2005, vol. 24, No. 2, pp. 280-286.

VanderHart et al., Effect of Tacticity on the Structure of Poly(1-octadecene), Macromolecular Chemistry and Physics, 2004, vol. 205, No. 14, pp. 1877-1885.

Wintermantel et al., Molecular Bottlebrushes, Macromolecules, 1996, vol. 29, No. 3, pp. 978-983.

Zhang et al., Conformation of Cylindrical Brushes in Solution: Effect of Side Chain Length, Macromolecules, 2006, vol. 39, No. 24, pp. 8440-8450.

Zhao, et. al, Comb-Coil Polymer Brushes on the Surface of Silica Nanoparticles, Macromolecules 2005,vol. 38 No. 26, pp. 10619-10622.

Lahitte et al., Homopolymerization of ω-Allyl or ω-Undecenyl Polystyrene Macromonomers via Coordination Polymerization, Polymer Preprint, ACS, Div. of Polym. Chem., 2003, vol. 44, No. 2, pp. 46-47.

Schulz, Über die Beziehung zwischen Reaktionsgeschwindigkeit und Zusammensetzung des Reaktionsproduktes bei Makropolymerisationsvorgängen, Phys. Chem. Abst. B, 1935, 30, pp. 379-398.

Seppälä et al., Polymerization and Characterization of Long-Chain Branched Polyethylene Obtained via Metallocene Catalysts, Polymer Preprint, ACS, Div. Polym. Chem., 2003, vol. 44, No. 2, pp. 26.

J. Cossy et al., "*Cross-Metathesis reaction. Generation of Highly Functionalized Olefins from Unsaturated Alcohols*", Journal of Organometallic Chemistry, 2001, vol. 634, Issue 2, pp. 216-221.

Nikopoulou et al., "*Anionic Homo- and Copolymerization of Styrenic Triple-Tailed Polybutadiene Macromonomers*", Journal of Polymer Science: Part A—Polymer Chemistry, 2007, vol. 45, Issue 16, pp. 3513-3523.

Kapnistos et al., "*Linear Rheology of Comb Polymers with Star-Like Backbones: Melts and Solutions*", Rheologica Acta, 2006, vol. 46, No. 2, pp. 273-286.

J. C. Wasilke et al., "*Concurrent Tandem Catalysts*", Chemical Rev, 2005, vol. 105, pp. 1001-1020.

Doi et al., "Living" Coordination Polymerization of Propene with a Highly Active Vanadium-Based Catalyst, Macromolecules, 1986, vol. 19, No. 12, pp. 2896-2900.

Chen et al., Reactive & Functional Polymers, 2008, vol. 68, No. 9, pp. 1307-1313.

Deeken et al., *How Common Are True Aminopyridinato Complexes?*, Z. Anorg. Allg. Chem., 2007, vol. 633, pp. 320-325.

Ding et al., *The Preparation of 3,6-Bis(3-hexylthien-2-yl)-s-tetrazine and Its Conjugated Polymers*, Journal of Polymer Science Part A: Polymer Chemistry, 2011, vol. 49, No. 15, pp. 3374-3386.

Doring etal, European Journal of Inorganic Chemistry, 2010, No. 18, pp. 2853-2860.

Glatz et al., *First Row Transition Metal Aminopyridinates—the Missing Complexes*, Eur. J. Inorg. Chem., 2009, No. 10, pp. 1385-1392.

Kawahara et al., *The Detailed Analysis of the Vinylidene Structure of Metallocene-catalyzed Polypropylene*, Polymer, 2004, vol. 45, No. 2, pp. 355-357.

Mazzolini et al., *Polyethylene End Functionalization Using Radical-Mediated Thiol-Ene Chemistry: Use of Polyethylenes Containing Alkene End Functionality*, Macromolecules, 2011, vol. 44, pp. 3381-3387.

Scott et al., *Di- and Trivalent Lanthanide Complexes Stabilized by Sterically Demanding Aminopyridianto Ligands*, Eur. J. Inorg. Chem., 2005, pp. 1319-1324.

\* cited by examiner

POLYMACROMONOMER AND PROCESS FOR PRODUCTION THEREOF

PRIORITY CLAIM

This application is a continuation in part of U.S. Ser. No. 12/143,663 filed Jun. 20, 2008, which is incorporated herein.

FIELD OF THE INVENTION

This invention relates to polymacromonomers having lower amounts of $C_2$ to $C_{18}$ olefin monomers and processes to produce such polymacromonomers.

BACKGROUND OF THE INVENTION

Polyolefins are of great interest in industry as they have many uses in many different areas. For example, polyolefins, such as polyethylene and polypropylene, are often used in everything from waxes and plasticizers to films and structural components. Of late many have been interested in modifying the architecture of such polyolefins in the hopes of obtaining new and better combinations of properties. One method of controlling polyolefin architecture is to select monomers that will impart specific characteristics or tailoring the monomers used. For example, several have tried to produce large "monomers" called "macromonomers" or "macromers" having amounts of vinyl, vinylidene or vinylene termination that can be polymerized with smaller olefins such as ethylene or propylene to impart long chain branching, structural properties, etc. to a polyolefin. Typically, vinyl macromonomers are found more useful or easier to use than vinylene or vinylidene macromonomers. Examples of methods to produce various vinyl terminated macromonomers are disclosed in U.S. Pat. No. 6,117,962; U.S. Pat. No. 6,555,635; Small, Brookhart, Bennett, J Am Chem Soc 120, 1998, 4049; and Britovsek, et al. Chem. Comm. 1998, 849; Su, et al. Organomet. 25, 2006, 666. See also B. L. Small and M. Brookhart, "Polymerization of Propylene by a New Generation of Iron Catalysts: Mechanisms of Chain Initiation, Propagation, and Termination" Macromol. 32 1999, 2322; "Metallocene-Based Branch-Block Thermoplastic Elastomers", E. J. Markel, W. Weng, A. J. Peacock, and A. H. Dekmezian, Macromol. 33 2000, 8541-8548; and A. E. Cherian, E. B. Lobkovski, and G. W. Coates, Macromol 38 2005, 6259-6268.

Others have tried processes that produce a macromonomer then polymerize it with another smaller olefin, such as ethylene or propylene. Examples include U.S. Pat. No. 6,573,350, US 2004-0138392 A1, US 2004-0127614 A1, U.S. Pat. No. 7,223,822, and Lutz et al, Polymer 47, 2006, 1063-1072. Similar examples of macromonomer re-insertion type polymerizations include U.S. Pat. No. 6,225,432 and T. Shiono, et al. Macromolecules 32, 1999, 3723. Typically these polymerizations result in a rather low amount of the macromonomer being inserted into the growing polymer chain. For example, Shiono et al. report incorporating up to 3.8 mol % of atactic polypropylene macromonomer (Mn 630) in isotactic polypropylene having Mn of approximately 213,000.

Others have suggested in-situ variations where the macromonomer is produced in the same reactor that the polymerization occurs in, such that the macromonomer is consumed as it is produced. Examples include U.S. Pat. No. 7,294,681, US 2004-0127614, and U.S. Pat. No. 7,223,822, as well as tandem polymerization catalysts such as discussed by Bazan and coworkers (Chemical Rev 2005, 105, 1001-1020 and references therein). In many cases, long chain branched polyolefins can be produced in-situ under conditions that favor macromonomer production and its consumption in subsequently growing chains (See Chemical Rev 2005, 105, 1001-1020 and references therein).

In other areas, low molecular weight polymers and oligomers of larger monomers (typically referred to as polyalphaolefins), such as octene, decene and dodecene, have been made for uses in lubricants and additives. For examples please see WO 2007/011459 A1 and U.S. Pat. No. 6,706,828. Others have made various polyalphaolefins, such as polydecene, using various metallocene catalysts not typically known to produce polymers or oligomers with any specific tacticity. Examples include WO 96/2375 1, EP 0 613 873, U.S. Pat. No. 5,688,887, U.S. Pat. No. 6,043,401, US 2003/0055184, U.S. Pat. No. 6,548,724, U.S. Pat. No. 5,087,788, U.S. Pat. No. 6,414,090, U.S. Pat. No. 6,414,091, U.S. Pat. No. 4,704,491, U.S. Pat. No. 6,133,209, and U.S. Pat. No. 6,713,438. Many of these polyalphaolefin molecules have terminal unsaturation that is typically hydrogenated or functionalized prior to use as a lubricant or fuel additive.

Others (VanderHart, et al. Macromol. Chem. Phys. 2004, 205, 1877-1885) have made poly(1-octadecene) using titanium tetrachloride supported on magnesium dichloride activated by triethylaluminum. Specifically, VanderHart et al. homopolymerize $C_{18}H_{36}$ (Mw=252.3; MWD 1.0) to obtain product having a broad composition distribution.

Others have focused on making comb polymers through anionic polymerization. The comb polymers can be made into model comb polyolefins through hydrogenation. See Hadjichristidis, Lohse et al (see *Anionic homo-and copolymerization of styrenic triple-tailed polybutadiene macromonomers* Nikopoulou A, Iatrou H, Lohse D J, Hadjichristidis N Journal of Polymer Science Part A-Polymer Chemistry 45 (16): 3513-3523 Aug. 15 2007; and "*Linear Rheology of Comb Polymers with Star-like Backbones: Melts and Solutions*", Rheologica Acta, 2006, vol. 46, no. 2, pp. 273-286.)

Likewise, J. F. Lahitte, et al. *Homopolymerization of Allyl or Undecenyl Polystyrene Macromonomers via Coordination Polymerization Catalyst System*, Polym. Preprint, ACS, Div. Polym. Chem. 2003 44(2) 46-47, disclose polystyryl macromonomers that produce glassy products.

Others (Lahitte, et al. Macromol Rap Comm. 25, 2004, 1010-1014) have made polymers of vinyl terminated polystyrene-containing macromonomers using cyclopentadienyl titanium trifluoride in combination with methylalumoxane in toluene at 50° C. See also Lutz, et al. Polymer, 47, 2006, 1063-1072 where macromomers of ω-allyl polystyrene, ω-undecenyl polystyrene or α,ω-undecenyl polystyrene were polymerized with ethylene using a coordination catalyst. The macromomers were incorporated into the olefin chains at levels of about 2.1 to 15.6 wt %.

Additional references of interest include: Chen, et al. JPS, Part B Polym. Phys. 38, 2965-2975 (2000); Schulze, et al. Macromolecules, 2003, 36, 4719-4726; Ciolino, et al. Journal of Polymer Science: Part A: Polymer Chemistry, Vol. 42, 2462-2473 (2001); Djalali, et al. Macromol. Rapid. Commun. 20, 444-449 (1999); U.S. Pat. No. 6,197,910; WO 93/21242; and WO 93/12151.

SUMMARY OF THE INVENTION

This invention relates to a polymacromonomer comprising (alternately consisting essentially of, alternately consisting of) at least one macromonomer and from 0 to 20 wt % of a $C_2$ to $C_{18}$ comonomer, wherein the hydrocarbon macromonomer has:

1) from 20 to 600 carbon atoms, (as determined from GPC-DRI Mn)

2) an Mn of 280 g/mol or more (as determined by $^1$H NMR), 3) an Mw of 400 g/mol or more (as determined by GPC), 4) an Mz of 600 g/mol or more (as determined by GPC), 5) an Mw/Mn of 1.5 or more, (Mw determined by GPC, Mn determined by $^1$H NMR)

6) at least 70% vinyl termination (relative to total unsaturation) (as determined by $^1$HNMR), 7) a melting point of 60° C. or more (DSC, second melt), and 8) less than 5 wt % aromatic containing monomer (based upon the weight of the macromonomer) as determined by $^1$H NMR; and wherein the polymacromonomer has:

a) a g value of less than 0.6 (as determined by GPC), b) an Mw of greater than 20,000 g/mol (as determined by GPC), c) an Mn of greater than 10,000 g/mol (as determined by $^1$HNMR), d) a branching index $(g')_{vis}$ of less than 0.5 (as determined by GPC), e) a melting point of 50° C. or more (DSC second melt), f) less than 20% vinyl termination (relative to total unsaturation) (as determined by $^1$HNMR), g) and where the polymacromonomer comprises at least 70 wt % macromonomer, based upon the weight of the polymacromonomer, and h) less than 5 wt % aromatic containing monomer (based upon the weight of the polymacromonomer) as determined by $^1$H NMR.

In another embodiment, this invention relates to a polymacromonomer comprising (alternately consisting essentially of, alternately consisting of) at least one macromonomer and from 0 to 20 wt % of a $C_2$ to $C_{18}$ comonomer, wherein the polymacromonomer has:

a) a g value of less than 0.6, b) an Mw of greater than 20,000 g/mol, c) an Mn of greater than 10,000 g/mol, d) a branching index $(g')_{vis}$ of less than 0.5, e) optionally, a melting point of 0° C. or more, f) less than 20% vinyl termination (relative to total unsaturation), g) and where the polymacromonomer comprises at least 70 wt % macromonomer, based upon the weight of the polymacromonomer, and h) less than 5 wt % aromatic containing monomer (based upon the weight of the polymacromonomer) wherein the macromonomer comprises one or more of:

i) propylene co-oligomer having an Mn of 300 to 30,000 g/mol (as measured by $^1$H NMR) comprising 10 to 90 mol % propylene and 10 to 90 mol % of ethylene, wherein the oligomer has at least X % allyl chain ends (relative to total unsaturations), where: 1) X=(−0.94 (mol % ethylene incorporated)+100), when 10 to 60 mol % ethylene is present in the co-oligomer, and 2) X=45, when greater than 60 and less than 70 mol % ethylene is present in the co-oligomer, and 3) X=(1.83*(mol % ethylene incorporated)−83), when 70 to 90 mol % ethylene is present in the co-oligomer; and/or ii) propylene oligomer, comprising more than 90 mol % propylene and less than 10 mol % ethylene, wherein the oligomer has: at least 93% allyl chain ends, an Mn of about 500 to about 20,000 g/mol (as measured by $^1$H NMR), an isobutyl chain end to allylic vinyl group ratio of 0.8:1 to 1.35:1.0, and less than 1400 ppm aluminum; and/or iii) propylene oligomer, comprising at least 50 mol % propylene and from 10 to 50 mol % ethylene, wherein the oligomer has: at least 90% allyl chain ends, Mn of about 150 (preferably 250) to about 10,000 g/mol (as measured by $^1$H NMR), and an isobutyl chain end to allylic vinyl group ratio of 0.8:1 to 1.3:1.0, wherein monomers having four or more carbon atoms are present at from 0 to 3 mol %; and/or iv) propylene oligomer, comprising at least 50 mol % propylene, from 0.1 to 45 mol % ethylene, and from 0.1 to 5 mol % C4 to C12 olefin, wherein the oligomer has: at least 87% allyl chain ends (alternately at least 90%), an Mn of about 150 (preferably 250) to about 10,000 g/mol, (as measured by $^1$H NMR), and an isobutyl chain end to allylic vinyl group ratio of 0.8:1 to 1.35:1.0; and/or v) propylene oligomer, comprising at least 50 mol % propylene, from 0.1 to 45 wt % ethylene, and from 0.1 to 5 mol % diene, wherein the oligomer has: at least 90% allyl chain ends, an Mn of about 150 to about 10,000 g/mol (as measured by $^1$H NMR), and an isobutyl chain end to allylic vinyl group ratio of 0.7:1 to 1.35:1.0; and/or vi) a homooligomer, comprising propylene, wherein the oligomer has: at least 93% allyl chain ends, an Mn of about 500 to about 20,000 g/mol (as measured by $^1$H NMR), an isobutyl chain end to allylic vinyl group ratio of 0.8:1 to 1.2:1.0, and less than 1400 ppm aluminum.

This invention further relates to a homogeneous process to make such oligomers i) to vi) and thereafter produce polymacromonomers, by contacting the oligomer and up to 40 wt % $C_2$ to $C_{12}$ comonomer in the feedstream entering the reactor (preferably from 0 to 30 wt %, preferably from 0 to 20 wt %, preferably from 0 to 10 wt %, preferably from 0 to 5 wt %, preferably from 0 to 1 wt % of $C_2$ to $C_{12}$ comonomer), with a catalyst system capable of polymerizing vinyl terminated macromonomer (preferably comprising activator and a compound represented by the formula I, II, III, or IV below). For more detailed information on oligomers i) to vi) and processes to make them, please see U.S. Ser. No. 12/143,663, filed Jun. 20, 2008, incorporated by reference herein.

This invention relates to a polymacromonomer comprising (alternately consisting essentially of, alternately consisting of) at least one macromonomer and from 0 to 20 wt % of a $C_2$ to $C_{18}$ comonomer, wherein the hydrocarbon macromonomer has:

1) from 20 to 600 carbon atoms, (as determined by GPC-DRI Mn)

2) an Mn of 280 g/mol or more (as determined by $^1$H NMR), 3) an Mw of 400 g/mol or more (as determined by GPC), 4) an Mz of 600 g/mol or more (as determined by GPC), 5) an Mw/Mn of 1.5 or more, (Mw determined by GPC, Mn determined by $^1$H NMR)

6) at least 70% vinyl termination (relative to total unsaturation) (as determined by $^1$HNMR), 7) a heat of melting (Hm) of 20 J/g or less (preferably 15 J/g or less), and 8) less than 5 wt % aromatic containing monomer (based upon the weight of the macromonomer) as determined by $^1$H NMR; and wherein the polymacromonomer has:

a) a g value of less than 0.6 (as determined by GPC), b) an Mw of greater than 20,000 g/mol (as determined by GPC), c) an Mn of greater than 10,000 g/mol (as determined by $^1$HNMR), d) a branching index $(g')_{vis}$ of less than 0.5 (as determined by GPC), e) an Hm of 20 J/g or less, preferably 15 J/g or less, f) less than 20% vinyl termination (relative to total unsaturation) (as determined by $^1$HNMR), g) and where the polymacromonomer comprises at least 70 wt % macromonomer, based upon the weight of the polymacromonomer, and h) less than 5 wt % aromatic containing monomer (based upon the weight of the polymacromonomer).

This invention also relates to a process to produce polymacromonomer comprising contacting macromonomer and up to 40 wt % $C_2$ to $C_{18}$ comonomer in the feedstream entering the reactor (preferably from 0 to 30 wt %, preferably from 0 to 20 wt %, preferably from 0 to 10 wt %, preferably from 0 to 5 wt %, preferably from 0 to 1 wt % of $C_2$ to $C_{18}$ comonomer), with a catalyst system capable of polymerizing vinyl terminated macromonomer, under polymerization conditions of a temperature of 60 to 130° C. and a reaction time of 1 to 90 minutes, wherein the weight ratio of all comonomer present in the reactor to all macromonomer present in the reactor is 2:1 or less and where conversion of macromonomer to polymacromonomer is 70 wt % or more (as determined by infrared spectroscopy (IR) on samples taken at the entrance and exit of the reactor, specifically one should perform an IR of the macromonomer as it enters reactor and find resonance peak of the vinyl group, then measure the same peak on samples taken at the reactor exit and the volume should be 70% consumed).

This invention further relates to a process, preferably an in-line process, preferably a continuous process, to produce polymacromonomer, comprising introducing monomer and catalyst system into a reactor, obtaining a reactor effluent containing macromonomer, removing (such as flashing off) solvent, unused monomer and other volatiles, obtaining macromonomer, introducing macromonomer and catalyst system into a reaction zone (such as a reactor (such as a batch, CSTR or tubular reactor), an extruder, a pipe and/or a pump) and obtaining polymacromonomer. Reaction zone and reactor may be used synonymously herein.

This invention also relates to a two stage process to obtain polymacromonomer comprising contacting olefin monomer with a catalyst system, obtaining macromonomer and thereafter contacting the macromonomer with a catalyst system and thereafter obtaining polymacromonomer.

DEFINITIONS

Figure 1:
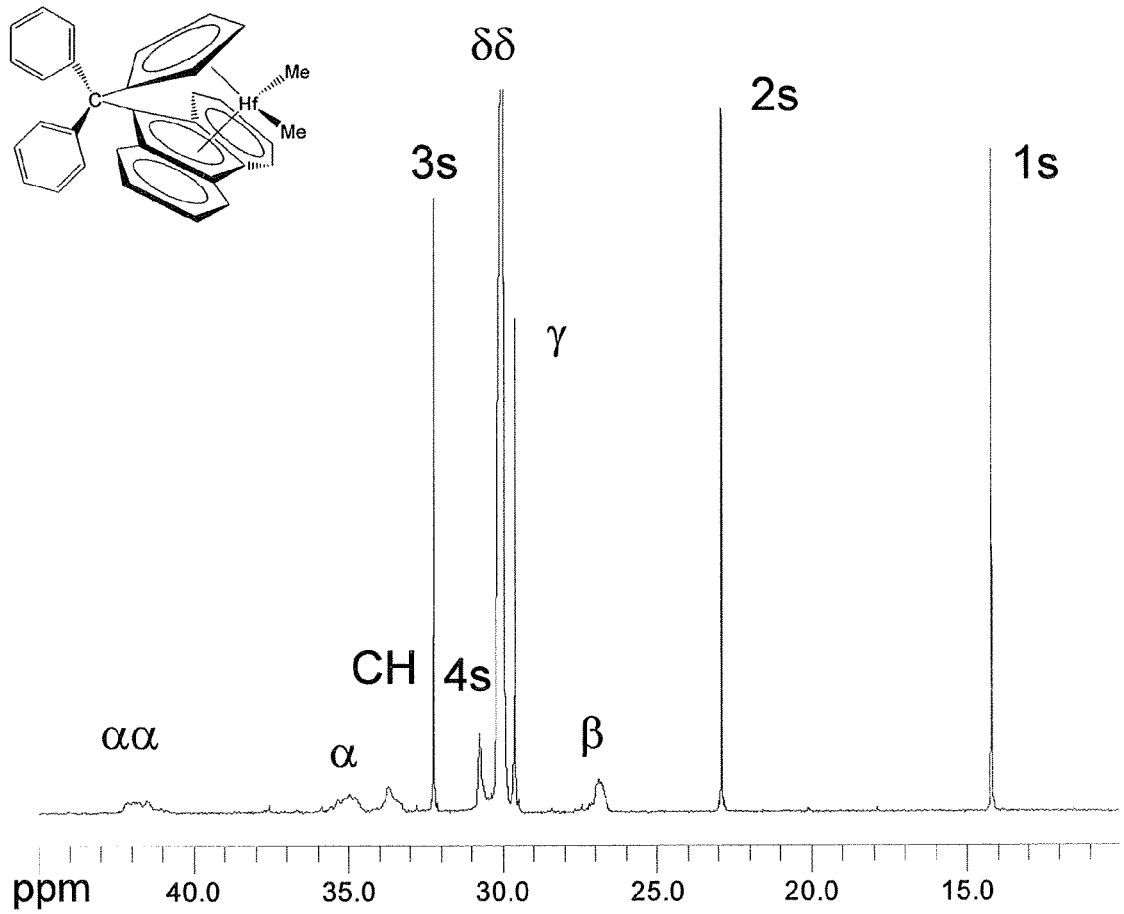
FIG. 1 is a chart of the range of chemical shift assignments for the polymacromonomer prepared in Example 1.

A catalyst system is defined to comprise a catalyst compound plus an activator.

For the purposes of this invention and the claims thereto when a polymer is referred to as comprising an olefin, the olefin present in the polymer is the polymerized form of the olefin. Likewise when catalyst components are described as comprising neutral stable forms of the components, it is well understood by one of ordinary skill in the art, that the ionic form of the component is the form that reacts with the monomers to produce polymers. In addition, a reactor is any container(s) in which a chemical reaction occurs.

As used herein, the new numbering scheme for the Periodic Table Groups is used as published in CHEMICAL AND ENGINEERNG NEWS, 63(5), 27 (1985).

For purposes of this invention, the term "oligomer" is defined to have an Mn of from 100 to 1200 g/mol as measured by $^1H$ NMR. The term "polymer" is defined to have an Mn of more than 1200 g/mol as measured by $^1H$ NMR. When an oligomer is referred to as comprising an olefin, the olefin present in the oligomer is the oligomerized form of the olefin. A co-oligomer is an oligomer comprising at least two different monomer units (such as propylene and ethylene). A homo-oligomer is an oligomer comprising units of the same monomer (such as propylene). A propylene oligomer/polymer/macromonomer/polymacromonomer is an oligomer/polymer/macromonomer/polymacromonomer having at least 50 mol % of propylene, respectively. As used herein, Mn is number average molecular weight (measured by $^1H$ NMR according to the procedure described in the Experimental section below), Mw is weight average molecular weight (measured by Gel Permeation Chromatography according to the procedure described in the Experimental section below), and Mz is z average molecular weight (measured by Gel Permeation Chromatography according to the procedure described in the Experimental section below), wt % is weight percent, and mol % is mole percent. Molecular weight distribution (MWD) is defined to be Mw divided by Mn. Unless otherwise noted, all molecular weight units (e.g., Mw, Mn, Mz) are g/mol.

The term "vinyl termination", also referred to as allyl chain end(s)" or "vinyl content" is defined to be an oligomer or polymer having at least one terminus represented by formula I:

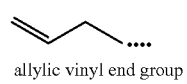

allylic vinyl end group where the "••••" represents the oligomer or polymer chain. In a preferred embodiment the allyl chain end is represented by the formula II:

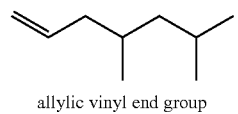

allylic vinyl end group

The amount of allyl chain ends (also called % vinyl termination) is determined using $^1H$ NMR at 120° C. using deuterated tetrachloroethane as the solvent on a 500 MHz machine and in selected cases confirmed by $^{13}C$ NMR. Resconi has reported proton and carbon assignments (neat perdeuterated tetrachloroethane used for proton spectra while a 50:50 mixture of normal and perdeuterated tetrachloroethane was used for carbon spectra; all spectra were recorded at 100° C. on a Bruker AM 300 spectrometer operating at 300 MHz for proton and 75.43 MHz for carbon) for vinyl terminated propylene oligomers in J American Chemical Soc 114 1992, 1025-1032 that are useful herein.

"Isobutyl chain end" is defined to be an oligomer having at least one terminus represented by the formula:

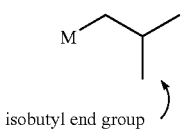

where M represents the oligomer chain. In a preferred embodiment, the isobutyl chain end is represented by one of the following formulae:

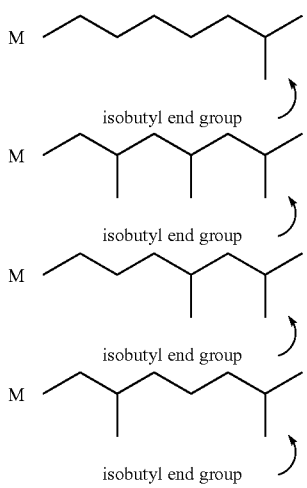

where M represents the oligomer chain.

Figure 2:
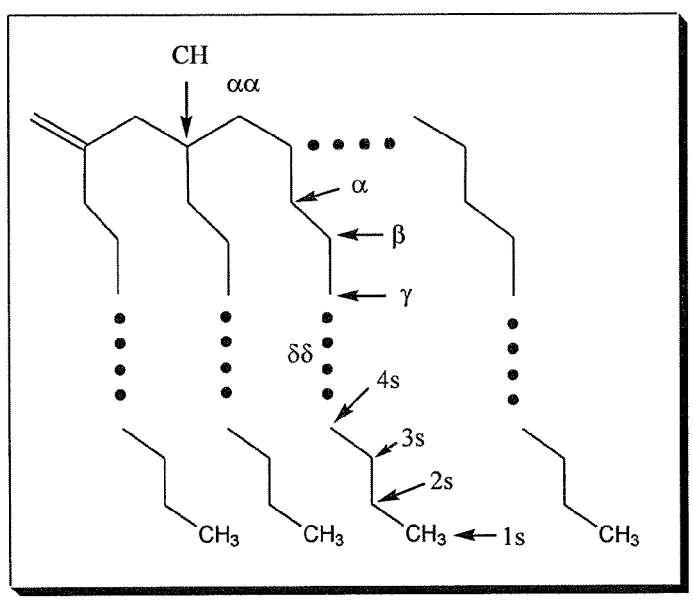
FIG. 2 is an illustration of $^{13}C$ NMR nomenclature of the resonances specific to homopolyethylene macromonomers inserted to make the polymacromonomer (e.g no comonomer).

The percentage of isobutyl end groups is determined using $^{13}$C NMR (as described in the example section) and the chemical shift assignments in Resconi et al, J Am. Chem. Soc. 1992, 114, 1025-1032 for 100% propylene oligomers and set forth in FIG. 2 for E-P oligomers.

The "isobutyl chain end to allylic vinyl group ratio" is defined to be the ratio of the percentage of isobutyl chain ends to the percentage of allylic vinyl groups.

An "aromatic containing monomer" is a $C_4$ to $C_{36}$ hydrocarbyl group containing at least one aromatic group. Examples include styrene, alpha-methyl styrene, para-methyl-styrene, and 4-(dichloromethylsilyl)diphenylethylene. An aromatic group is defined to be a cyclic group having at least one pair of conjugated double bonds. Examples include cyclopentadiene, indene, fluorene, and benzene.

A "styrenic" monomer is a monomer comprising a styrene unit, such as:

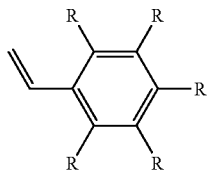

wherein each R is, individually, hydrogen or a $C_1$ to $C_{12}$ hydrocarbyl group, or $C_1$ to $C_{12}$ substituted hydrocarbyl group, preferably substituted with a halogen (such as Br or Cl).

A reaction zone is any vessel where a reaction occurs, such as glass vial, a polymerization reactor, reactive extruder, tubular reactor and the like.

As used herein the term continuous means a system that operates without interruption or cessation. For example a continuous process to produce a polymer would be one where the reactants are continually introduced into one or more reactors and polymer product is continually withdrawn.

DETAILED DESCRIPTION

In another embodiment, this invention relates to a polymacromonomer comprising at least one macromonomer and from 0.1 to 20 wt % (preferably 0.5 to 15 wt %, preferably 1 to 10 wt %, preferably 1 to 5 wt %, preferably from 0 to 5 mol %) of a C2 to C18 comonomer (preferably a $C_2$ to $C_{12}$ comonomer, preferably ethylene, propylene, butene, hexene, 4-methyl pentene-1, and 3-methyl pentene-1 and/or norbornene) wherein the macromonomer has:

1) from 20 to 800 carbon atoms (preferably from 20 to 700, preferably from 20 to 600, preferably from 20 to 500, preferably from 20 to 400, preferably from 20 to 300, preferably from 20 to 200, preferably from 30 to 175), 2) an Mn of 280 g/mol or more, (preferably from 280 to 15,000, preferably from 280 to 10,000, preferably from 280 to 12,000, preferably from 280 to 8,000, preferably 280 to 6,000, preferably 300 to 5,000, preferably 350 to 3,000, preferably 350 to 2,000), 3) an Mw of 400 g/mol or more (preferably from 400 to 50,000, preferably from 400 to 20,000, preferably 450 to 15,000, preferably 450 to 10,000, preferably 450 to 5,000, preferably 450 to 3,000), 4) an Mz of 600 g/mol or more, (preferably from 600 to 35,000, preferably from 600 to 30,000, preferably from 600 to 25,000, preferably from 600 to 20,000, preferably from 600 to 15,000, preferably 600 to 10,000, preferably 600 to 5,000, preferably 750 to 3,000), 5) an Mw/Mn of 1.5 or more, (preferably 1.5 to 7, preferably from 1.5 to 6, preferably from 1.6 to 5, preferably from 1.8 to 4, preferably from 1.5 to 3, preferably from 1.5 to 2.5), 6) vinyl termination (also referred to as vinyl content) of 70% or more, relative to total unsaturations, (as measured by $^1$H NMR) (preferably 75% or more, preferably 80% or more, preferably 85% or more, preferably 90% or more, preferably 95% or more, preferably 98% or more), and 7) a melting point Tm of 60° C. or more (preferably 70° C. or more, preferably 80° C. or more, preferably 90° C. or more, preferably 100° C. or more, preferably 110° C. or more, preferably 120° C. or more, preferably 130° C. or more) or alternately an Hm of 20 J/g or less, preferably 15 J/g or less, 8) from 0 to 10 wt % aromatic containing monomer, such as styrenic monomer, (preferably 0 to 5 wt %, preferably 0 to 1 wt %, alternately 0 wt %), based upon the weight of the macromonomer; and wherein the polymacromonomer has:

a) a g value of less than 0.6 (preferably less than 0.5, preferably less than 0.4, preferably less than 0.3, alternately less than 0.2), b) an Mw of greater than 30,000 g/mol (preferably 40,000 to 3,000,000, preferably 60,000 to 1,500,000), c) an Mn of greater than 20,000 g/mol (preferably 40,000 to 2,000,000, preferably 60,000 to 1,000,000), d) a branching index (g')$_{vis}$ of less than 0.5 (preferably less than 0.4, preferably less than 0.3, preferably less than 0.2), e) a melting point of 50° C. or more (preferably 60° C. or more, preferably 70° C. or more, preferably 80° C. or more, preferably 90° C. or more, preferably 100° C. or more, preferably 120° C. or more), or alternately an Hm of 20 J/g or less, preferably 15 J/g or less, and f) from 0 to 10 wt % aromatic containing monomer, such as styrenic monomer, (preferably 0 to 5 wt %, preferably 0 to 1 wt %, alternately 0 wt %), based upon the weight of the polymacromonomer.

In a preferred embodiment the macromonomer is not aromatic (comprises less than 5 wt % aromatic containing monomers, preferably less than 1 wt %, preferably 0 wt %), preferably is not styrenic (comprises less than 5 wt % styrenic monomers, preferably less than 1 wt %, preferably 0 wt %).

In a preferred embodiment, the macromonomer used herein has:

1) from 20 to 800 carbon atoms (preferably from 20 to 700, preferably from 20 to 600, preferably from 20 to 500, preferably from 20 to 400, preferably from 20 to 300, preferably from 20 to 200, preferably from 30 to 175), 2) an Mn of 280 g/mol or more, (preferably from 280 to 15,000, preferably from 280 to 10,000, preferably from 280 to 12,000, preferably from 280 to 8,000, preferably 280 to 6,000, preferably 300 to 5,000, preferably 350 to 3,000, preferably 350 to 2,000), 3) an Mw of 400 g/mol or more (preferably from 400 to 50,000, preferably from 400 to 20,000, preferably from 450 to 15,000, preferably 450 to 10,000, preferably 450 to 5,000, preferably 450 to 3,000), 4) an Mz of 600 g/mol or more, (preferably from 600 to 35,000, preferably from 600 to 30,000, preferably from 600 to 25,000, preferably from 600 to 20,000, preferably from 600 to 15,000, preferably 600 to 10,000, preferably 600 to 5,000, preferably 750 to 3,000), 5) an Mw/Mn of 1.5 or more, (preferably 1.5 to 7, preferably from 1.5 to 6, preferably from 1.6 to 5, preferably from 1.8 to 4, preferably from 1.5 to 3, preferably from 1.5 to 2.5), 6) a vinyl content of 70% or more, relative to total unsaturations, (preferably 70% or more, preferably 80% or more, preferably 85% or more, preferably 90% or more, preferably 95% or more, preferably 97%, preferably 98% or more, preferably 99% or more)

7) a melting point (DSC, second melt) of 60° C. or more (preferably 70° C. or more, preferably 80° C. or more, preferably 90° C. or more, preferably 100° C. or more, preferably 110° C. or more, preferably 120° C. or more, preferably 130° C. or more) or alternately an Hm of 20 J/g or less, preferably 15 J/g or less; and 8) from 0 to 10 wt % of aromatic containing monomer, such as styrenic monomer (preferably 0 to 5 wt %, preferably 0 to 1 wt %, alternately 0 wt %) based upon the weight of the macromonomer. (Aromatic content in a polymer is determined by $^1$HNMR).

Mw, Mz, and Number of carbon atoms are determined by GPC according to the procedure described in the Experimental section below. Mn is determined by $^1$HNMR according to the procedure described in the Experimental section below. Branching index (g')$_{vis}$ is determined according to the procedure described in the Experimental section below. Vinyl content (%) is determined as described above and in the Experimental section below. Melting point is determined by differential scanning calorimetry as described in the Experimental section below. "g value" is determined by the GPC procedure described in the Experimental section below and according to the methods in Macromolecules, 2001, 34, 6812-6820.

In another embodiment, the macromonomer used herein is a propylene homo-oligomer, comprising propylene and less than 0.5 wt % comonomer, preferably 0 wt % comonomer, wherein the oligomer has:

i) at least 93% allyl chain ends (preferably at least 95%, preferably at least 97%, preferably at least 98%);

ii) a number average molecular weight (Mn) of about 500 to about 20,000 g/mol, as measured by $^1$H NMR (preferably 500 to 15,000, preferably 600 to 10,000, preferably 800 to 8,000 g/mol, preferably 900 to 7,000, preferably 1000 to 6,000, preferably 1000 to 5,000);

iii) an isobutyl chain end to allylic vinyl group ratio of 0.8:1 to 1.3:1.0;

iv) less than 1400 ppm aluminum, (preferably less than 1200 ppm, preferably less than 1000 ppm, preferably less than 500 ppm, preferably less than 100 ppm).

In another embodiment, the macromonomer used herein is a propylene co-oligomer having an Mn of 300 to 30,000 g/mol as measured by $^1$H NMR (preferably 400 to 20,000, preferably 500 to 15,000, preferably 600 to 12,000, preferably 800 to 10,000, preferably 900 to 8,000, preferably 900 to 7,000 g/mol), comprising 10 to 90 mol % propylene (preferably 15 to 85 mol %, preferably 20 to 80 mol %, preferably 30 to 75 mol %, preferably 50 to 90 mol %) and 10 to 90 mol % (preferably 85 to 15 mol %, preferably 20 to 80 mol %, preferably 25 to 70 mol %, preferably 10 to 50 mol %) of one or more alpha-olefin comonomers (preferably ethylene, butene, hexene, or octene, preferably ethylene), wherein the oligomer has at least X % allyl chain ends (relative to total unsaturations), where: 1) X=(−0.94 (mol % ethylene incorporated)+100{alternately 1.20 (−0.94 (mol % ethylene incorporated)+100), alternately 1.50(−0.94 (mol % ethylene incorporated)+100)}), when 10 to 60 mol % ethylene is present in the co-oligomer, and 2) X=45 (alternately 50, alternately 60), when greater than 60 and less than 70 mol % ethylene is present in the co-oligomer, and 3) X=(1.83*(mol % ethylene incorporated)−83, {alternately 1.20 [1.83*(mol % ethylene incorporated)−83], alternately 1.50 [1.83*(mol % ethylene incorporated)−83]}), when 70 to 90 mol % ethylene is present in the co-oligomer. Alternately X is 80% or more, preferably 85% or more, preferably 90% or more, preferably 95% or more.

In an alternate embodiment any of oligomers i) to vi) have at least 80% isobutyl chain ends (based upon the sum of isobutyl and n-propyl saturated chain ends), preferably at least 85% isobutyl chain ends, preferably at least 90% isobutyl chain ends. Alternately, any of oligomers i) to vi) have an isobutyl chain end to allylic vinyl group ratio of 0.8:1 to 1.35:1.0, preferably 0.9:1 to 1.20:1.0, preferably 0.9:1.0 to 1.1:1.0.

In another embodiment, the macromonomer used herein is a propylene oligomer, comprising more than 90 mol % propylene (preferably 95 to 99 mol %, preferably 98 to 9 mol %) and less than 10 mol % ethylene (preferably 1 to 4 mol %, preferably 1 to 2 mol %), wherein the oligomer has:

at least 93% allyl chain ends (preferably at least 95%, preferably at least 97%, preferably at least 98%);

a number average molecular weight (Mn) of about 400 to about 30,000 g/mol, as measured by $^1$H NMR (preferably 500 to 20,000, preferably 600 to 15,000, preferably 700 to 10,000 g/mol, preferably 800 to 9,000, preferably 900 to 8,000, preferably 1000 to 6,000);

an isobutyl chain end to allylic vinyl group ratio of 0.8:1 to 1.35:1.0; and less than 1400 ppm aluminum, (preferably less than 1200 ppm, preferably less than 1000 ppm, preferably less than 500 ppm, preferably less than 100 ppm).

In another embodiment, the macromonomer used herein is a propylene oligomer, comprising:

at least 50 (preferably 60 to 90, preferably 70 to 90) mol % propylene and from 10 to 50 (preferably 10 to 40, preferably 10 to 30) mol % ethylene, wherein the oligomer has:

at least 90% allyl chain ends (preferably at least 91%, preferably at least 93%, preferably at least 95%, preferably at least 98%);

an Mn of about 150 to about 20,000 g/mol, as measured by $^1$H NMR (preferably 200 to 15,000, preferably 250 to 15,000, preferably 300 to 10,000, preferably 400 to 9,500, preferably 500 to 9,000, preferably 750 to 9,000); and an isobutyl chain end to allylic vinyl group ratio of 0.8:1 to 1.3:1.0, wherein monomers having four or more carbon atoms are present at from 0 to 3 mol % (preferably at less than 1 mol %, preferably less than 0.5 mol %, preferably at 0 mol %).

In another embodiment, the macromonomer used herein is a propylene oligomer, comprising:

at least 50 (preferably at least 60, preferably 70 to 99.5, preferably 80 to 99, preferably 90 to 98.5) mol % propylene, from 0.1 to 45 (preferably at least 35, preferably 0.5 to 30, preferably 1 to 20 preferably 1.5 to 10) mol % ethylene, and from 0.1 to 5 (preferably 0.5 to 3, preferably 0.5 to 1) mol % $C_4$ to $C_{12}$ olefin (such as butene, hexene or octene, preferably butene), wherein the oligomer has:

at least 90% allyl chain ends (preferably at least 91%, preferably at least 93%, preferably at least 95%, preferably at least 98%);

a number average molecular weight (Mn) of about 150 to about 15,000 g/mol, as measured by $^1$H NMR (preferably 200 to 12,000, preferably 250 to 10,000, preferably 300 to 10,000, preferably 400 to 9500, preferably 500 to 9,000, preferably 750 to 9,000); and an isobutyl chain end to allylic vinyl group ratio of 0.8:1 to 1.35:10.

In another embodiment, the macromonomer used herein is a propylene oligomer, comprising:

at least 50 (preferably at least 60, preferably 70 to 99.5, preferably 80 to 99, preferably 90 to 98.5) mol % propylene, from 0.1 to 45 (preferably at least 35, preferably 0.5 to 30, preferably 1 to 20, preferably 1.5 to 10) mol % ethylene, and from 0.1 to 5 (preferably 0.5 to 3, preferably 0.5 to 1) mol % diene (such as C4 to C12 alpha-omega dienes (such as butadiene, hexadiene, octadiene), norbornene, ethylidene norbornene, vinylnorbornene, norbornadiene, and dicyclopentadiene), wherein the oligomer has:

at least 90% allyl chain ends (preferably at least 91%, preferably at least 93%, preferably at least 95%, preferably at least 98%);

a number average molecular weight (Mn) of about 150 to about 20,000 g/mol, as measured by $^1$H NMR (preferably 200 to 15,000, preferably 250 to 12,000, preferably 300 to 10,000, preferably 400 to 9,500, preferably 500 to 9,000, preferably 750 to 9,000); and an isobutyl chain end to allylic vinyl group ratio of 0.7:1 to 1.35:1.0.

Any of the macromonomers (preferably the oligomers i) to vi)) prepared herein preferably have less than 1400 ppm aluminum, preferably less than 1000 ppm aluminum, preferably less than 500 ppm aluminum, preferably less than 100 ppm aluminum, preferably less than 50 ppm aluminum, preferably less than 20 ppm aluminum, preferably less than 5 ppm aluminum.

In another preferred embodiment, the macromonomer is amorphous, isotactic or syndiotactic, preferably isotactic. In another embodiment, the macromonomer is a propylene homopolymer or propylene homo-oligomer that may be amorphous, isotactic or syndiotactic, preferably isotactic. In another embodiment, the macromonomer is a propylene copolymer or propylene co-oligomer that may be amorphous, isotactic or syndiotactic, preferably isotactic. Amorphous is defined to mean a heat of fusion of less than 10 J/g. Isotactic is defined to be at least 50% isotactic pentads (as determined by $^{13}$CNMR as described below) preferably at least 60%, preferably at least 70%, preferably at least 80% isotactic pentads. Syndiotactic is defined to be at least 50% syndiotactic pentads (as determined by $^{13}$CNMR as described below) preferably at least 60%, preferably at least 70%, preferably at least 80% syndiotactic pentads.

In any of the embodiments described herein the macromonomer contains only, or consists essentially of or consists of, $C_2$ to $C_{18}$ linear alpha olefin monomer units (preferably $C_2$ to $C_{12}$, preferably ethylene, propylene, butene, octene, decene, or dodecene, preferably ethylene and propylene). In another embodiment the macromonomer does not comprise any styrene based monomer units. In another embodiment the macromonomer does not comprise any cyclic monomer units. In another embodiment the macromonomer does not comprise any aromatic monomer units. In another embodiment the macromonomer comprises 1 wt % or less of a styrenic monomer unit, a cyclic monomer unit or an aromatic monomer unit, preferably less than 0.5 wt %, preferably 0 wt %, based upon the weight of the macromonomer.

In another embodiment the macromonomer comprises less than 30 wt % amorphous material, preferably less than 20 wt %, preferably less than 10 wt %, preferably less than 5 wt % amorphous material, based upon the weight of the macromonomer. Percent amorphous material is determined by subtracting the percent crystallinity from 100. The percent crystallinity (X %) is calculated using the formula: [area under the DSC curve (in J/g)/H° (in J/g)]*100, where H° is the heat of fusion for the homopolymer of the major monomer component. These values for H° are to be obtained from the *Polymer Handbook, Fourth Edition*, published by John Wiley and Sons, New York 1999, except that a value of 290 J/g is used as the equilibrium heat of fusion (H°) for 100% crystalline polyethylene, a value of 140 J/g is used as the equilibrium heat of fusion (H°) for 100% crystalline polybutene, and a value of 207 J/g (H°) is used as the heat of fusion for a 100% crystalline polypropylene. The DSC curve is obtained as described in the Experimental section below.

In another embodiment, the macromonomer (particularly oligomers i) to iv)) has a glass transition temperature (Tg) of 0° C. or less (as determined by differential scanning calorimetry as described below), preferably −10° C. or less, more preferably −20° C. or less, more preferably −30° C. or less, more preferably −50° C. or less.

In another embodiment, the macromonomer (particularly oligomers i) to iv)) has a melting point (DSC first melt) of from 60 to 130° C., alternately 50 to 100° C. In another embodiment, the oligomers described herein have no detectable melting point by DSC following storage at ambient temperature (23° C.) for at least 48 hours.

In another embodiment, the macromonomer (particularly oligomers i) to iv)) is a liquid at 25° C.

In another embodiment, any macromonomer described herein may have a heat of fusion of 50 J/g or more, preferably 75 J/g or more, preferably 100 J/g or more, as determined by differential scanning calorimetry as described in the Experimental section below.

In another embodiment, any macromonomer described herein may have a percent crystallinity of 50% or more, preferably 60% or more, preferably 70% or more, as determined by DSC as described in the Experimental section below.

In another embodiment, any macromonomer described herein contains less than 1000 ppm of a group 4 metal (preferably less than 750 ppm or Ti, Hf and/or Zr). Alternately, the macromonomer contains less than 1000 ppm of lithium (preferably less than 750 ppm of lithium).

In a preferred embodiment, any macromonomer described herein comprises less than 3 wt % of functional groups selected from hydroxide, aryls and substituted aryls, halogens, alkoxys, carboxylates, esters, acrylates, oxygen, nitrogen, and carboxyl, preferably less than 2 wt %, more preferably less than 1 wt %, more preferably less than 0.5 wt %, more preferably less than 0.1 wt %, more preferably 0 wt %, based upon the weight of the macromonomer.

In another embodiment, the macromer described herein is a propylene oligomer or polymer. In some embodiments the propylene oligomer or polymer has one or more of the following properties:

a) a g'$_{vis}$ of 0.95 or less, preferably 0.90 or less, preferably 0.85 or less, preferably 0.80 or less, preferably 0.75 or less, preferably 0.70 or less); and or b) an Mw of 5,000 to 100,000 g/mol (preferably 15,000 to 100,000, preferably 20,000 to 75,000 g/mol); and/or c) a melting point of 90° C. or more (alternately 100° C. or more, alternately 140° C. or more). In a preferred embodiment the propylene oligomer or polymer is isotactic. Such propylene oligomers or polymers are know in the art and can be made using metallocene catalysts such as dimethylsilyl-bis(2-methyl,4-phenyl-indenyl)hafniumdimethyl or the catalyst compounds described in U.S. Pat. No. 7,279,536, typically used in combination with N,N-dimethylanilinium tetra (perfluorophenyl)borate or N,N-dimethylanilinium tetrakis (heptafluoronaphthyl)borate.

In a preferred embodiment, the macromonomer is a copolymer of ethylene and propylene, preferably having a Hm of 20 J/g or less (preferably 15 J/g or less) comprising from 65 to 80 wt % ethylene and from 20 to 35 wt % propylene, preferably having an Mw of from 5,000 to 100,000 g/mol, preferably 20,000 to 80,000 g/mol. Such copolymers are know in the art and can be made using metallocene catalysts such as (pentamethylcyclopentadienyl)(1,3-dimethylindenyl)hafnium dimethyl, typically used in combination with N,N-dimethylanilinium tetra(perfluorophenyl)borate or N,N-dimethylanilinium tetrakis (heptafluoronaphthyl)borate.

Macromonomers useful herein may be made by process known in the art to produce vinyl terminated macromonomers, including those described in U.S. Pat. No. 6,117,962, U.S. Pat. No. 6,555,635, Small, Brookhart, Bennett, JACS 120, 1998, 4049, Britovsek, et al. Chem. Comm. 1998, 849, Su, et al. Organomet. 25, 2006, 666.

In a preferred embodiment, the macromonomers can be produced using one or more activators in combination with one or more of the catalyst compounds described in: 1) G. J. P. Britovsek, V. C. Gibson, S. J. McTavish, G. A. Solan, B. S. Kimberley, P. J. Maddox, A. J. P. White, Williams, *Chem. Comm.* 1998, 849; 2) Journal of Organometallic Chemistry, 648, 2002, 55; 3) *Iron Complexes Bearing 2-Imino-1,10-phenanthrolinyl Ligands as Highly Active Catalysts for Ethylene Oligomerization*, Organometallics, 2006, 666-677; and 4) "*Novel Olefin Polymerization Catalysts Based on Iron and Cobalt*", Chem. Communn. 1998, 849.

Particularly useful catalyst compounds to make vinyl terminated ethylene macromonomers (preferably crystalline, e.g. having at least 40% crystallinity) include those represented by the formula:

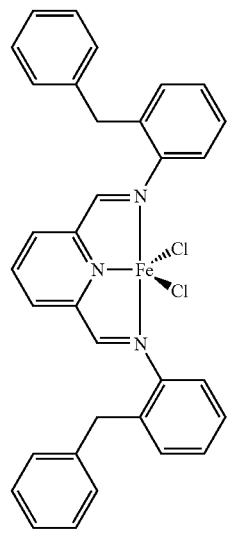

Particularly useful catalyst compounds to make vinyl terminated isotactic propylene macromonomers (preferably crystalline, e.g. having at least 40% crystallinity) include those represented by the formula:

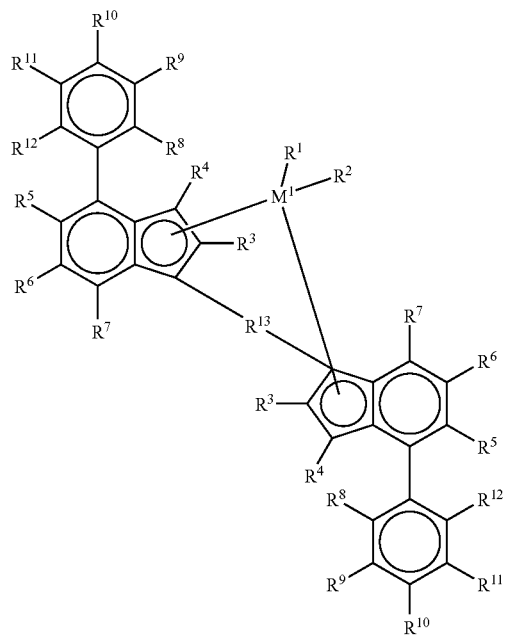

where $M^1$ is selected from titanium, zirconium, hafnium, vanadium, niobium, tantalum, chromium, molybdenum, or tungsten (preferably zirconium and or hafnium);

$R^1$ and $R^2$ are identical or different and are selected from hydrogen atoms, C1-C10 alkyl groups, C1-C10 alkoxy groups, C6-C10 aryl groups, C6-C10 aryloxy groups, C2-C10 alkenyl groups, C2-C40 alkenyl groups, C7-C40 arylalkyl groups, C7-C40 alkylaryl groups, C8-C40 arylalkenyl groups, OH groups or halogen atoms; or conjugated dienes that are optionally substituted with one or more hydrocarbyl, tri(hydrocarbyl)silyl groups or hydrocarbyl tri(hydrocarbyl) silylhydrocarbyl groups (preferably $R^1$ and $R^2$ are an alkyl such as methyl or ethyl or are a halide such as chloride);

$R_3$-$R_{12}$ are the same or different and are selected from hydrogen atoms, halogen atoms, C1-C10 halogenated or unhalogenated alkyl groups, C6-C10 halogenated or unhalogenated aryl groups, C2-C10 halogenated or unhalogenated alkenyl groups, C7-C40 halogenated or unhalogenated arylalkyl groups, C7-C40 halogenated or unhalogenated alkylaryl groups, C8-C40 halogenated or unhalogenated arylalkenyl groups, —NR'2, —SR', —OR', —OSiR'3 or —PR'2 radicals in which R' is one of a halogen atom, a C1-C10 alkyl group, or a C6-C10 aryl group; or two or more adjacent radicals $R^5$ to $R^7$ together with the atoms connecting them can form one or more rings (preferably $R^3$ is methyl, ethyl or butyl), and adjacent radicals $R^{11}$ and $R^{12}$ can form one or more saturated or aromatic rings (preferably $R^{11}$ and $R^{12}$ combine with the phenyl ring to form a substituted or unsubstituted naphthyl group), in an advantageous embodiment, $R^9$ and $R^{11}$ are a C1 to C20 hydrocarbyl group, or a C3 to C12 alkyl group, advantageously a t-butyl group;

$R^{13}$ is selected from:

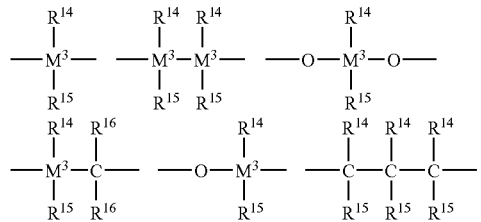

—B($R^{14}$)—, —Al($R^{14}$)—, —Ge—, —Sn—, —O—, —S—, —SO—, —SO2-, —N($R^{14}$)—, —CO—, —P($R^{14}$)— —P(O)($R^{14}$)—, —B(N$R^{14}R^{15}$)— and —B[N(Si$R^{14}R^{15}R^{16}$) 2]—, $R^{14}$, $R^{15}$ and $R^{16}$ are each independently selected from hydrogen, halogen, C1-C20 alkyl groups, C6-C30 aryl groups, C1-C20 alkoxy groups, C2-C20 alkenyl groups, C7-C40 arylalkyl groups, C8-C40 arylalkenyl groups and C7-C40 alkylaryl groups, or $R^{14}$ and $R^{15}$, together with the atom(s) connecting them, form a ring; and $M^3$ is selected from carbon, silicon, germanium and tin, or $R^{13}$ is represented by the formula:

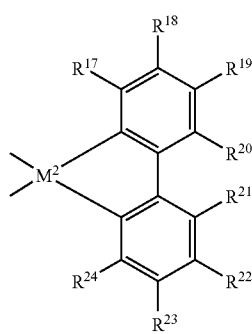

wherein $R^{17}$ to $R^{24}$ are as defined for $R^1$ and $R^2$, or two or more adjacent radicals $R^{17}$ to $R^{24}$, including $R^{20}$ and $R^{21}$, together with the atoms connecting them form one or more rings; $M^2$ is carbon, silicon, germanium, or tin (preferably $R^{13}$ is dimethyl silyl or diphenylsilyl).

Particularly useful catalyst compounds to make vinyl terminated isotactic propylene macromonomers (preferably crystalline, e.g. having at least 40% crystallinity) include those represented by the formula: rac-Me$_2$Si-bis(2-R-indenyl)MX$_2$ or rac-Me$_2$Si-bis(2-R,4-Ph-indenyl)MX$_2$, where R is an alkyl group (such as methyl), Ph is phenyl or substituted phenyl, M is Hf, Zr or Ti, and X is a halogen or alkyl group (such as Cl or methyl). Examples include dimethylsilyl-bis (2-methyl-indenyl)zirconium dimethyl (or dichloride), dimethylsilyl-bis(2-methyl,4-phenyl-indenyl)zirconium dimethyl (or dichloride), dimethylsilyl-bis(2-methyl,4-(3',5'-di-t-butyl-phenyl)-indenyl)zirconium dimethyl (or dichloride), dimethylsilyl-bis(2-methyl,4-naphthyl-indenyl)zirconium dimethyl (or dichloride), and dimethylsilyl-bis(2-methyl,4-(3',5'-di-t-butyl-naphthyl)-indenyl)zirconium dimethyl (or dichloride), or alternately the compounds where zirconium is replaced by hafnium. Other useful catalysts compounds include: (CpMe$_4$)(1,3-dimethyl Ind)Hf Me$_2$; (CpMe$_4$)(1-iPr Ind)Hf Me$_2$; (CpMe$_4$)(1-iPr,3-nPr Ind)Hf Me$_2$; (CpMe$_5$)((1, 3-dimethyl Ind)Hf Me$_2$; (CpMe$_5$)((1,3-di-n-propyl Ind)Hf Me$_2$; (CpMe$_5$)((1,2,3-trimethyl Ind)Hf Me$_2$, where Cp=cyclopentadienyl, Ind=indenyl, Me=methyl, iPr=isopropyl, and nPr=n-propyl.

In a preferred embodiment, the oligomers i) to iv) can be produced using a catalyst system comprising an activator and a catalyst compound represented by the following formulae:

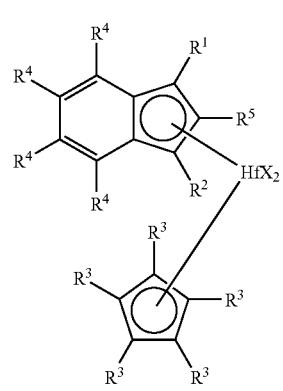

I

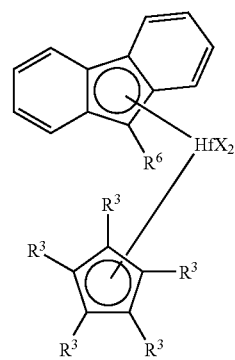

II

-continued

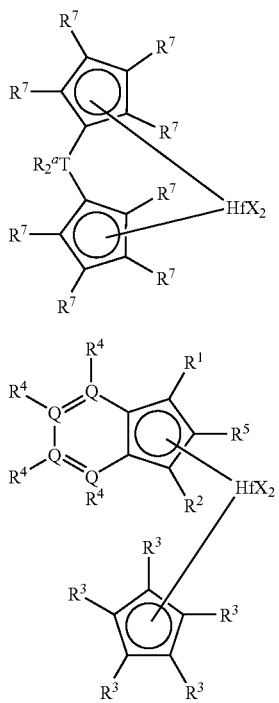

where
Hf is hafnium;
each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);
each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms);
each $R^1$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl or octyl, $R_1$ may the same or different as $R^2$;
each $R^2$ is, independently, hydrogen or a $C_1$ to $C_8$ alkyl group, preferably a $C_1$ to $C_8$ linear alkyl group, preferably methyl ethyl, propyl, butyl, pentyl, hexyl, heptyl or octyl, provided that at least one of $R^1$ or $R^2$ is not hydrogen, preferably both of $R^1$ and $R^2$ are not hydrogen, preferably $R^1$ and/or $R^2$ are not branched;
each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that at least three $R^3$ groups are not hydrogen (alternately four $R^3$ groups are not hydrogen, alternately five $R^3$ groups are not hydrogen);
{Alternately, when the catalyst compound is to used to make the homo-oligomer then each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that: 1) all five $R^3$ groups are methyl, or 2) four $R^3$ groups are not hydrogen and at least one $R^3$ group is a $C_2$ to $C_8$ substituted or unsubstituted hydrocarbyl (preferably at least two, three, four or five $R^3$ groups are a $C_2$ to $C_8$ substituted or unsubstituted hydrocarbyl)};
each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);
$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;
$R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;
each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);
N is nitrogen;
T is a bridge, preferably, Si or Ge, preferably Si;
each $R^a$, is independently, hydrogen, halogen or a C1 to C20 hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system;
and further provided that any two adjacent R groups may form a fused ring or multicenter fused ring system where the rings may be aromatic, partially saturated or saturated.

The term "substituted" means that a hydrogen group has been replaced with a hydrocarbyl group, a heteroatom or a heteroatom containing group. For example methyl cyclopentadiene (Cp) is a Cp group substituted with a methyl group and ethyl alcohol is an ethyl group substituted with an —OH group.

In an alternate embodiment, at least one $R^4$ group is not hydrogen, alternately at least two $R^4$ groups are not hydrogen, alternately at least three $R^4$ groups are not hydrogen, alternately at least four $R^4$ groups are not hydrogen, alternately all $R^4$ groups are not hydrogen.

Catalyst compounds that are particularly useful include one or more of:
(1,3-Dimethylindenyl)(pentamethylcyclopentadienyl) Hafniumdimethyl,
(1,3,4,7-Tetramethylindenyl)(pentamethylcyclopentadienyl) Hafniumdimethyl,
(1,3-Dimethylindenyl)(tetramethylcyclopentadienyl)Hafniumdimethyl,
(1,3-Diethylindenyl)(pentamethylcyclopentadienyl)Hafniumdimethyl,
(1,3-Dipropylindenyl)(pentamethylcyclopentadienyl)Hafniumdimethyl,
(1-Methyl,3-propyllindenyl)(pentamethylcyclopentadienyl) Hafniumdimethyl, (1,3-Dimethylindenyl)(tetramethylpropylcyclopentadienyl) Hafniumdimethyl,
(1,2,-Trimethylindenyl)(pentamethylcyclopentadienyl) Hafniumdimethyl,
(1,3-Dimethylbenzindenyl)(pentamethylcyclopentadienyl) Hafinumdimethyl,
(2,7-Bis t-butylfluorenyl)(pentamethylcyclopentadienyl) Hafniumdimethyl,
(9-Methylfluorenyl)(pentamethylcyclopentadienyl)Hafniumdimethyl,
(2,7,9-Trimethylfluorenyl)(pentamethylcyclopentadienyl) Hafniumdimethyl,
μ-Dihydrosilyl(bis tetramethylcyclopentadienyl)Hafinumdimethyl,
μ-Dihydrosilyl(bis tetramethylcyclopentadienyl)Hafinumdimethyl,
μ-Dimethylsilyl(tetramethylcyclopentadienyl)(3-propyltrimethylcyclopentadienyl)Hafinumdimethyl,
and μp-Dicyclopropylsilyl(bis tetramethylcyclopentadienyl) Hafinumdimethyl.

In an alternate embodiment, the "dimethyl" after the transition metal in the list of catalyst compounds above is replaced with a dihalide (such as dichloride or difluoride) or a bisphenoxide, particularly for use with an alumoxane activator.

Activators

Useful activators include alumoxanes and non-coordinating anion activators, whether neutral or ionic. Examples include alkylalumoxane, such as methylalumoxane, ethyl alumoxane, butyl alumoxane, isobutyl alumoxane; modified alumoxanes such as modified alkyl alumoxanes, including modified methyl alumoxane and the like. Mixtures of different alumoxanes and modified alumoxanes may also be used. Alumoxanes may be produced by the hydrolysis of the respective trialkylaluminum compound. MMAO may be produced by the hydrolysis of trimethylaluminum and a higher trialkylaluminum such as triisobutylaluminum. MMAO's are generally more soluble in aliphatic solvents and more stable during storage. There are a variety of methods for preparing alumoxane and modified alumoxanes, non-limiting examples of which are described in U.S. Pat. No. 4,665,208, U.S. Pat. No. 4,952,540, U.S. Pat. No. 5,091,352, U.S. Pat. No. 5,206,199, U.S. Pat. No. 5,204,419, U.S. Pat. No. 4,874,734, U.S. Pat. No. 4,924,018, U.S. Pat. No. 4,908,463, U.S. Pat. No. 4,968,827, U.S. Pat. No. 5,308,815, U.S. Pat. No. 5,329,032, U.S. Pat. No. 5,248,801, U.S. Pat. No. 5,235,081, U.S. Pat. No. 5,157,137, U.S. Pat. No. 5,103,031, U.S. Pat. No. 5,391,793, U.S. Pat. No. 5,391,529, U.S. Pat. No. 5,693,838, U.S. Pat. No. 5,731,253, U.S. Pat. No. 5,731,451, U.S. Pat. No. 5,744,656, U.S. Pat. No. 5,847,177, U.S. Pat. No. 5,854,166, U.S. Pat. No. 5,856,256 and U.S. Pat. No. 5,939,346 and European publications EP-A-0 561 476, EP-B1-0 279 586, EP-A-0 594-218 and EP-B 1-0 586 665, and PCT publications WO 94/10180 and WO 99/15534, all of which are herein fully incorporated by reference. It may be preferable to use a visually clear methylalumoxane. A cloudy or gelled alumoxane can be filtered to produce a clear solution or clear alumoxane can be decanted from the cloudy solution. Another useful alumoxane is a modified methyl alumoxane (MMAO) cocatalyst type 3A (commercially available from Akzo Chemicals, Inc. under the trade name Modified Methylalumoxane type 3A, covered under U.S. Pat. No. 5,041,584). When the activator is an alumoxane (modified or unmodified), some embodiments select the maximum amount of activator at a 5000-fold molar excess Al/M over the catalyst precursor (per metal catalytic site). The minimum activator-to-catalyst-precursor is typically a 1:1 molar ratio.

Aluminum alkyl or organoaluminum compounds which may be utilized as activators (or scavengers) herein include trimethylaluminum, triethylaluminum, triisobutylaluminum, tri-n-hexylaluminum, tri-n-octylaluminum and the like. If used as scavengers they are typically present at a ratio of 10:1 up to 100:1 mole:mole.

In another embodiment, the activator may be an ionizing or stoichiometric activator, neutral or ionic, such as tri(n-butyl) ammonium tetrakis(pentafluorophenyl)boron, a trisperfluorophenyl boron metalloid precursor or a trisperfluoronaphtyl boron metalloid precursor, polyhalogenated heteroborane anions (WO 98/43983), boric acid (U.S. Pat. No. 5,942,459) or combination thereof. It is also within the scope of this invention to use neutral or ionic activators alone or in combination with alumoxane or modified alumoxane activators.

Examples of neutral stoichiometric activators include tri-substituted boron, tellurium, aluminum, gallium and indium or mixtures thereof. The three substituent groups are each independently selected from alkyls, alkenyls, halogen, substituted alkyls, aryls, arylhalides, alkoxy and halides. Preferably, the three groups are independently selected from halogen, mono or multicyclic (including halosubstituted) aryls, alkyls, and alkenyl compounds and mixtures thereof, preferred are alkenyl groups having 1 to 20 carbon atoms, alkyl groups having 1 to 20 carbon atoms, alkoxy groups having 1 to 20 carbon atoms and aryl groups having 3 to 20 carbon atoms (including substituted aryls). More preferably, the three groups are alkyls having 1 to 4 carbon groups, phenyl, napthyl or mixtures thereof. Even more preferably, the three groups are halogenated, preferably fluorinated, aryl groups. Most preferably, the neutral stoichiometric activator is trisperfluorophenyl boron or trisperfluoronapthyl boron.

Ionic stoichiometric activator compounds may contain an active proton, or some other cation associated with, but not coordinated to, or only loosely coordinated to, the remaining ion of the ionizing compound. Such compounds and the like are described in European publications EP-A-0 570 982, EP-A-0 520 732, EP-A-0 495 375, EP-B1-0 500 944, EP-A-0 277 003 and EP-A-0 277 004, and U.S. Pat. Nos. 5,153,157, 5,198,401, 5,066,741, 5,206,197, 5,241,025, 5,384,299 and 5,502,124 and U.S. patent application Ser. No. 08/285,380, filed Aug. 3, 1994, all of which are herein fully incorporated by reference.

Ionic catalysts can be preparedly reacting a transition metal compound with some neutral Lewis acids, such as $B(C_6F_6)_3$, which upon reaction with the hydrolyzable ligand (X) of the transition metal compound forms an anion, such as ($[B(C_6F_5)_3(X)]^-$), which stabilizes the cationic transition metal species generated by the reaction. The catalysts can be, and preferably are, prepared with activator components which are ionic compounds or compositions. However preparation of activators utilizing neutral compounds is also contemplated by this invention.

Compounds useful as an activator component in the preparation of the ionic catalyst systems used in the process of this invention comprise a cation, which is preferably a Bronsted acid capable of donating a proton, and a compatible non-coordinating anion which anion is relatively large (bulky), capable of stabilizing the active catalyst species (the Group 4 cation) which is formed when the two compounds are combined and said anion will be sufficiently labile to be displaced by olefinic diolefinic and acetylenically unsaturated substrates or other neutral Lewis bases such as ethers, nitriles and the like. Two classes of compatible non-coordinating anions have been disclosed in EPA 277,003 and EPA 277,004 published 1988: 1) anionic coordination complexes comprising a plurality of lipophilic radicals covalently coordinated to and shielding a central charge-bearing metal or metalloid core, and 2) anions comprising a plurality of boron atoms such as carboranes, metallacarboranes and boranes.

In a preferred embodiment, the stoichiometric activators include a cation and an anion component, and may be represented by the following formula:

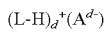

$(L-H)_d^+(A^{d-})$ wherein L is an neutral Lewis base;
H is hydrogen;
$(L-H)^+$ is a Bronsted acid
$A^{d-}$ is a non-coordinating anion having the charge d–
d is an integer from 1, 2 or 3.

The cation component, $(L-H)_d^+$ may include Bronsted acids such as protons or protonated Lewis bases or reducible Lewis acids capable of protonating or abstracting a moiety, such as an alkyl or aryl, from the bulky ligand metallocene containing transition metal catalyst precursor, resulting in a cationic transition metal species.

The activating cation $(L-H)_d^+$ may be a Bronsted acid, capable of donating a proton to the transition metal catalytic precursor resulting in a transition metal cation, including ammoniums, oxoniums, phosphoniums, silyliums, and mixtures thereof, preferably ammoniums of methylamine, aniline, dimethylamine, diethylamine, N-methylaniline, diphenylamine, trimethylamine, triethylamine, N,N-dimethylaniline, methyldiphenylamine, pyridine, p-bromo N,N-dimethylaniline, p-nitro-N,N-dimethylaniline, phosphoniums from triethylphosphine, triphenylphosphine, and diphenylphosphine, oxomiuns from ethers such as dimethyl ether diethyl ether, tetrahydrofuran and dioxane, sulfoniums from thioethers, such as diethyl thioethers and tetrahydrothiophene, and mixtures thereof. The activating cation $(L-H)_d^+$ may also be a moiety such as silver, tropylium, carbeniums, ferroceniums and mixtures, preferably carboniums and ferroceniums. Most preferably $(L-H)_d^+$ is triphenyl carbonium.

The anion component $A^{d-}$ include those having the formula $[M^{k+}Q_n]^{d-}$ wherein k is an integer from 1 to 3; n is 2, 3, 4, 5 or 6; n–k=d; M is an element selected from Group 13 of the Periodic Table of the Elements, preferably boron or aluminum, and Q is independently a hydride, bridged or unbridged dialkylamido, halide, alkoxide, aryloxide, hydrocarbyl, substituted hydrocarbyl, halocarbyl, substituted halocarbyl, and halosubstituted-hydrocarbyl radicals, said Q having up to 20 carbon atoms with the proviso that in not more than 1 occurrence is Q a halide. Preferably, each Q is a fluorinated hydrocarbyl group having 1 to 20 carbon atoms, more preferably each Q is a fluorinated aryl group, and most preferably each Q is a pentafluoryl aryl group. Examples of suitable $A^{d-}$ also include diboron compounds as disclosed in U.S. Pat. No. 5,447,895, which is fully incorporated herein by reference.

Examples of useful activators include: is N,N-dimethylanilinium tetra(perfluorophenyl)borate, N,N-dimethylanilinium tetrakis(perfluoronapthyl)borate, N,N-dimethylanilinium tetrakis(perfluorobiphenyl)borate, N,N-dimethylanilinium tetrakis(3,5-bis(trifluoromethyl)phenyl)borate, triphenylcarbenium tetrakis(perfluoronapthyl)borate, triphenylcarbenium tetrakis(perfluorobiphenyl)borate, triphenylcarbenium tetrakis(3,5-bis(trifluoromethyl)phenyl)borate, and triphenylcarbenium tetra(perfluorophenyl)borate.

The term "non-coordinating anion" (NCA) means an anion which either does not coordinate to said cation or which is only weakly coordinated to said cation thereby remaining sufficiently labile to be displaced by a neutral Lewis base. "Compatible" non-coordinating anions are those which are not degraded to neutrality when the initially formed complex decomposes. Further, the anion will not transfer an anionic substituent or fragment to the cation so as to cause it to form a neutral four coordinate metallocene compound and a neutral by-product from the anion. Non-coordinating anions useful in accordance with this invention are those that are compatible, stabilize the metallocene cation in the sense of balancing its ionic charge at +1, yet retain sufficient lability to permit displacement by an ethylenically or acetylenically unsaturated monomer during polymerization. These types of cocatalysts sometimes use tri-isobutyl aluminum or tri-octyl aluminum as a scavenger.

Invention process also can employ cocatalyst compounds or activator compounds that are initially neutral Lewis acids but form a cationic metal complex and a noncoordinating anion, or a zwitterionic complex upon reaction with the invention compounds. For example, tris(pentafluorophenyl) boron or aluminum act to abstract a hydrocarbyl or hydride ligand to yield an invention cationic metal complex and stabilizing noncoordinating anion, see EP-A-0 427 697 and EP-A-0 520 732 for illustrations of analogous Group-4 metallocene compounds. Also, see the methods and compounds of EP-A-0 495 375. For formation of zwitterionic complexes using analogous Group 4 compounds, see U.S. Pat. Nos. 5,624,878; 5,486,632; and 5,527,929.

When the cations of noncoordinating anion precursors are Bronsted acids such as protons or protonated Lewis bases (excluding water), or reducible Lewis acids such as ferrocenium or silver cations, or alkali or alkaline earth metal cations such as those of sodium, magnesium or lithium, the catalyst-precursor-to-activator molar ratio may be any ratio. Combinations of the described activator compounds may also be used for activation. For example, tris(perfluorophenyl)boron can be used with methylalumoxane.

In general the catalyst compounds and the activator are combined in ratios of about 1:10,000 to about 10:1. When alumoxane or aluminum alkyl activators are used, the catalyst-to-activator molar ratio may be from 1:5000 to 10:1, alternatively from 1:1000 to 10:1; alternatively, 1:500 to 2:1; or 1:300 to 1:1. When ionizing activators are used, the catalyst-to-activator molar ratio is from 10:1 to 1:10; 5:1 to 1:5; 2:1 to 1:2; or 1.2:1 to 1:1. Multiple activators may be used, including using mixes of alumoxanes or aluminum alkyls with ionizing activators.

In an alternate embodiment, other additives may be used, such as diethyl zinc, in combination with the catalyst compounds and activators.

Polymerization Processes to Make Macromonomer

The catalysts and catalyst systems described above may be used to produce the macromonomers in a solution, bulk, gas or slurry polymerization process or a combination thereof, preferably a solution phase (preferably a continuous solution phase) polymerization process. (For convenience the processes described herein will referred to as polymerizations, even though they may produce an oligomer). A supercritical process can also be used, preferably a supercritical process above the melting point of the macromonomers being produced is used, preferably a supercritical process above the cloud point of the polymerization system is used. For more information on the details of the supercritical process (including definitions of cloud point and polymerization system) please see WO 2004/026921. In another embodiment, the processes disclosed in U.S. Pat. No. 7,432,336 (incorporated by reference herein) may be used. For example a continuous polymerizations may be carried out in a stainless steel continuous autoclave reactor equipped with a stirrer, steam heating/water cooling element and a pressure controller. Solvent, macromonomer and comonomer (if any) are typically first chilled to −15° C. prior to entering a manifold, and then pumped into the reactor. The preactivated catalyst solution is fed into the reactor from a dry box through metering pumps in a separate line. Solvent (such as hexanes) are pumped into the reactor at a desired rate to control the residence time.

In one embodiment, the catalyst systems described herein may be used in combination with one or more of monomers having from 2 to 30 carbon atoms, preferably 2-12 carbon atoms, and more preferably 2 to 8 carbon atoms in one or more reactors in series or in parallel to produce the macromonomers described herein. (Preferred monomers include one or more of ethylene, propylene, butene-1, pentene-1,4-methyl-pentene-1, hexene-1, octene-1, decene-1,4-methyl-pentene-1,3-methyl-pentene-1, or a combination thereof.) The catalyst component and activator may be delivered as a solution or slurry, either separately to the reactor, activated in-line just prior to the reactor, or preactivated and pumped as an activated solution or slurry to the reactor. The polymerizations are carried out in either single reactor operation, in which monomer, comonomers, catalyst/activator, scavenger, and optional modifiers are added continuously to a single reactor or in series reactor operation, in which the above components are added to each of two or more reactors connected in series. The catalyst components can be added to the first reactor in the series. The catalyst component may also be added to both reactors, with one component being added to first reaction and another component to other reactors. Typically the polymerizations occur at a temperature of 30 to 150° C., preferably 35 to 120° C., preferably 40 to 100° C., alternately 40 to 150° C., alternately 45 to 120° C., alternately 50 to 100° C. Typically the polymerizations occur at a residence time of 1 second to 3 hours, preferably 1 minutes to 90 minutes, preferably 1 minute to 30 minutes, preferably 1 minute to 15 minutes.

The polymerization may occur in gas phase, such as, in a fluidized gas bed process used for producing polymers, where a gaseous stream containing one or more monomers is continuously cycled through a fluidized bed in the presence of a catalyst under reactive conditions. The gaseous stream is withdrawn from the fluidized bed and recycled back into the reactor. Simultaneously, polymer product is withdrawn from the reactor and fresh monomer is added to replace the polymerized monomer. (See for example U.S. Pat. Nos. 4,543,399, 4,588,790, 5,028,670, 5,317,036, 5,352,749, 5,405,922, 5,436,304, 5,453,471, 5,462,999, 5,616,661 and 5,668,228 all of which are fully incorporated herein by reference.)

In some cases, slurry phase polymerization system may also be used herein. A slurry polymerization process generally operates between 1 to about 50 atmosphere pressure range (15 psi to 735 psi, 103 kPa to 5068 kPa) or even greater and temperatures in the range of 0° C. to about 120° C. In a slurry polymerization, a suspension of solid, particulate polymer is formed in a liquid polymerization diluent medium to which monomer and comonomers along with catalyst are added. The suspension including diluent is intermittently or continuously removed from the reactor where the volatile components are separated from the polymer and recycled, optionally after a distillation, to the reactor. The liquid diluent employed in the polymerization medium is typically an alkane having from 3 to 7 carbon atoms, preferably a branched alkane. The medium employed should be liquid under the conditions of polymerization and relatively inert. When a propane medium is used the process must be operated above the reaction diluent critical temperature and pressure. Preferably, a hexane or an isobutane medium is employed.

In one embodiment, a preferred polymerization technique useful in the invention is referred to as a particle form polymerization, or a slurry process where the temperature is kept below the temperature at which the polymer goes into solution. Such technique is well known in the art, and described in for instance U.S. Pat. No. 3,248,179 which is fully incorporated herein by reference. The preferred temperature in the particle form process is within the range of about 85° C. to about 110° C. Two preferred polymerization methods for the slurry process are those employing a loop reactor and those utilizing a plurality of stirred reactors in series, parallel, or combinations thereof. Non-limiting examples of slurry processes include continuous loop or stirred tank processes. Also, other examples of slurry processes are described in U.S. Pat. No. 4,613,484, which is herein fully incorporated by reference.

In another embodiment, the slurry process is carried out continuously in a loop reactor. The catalyst, as a slurry in isobutane or as a dry free flowing powder, is injected regularly to the reactor loop, which is itself filled with circulating slurry of growing polymer particles in a diluent of isobutane containing monomer and comonomer. Hydrogen, optionally, may be added as a molecular weight control. (In one embodiment 500 ppm or less of hydrogen is added, or 400 ppm or less or 300 ppm or less. In other embodiments at least 50 ppm of hydrogen is added, or 100 ppm or more, or 150 ppm or more.)

A homogeneous (solution or bulk) batch or continuous process may also be used herein. Generally this involves polymerization in a continuous reactor in which the polymer formed and the starting monomer and catalyst materials supplied, are agitated to reduce or avoid concentration gradients. Suitable processes operate above the melting point of the polymers at high pressures, from 1 to 3000 bar (10-30,000 MPa), in which the monomer acts as diluent or in solution polymerization using a solvent. The reactor temperature depends on the catalyst used. In general, the reactor temperature preferably can vary between about 30° C. and about 160° C., more preferably from about 40° C. to about 120° C., and most preferably from about 50° C. to about 110° C. In parallel reactor operation, the temperatures of the two reactors are independent. The pressure can vary from about 1 mm Hg to 2500 bar (25,000 MPa), preferably from 0.1 bar to 1600 bar (1-16,000 MPa), most preferably from 1.0 to 500 bar (10-5000 MPa).

Each of these processes may also be employed in single reactor, parallel or series reactor configurations, in batch or continuous mode. The liquid processes comprise contacting olefin monomers with the above described catalyst system in a suitable diluent or solvent and allowing said monomers to react for a sufficient time to produce the desired polymers. Hydrocarbon solvents are suitable, both aliphatic and aromatic. Alkanes, such as hexane, pentane, isopentane, and octane, are preferred.

The process can be carried out in a continuous stirred tank reactor, batch reactor or plug flow reactor, or more than one reactor operated in series or parallel. These reactors may have or may not have internal cooling or heating and the monomer feed may or may not be refrigerated. See the general disclosure of U.S. Pat. No. 5,001,205 for general process conditions. See also, international application WO 96/33227 and WO 97/22639. All documents are incorporated by reference for US purposes for description of polymerization processes, metallocene selection and useful scavenging compounds.

For more information on the processes to produce oligomers i) to vi) please see U.S. Ser. No. 12/143,663, filed Jun. 20, 2008.

In a preferred embodiment, the propylene co-oligomer of oligomers i) to vi) may be produce by a homogenous process, said process having productivity of at least $4.5 \times 10^3$ g/mmol/hr, wherein the process comprises:

contacting, at a temperature of from 35° C. to 150° C., propylene, 0.1 to 70 mol % ethylene and from 0 to about 5 wt % hydrogen in the presence of a catalyst system comprising an activator and at least one metallocene compound represented by the formulae I, II, II or IV above, where: Hf is hafnium; each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system); each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms); each $R^1$ is, independently, a $C_1$ to $C_8$ alkyl group, preferably a $C_1$ to $C_8$ linear alkyl group, preferably methyl ethyl, propyl, butyl, pentyl, hexyl, heptyl or octyl, $R^1$ may the same or different as $R^2$; each $R^2$ is, independently, a $C_1$ to $C_8$ alkyl group, preferably a $C_1$ to $C_8$ linear alkyl group, preferably methyl ethyl, propyl, butyl, pentyl, hexyl, heptyl or octyl, preferably $R^1$ and/or $R^2$ are not branched; each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that at least three $R^3$ groups are not hydrogen (alternately four $R^3$ groups are not hydrogen, alternately five $R^3$ groups are not hydrogen); each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl); $R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl; $R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl; each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen); N is nitrogen; T is a bridge, preferably, Si or Ge, preferably Si; each $R^a$, is independently, hydrogen, halogen or a C1 to C20 hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system; and further provided that any two adjacent R groups may form a fused ring or multicenter fused ring system where the rings may be aromatic, partially saturated or saturated.

In a preferred embodiment, the propylene homo-oligomer of oligomers i) to vi) may be produce by a homogenous process, said process having a productivity of at least $4.5 \times 10^6$ g/mol/min, wherein the process comprises:

contacting, at a temperature of from 30° C. to 120° C., propylene, 0 mol % comonomer and from 0 to about 5 wt % hydrogen in the presence of a catalyst system comprising an activator and at least one metallocene compound represented by the formulae I, II, III or IV disclosed above wherein: Hf is hafnium; each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system); each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms); each $R^1$ is, independently, a $C_1$ to $C_8$ alkyl group, preferably a $C_1$ to $C_8$ linear alkyl group, preferably methyl ethyl, propyl, butyl, pentyl, hexyl, heptyl or octyl, $R^1$ may the same or different as $R^2$; each $R^2$ is, independently, a $C_1$ to $C_8$ alkyl group, preferably a $C_1$ to $C_8$ linear alkyl group, preferably methyl ethyl, propyl, butyl, pentyl, hexyl, heptyl or octyl, preferably $R^1$ and/or $R^2$ are not branched; each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that: 1) all five $R^3$ groups are methyl, or 2) four $R^3$ groups are not hydrogen and at least one $R^3$ group is a $C_2$ to $C_8$ substituted or unsubstituted hydrocarbyl (preferably at least two, three, four or five $R^3$ groups are a $C_2$ to $C_8$ substituted or unsubstituted hydrocarbyl); each $R^4$ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl); $R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl; $R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl; each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen); N is nitrogen;

T is a bridge, preferably, Si or Ge, preferably Si; each $R^a$, is independently, hydrogen, halogen or a C1 to C20 hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system; and further provided that any two adjacent R groups may form a fused ring or multicenter fused ring system where the rings may be aromatic, partially saturated or saturated.

In a particularly preferred embodiment, the macromonomer is made in a first reactor then transferred to a second reactor, reaction zone, or reaction extruder where it is polymerized to form the polymacromonomer.

Process to Polymerize Macromonomer to Make Polymacromonomer

In another embodiment this invention relates to a process to produce polymacromonomer comprising contacting macromonomer and from 0 to 40 wt % of comonomer of $C_2$ to $C_{18}$ olefin (preferably alpha-olefin) in the feedstream (preferably from 0 to 30 wt %, preferably from 0 to 20 wt %, preferably from 0 to 10 wt %, preferably from 0 to 5 wt %, preferably from 0.5 to 1 wt % of $C_2$ to $C_{18}$ comonomer) with a catalyst system capable of polymerizing vinyl terminated macromonomer (preferably wherein the macromonomer is as described above (preferably having: 1) from 20 to 1500 carbon atoms, 2) an Mn of 280 or more, 3) an Mw of 450 or more, 4) an Mz of 600 or more, 5) an Mw/Mn of 1.5 or more, 6) 70% or more vinyl termination, 7) less than 10 wt % styrenic monomer, and 8) optionally, a melting point Tm of 60° C. or more (or optionally virtually amorphous); at a temperature of 60 to 130° C. (alternately from 70 to 120° C., alternately from 75 to 115° C.)) and at reaction time of from 1 minute to 90 minutes (alternately from 1 to 60 min, alternately from 1 to 45 min), wherein the molar ratio of all comonomer present in the reactor to all macromonomer present in the reaction zone is 3:1 or less, preferably 2:1 or less, preferably 1:1 or less. In a preferred embodiment the consumption of macromonomer is 70 wt % or more, preferably 75% or more, preferably 80% or more, preferably 90% or more, based upon the weight of macromonomer entering the reactor in the feedstream as compared to the amount of macromonomer recovered after the polymerization at the exit of the reactor, as described above.

The catalysts and catalyst systems described below may be used to produce the polymacromonomers in a solution, bulk, gas or slurry polymerization process or a combination thereof, preferably a solution phase or slurry phase polymerization process. The general polymerization process and conditions described above for preparing macromonomers may be also be used for preparing the polymacromonomers. A supercritical process can also be used, preferably a supercritical process above the melting point of the macromonomers being produced is used, preferably a supercritical process above the cloud point of the polymerization system is used. For more information on the details of the supercritical process (including definitions of cloud point and polymerization system) please see WO 2004/026921.

In an alternate embodiment, other additives may be used, such as diethyl zinc, in combination with the catalyst compounds (preferably more than one, such as two) and activators.

This invention further relates to a process, preferably an in-line process, preferably a continuous process, to produce polymacromonomer, comprising introducing monomer and catalyst system into a reactor, obtaining a reactor effluent containing macromonomer, removing unused monomer and/or other volatiles, optionally removing (such as flashing off) solvent, obtaining macromonomer (such as those described herein) essentially free of residual monomer, introducing macromonomer and catalyst system into a reaction zone (such as a reactor, an extruder, a pipe and/or a pump) and obtaining polymacromonomer (such as those described herein).

This invention also relates to a two stage process to obtain polymacromonomer comprising contacting olefin monomer with a catalyst system, obtaining macromonomer and thereafter contacting the macromonomer with a catalyst system and thereafter obtaining polymacromonomer.

In a preferred embodiment, the temperature of the polymerization may be from 60 to 150° C., preferably 70 to 140° C., preferably 80 to 130° C.

In a preferred embodiment, the reaction time of the polymerization is from 1 minute to 9 hours, preferably 10 min to 3 hours, preferably 20 min to 2 hours, preferably 30 to 90 min, alternately 5 min to 3 hours, alternately 10 min to 2 hours, alternately 15 min to 90 min.

In a preferred embodiment the reactor contains less than 90 wt % diluent or solvent, preferably less than 85 wt %, preferably less than 80 wt %, based upon the weight of the solvent and monomers entering the reactor.

In a preferred embodiment the weight ratio of macromonomer to catalyst compound (including activator) entering the reactor is 10:1 to 20,000:1, preferably 100:1 to 15000:1, preferably 500:1 to 10000:1, preferably 50:1 to 15000:1, preferably 100:1 to 10000:1.

In a preferred embodiment, the comonomer contains only, or consists essentially of or consists of, $C_2$ to $C_{18}$ (alternately $C_2$ to $C_{12}$) linear alpha olefin monomer units (preferably ethylene, propylene, butene, octene, decene, or dodecene, preferably ethylene and propylene). In another embodiment the comonomer does not comprise any styrenic monomer. In another embodiment the comonomer does not comprise any cyclic monomer. In another embodiment the macromonomer does not comprise any aromatic containing monomer (also called aromatic monomer units). In another embodiment the comonomer comprises 1 wt % or less of a styrenic monomer, a cyclic monomer or an aromatic containing monomer, preferably less than 0.5 wt %, preferably 0 wt %, based upon the weight of the comonomer entering the reaction zone.

In a preferred embodiment the polymacromonomer comprises at least 15 wt % propylene, alternately at least 20% propylene, alternately at least 50% propylene, alternately 100 wt % propylene (with the balance being made up of one or more of ethylene and or $C_4$ to $C_{12}$ olefin monomers (preferably linear alpha olefin monomers, preferably ethylene, butene, hexene, and octene).

In a preferred embodiment the polymacromonomer comprises at least 70 wt % ethylene, alternately at least 80% ethylene, alternately at least 90% ethylene, alternately 100 wt % ethylene (with the balance being made up of one or more of $C_3$ to $C_{12}$ olefin monomers (preferably linear alpha olefin monomers, preferably propylene, buthene, hexene, and octene).

In another embodiment the macromonomer can be copolymerized with an alpha-omega diene, such as 1,5-hexadiene, 1,7-octadiene, or a cyclic diene such as norbornadiene or cyclopentadiene.

In a preferred embodiment, the polymacromonomers can be produced using one or more activators (including all activators described above) in combination with one or more catalyst compounds capable of polymerizing vinyl terminated macromonomers. A catalyst compound or catalyst system is determined to be capable of polymerizing vinyl terminated macromonomers by taking the catalyst compound (plus an activator) or the catalyst system in question and combining it with 1-octene at the reactor conditions in question (such as 80° C.). If the catalyst compound or catalyst system can polymerize 1-octene to a number average molecular weight of 1000 or more, then the catalyst system can perform in the instant invention.

Catalysts useful to polymerize the macromonomers include those described in U.S. Pat. No. 7,126,031, especially the compound represented by the formula:

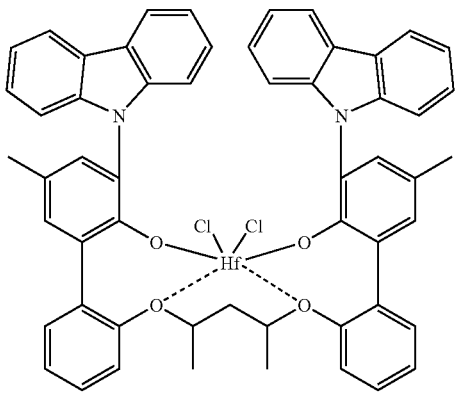

Other useful catalysts include dimethylsilyl (cyclopentadienyl) (cyclododecylamido)titanium dimethyl, dibenzylmethyl(cyclopentadienyl)(fluorenyl)hafnium dimethyl, dimethylgermanium bisindenyl hafnium dimethyl, diphenylmethyl(cyclopentadienyl)(fluorenyl)hafnium dimethyl.

Further useful catalysts include the racemic versions of: dimethylsilyl (2-methyl-4-phenylindenyl)zirconium dichloride, dimethylsilyl (2-methyl-4-phenylindenyl)zirconium dimethyl, dimethylsilyl (2-methyl-4-phenylindenyl)hafnium dichloride, dimethylsilyl (2-methyl-4-phenylindenyl) hafnium dimethyl, dimethylsilyl bis(indenyl)hafnium dimethyl, dimethylsilyl bis(indenyl)hafnium dichloride, dimethylsilyl bis(indenyl)ziconium dimethyl, dimethylsilyl bis (indenyl)zirconium dichloride.

Further useful catalysts include the racemic isomers of: dimethylsilanediylbis(2-methylindenyl)metal dichloride; dimethylsilanediylbis(indenyl)metal dichloride; dimethylsilanediylbis(indenyl)metal dimethyl; dimethylsilanediylbis (tetrahydroindenyl)metal dichloride; dimethylsilanediylbis (tetrahydroindenyl)metal dimethyl; dimethylsilanediylbis (indenyl)metal diethyl; and dibenzylsilanediylbis(indenyl) metal dimethyl; wherein the metal is chosen from Zr, Hf, or Ti.

Preferred activators for use with the above catalyst compounds include: dimethylaniliniumtetrakis(pentafluorophenyl)borate, N,N-dimethylanilinium tetra(perfluorophenyl) borate, triphenylcarbonium perfluorotetraphenylborate, dimethylanilinium perfluorotetranaphthylborate, 4-tert-butylanilinium bis(pentafluorophenyl)bis(perfluoro-2-napthyl) borate, 4-tert-butylanilinium (pentafluorophenyl)tris(perfluoro-2-napthyl)borate, dimethylanilinium tetrakis (perfluoro-2-napthyl)borate, dimethylanilinium tetrakis(3,5 (pentafluorophenyl)perfluorophenylborate); and tris-perfluorophenyl boron.

Additional activators useful in combination with the catalyst compounds described above to make the polymacromonomers include those described above for use in making the macromonomers. Likewise the processes for producing the polymacromonomers may generally be used to produce the polymacromonomers.

Polymacromonomer

In a preferred embodiment, the degree of polymerization for the polymacromonomer is 3 or more, alternately 5 or more, alternately 6 or more, alternately 10 or more, alternately 100 or more, alternately 150 or more, alternately 200 or more.

In another embodiment, at least 70% of the macromonomer is consumed in the polymerization, preferably at lest 75%, preferably at least 80%, preferably at lest 85%, preferably at least 90%, preferably at lest 95%, preferably at least 98%, as determined by $^1H$ NMR described in the Experimental section below.

In a preferred embodiment, the polymacromonomer has:
    a) a g value of less than 0.5 (preferably less than 0.4, preferably less than 0.3, preferably less than 0.25),
    b) an Mw of greater than 20,000 g/mol (preferably 30,000 to 1,000,000, preferably 40,000 to 700,000),
    c) an Mn of greater than 8,000 g/mol (preferably 15,000 to 400,000, preferably 30,000 to 200,000),
    d) a branching index ($g'_{vis}$) of less than 0.5 (preferably less than 0.4, preferably less than 0.3, preferably less than 0.2, preferably less than 0.1, preferably less than 0.05), and
    e) a melting point of 50° C. or more, preferably 60° C. or more, preferably 70° C. or more, preferably 80° C. or more, preferably 90° C. or more, preferably 100° C. or more, preferably 120° C. or more, preferably from 50 to 200° C., or alternately an Hm of 20 J/g or less, preferably 15 J/g or less.

In another embodiment, the polymacromonomer contains less than 1000 ppm of a group 4 metal (preferably less than 750 ppm or Ti, Hf and/or Zr, preferably less than 500 ppm). Alternately, the polymacromonomer contains less than 1000 ppm of lithium (preferably less than 750 ppm of lithium, preferably less than 500 ppm of lithium).

In a preferred embodiment, the polymacromonomer comprises less than 3 wt % of functional groups selected from hydroxide, aryls and substituted aryls, halogens, alkoxys, carboxylates, esters, acrylates, oxygen, nitrogen, and carboxyl, preferably less than 2 wt %, more preferably less than 1 wt %, more preferably less than 0.5 wt %, more preferably less than 0.1 wt %, more preferably 0 wt %, based upon the weight of the polymacromonomer.

In another preferred embodiment, the polymacromonomer is amorphous, isotactic or syndiotactic, preferably isotactic. In another embodiment, the polymacromonomer is a propylene homopolymer or propylene homo-oligomer that may be amorphous, isotactic or syndiotactic, preferably isotactic. In another embodiment, the polymacromonomer is a propylene copolymer or propylene co-oligomer that may be amorphous, isotactic or syndiotactic, preferably isotactic.

In another embodiment the macromonomer comprises less than 30 wt % amorphous material, preferably less than 20 wt %, preferably less than 10 wt %, preferably less than 5 wt %.

In another embodiment, any polymacromonomer described herein may have a heat of fusion of 60 J/g or more, preferably 70 J/g or more, preferably 90 J/g or more, preferably 120 J/g or more, preferably 160 J/g or more or 15 J/g or less. In a preferred embodiment, the polymacromonomer comprises two or more different macromonomers, preferably three or more different macromonomers, preferably four or more different macromonomers. By different macromonomers is meant that the macromonomers differ in composition (such as monomer content or comonomer distribution within the macromonomer) or molecular weight. For example, in an embodiment, the polymacromonomer can comprise a propylene macromonomer and an ethylene macromonomer, or a propylene macromonomer and an ethylene-propylene macromonomer, or an ethylene macromonomer and an propylene-ethylene macromonomer. In a particularly preferred embodiment, the entire spectrum from 100% polyethylene macromonomer to 100% polypropylene macromonomer with propylene rich and ethylene rich variations in between is available, including amorphous and crystalline variations. Table 1 below sets out some particularly preferred combinations of macromonomers, where Vinyl-PE is a ethylene macromonomer, preferably having crystalline structure (e.g. a Tm of 60° C. or more) and 0 to 10 wt % comonomer, and any of the properties described above, Vinyl-aPP is a propylene macromonomer with an amorphous content of at least 10% (preferably at least 50%, preferably at least 95%) and preferably having from 0 to 10 wt % comonomer, Vinyl iPP is a propylene macromonomer with an isotactic pentad content of at least 50% and preferably having from 0 to 10 wt % comonomer and/or a melting point of at least 70° C., Vinyl-EP is an ethylene-propylene macromonomer having 10 to 50 wt % propylene and 90 to 50 wt % ethylene. Vinyl-PS is a styrene macromonomer, having from 0 to 50 wt % comonomer. Vinyl-pe is a is an propylene-ethylene macromonomer having 10 to 50 wt % ethylene and 90 to 50 wt % propylene. Where the macromonomers have the same name in the table, please consider that they differ in another means, such as molecular weight or crystallinity.

| Macro-monomer | Vinyl-PE | Vinyl-aPP | Vinyl-iPP | Vinyl-EP | Vinyl-PS | Vinyl-pe |
|---|---|---|---|---|---|---|
| Vinyl-PE | X | X | X | X | X | X |
| Vinyl-aPP | X | X | X | X | X | X |
| Vinyl-iPP | X | X | X | X | X | X |
| Vinyl-EP | X | X | X | X | X | X |
| Vinyl-PS | X | X | X | X | X | X |
| Vinyl-pe | X | X | X | X | X | X |

In a preferred embodiment, the polymacromonomer comprises at least two macromonomers where the first macromonomer comprises 60 wt % or more of ethylene and the second macromonomer comprises 60 wt % or more of propylene.

In another embodiment, a termacromonomer is present to produce a polymacromonomer having three different macromonomers, such as Vinyl-aPP+Vinyl-PE+vinyl-EP.

Alternately, the polymacromonomer can comprise macromonomers that differ in molecular weight (Mw) by at least 200 g/mol, alternately by at least 300 g/mol, alternately by at least 1000 g/mol, alternately by at least 3000 g/mol, alternately by at least 5000 g/mol. In another embodiment, at least 50 wt % (preferably at least 60 wt %, preferably at least 70 wt %, preferably at least 80 wt %) of the monomers in the macromonomers differ by in molecular weight (Mw) by at least 200 g/mol, alternately by at least 300 g/mol, alternately by at least 1000 g/mol, alternately by at least 3000 g/mol, alternately by at least 5000 g/mol.

Alternately, the polymacromonomer can comprise macromonomers that differ in monomer content where the monomers differ by at least one carbon, alternately by at least 2 carbons, alternately by at least 4 carbons, alternately by at least 6 carbons. In another embodiment, at least 50 wt % (preferably at least 60 wt %, preferably ate last 70 wt %, preferably at least 80 wt %) of the monomers in the macromonomers differ by at least one carbon, alternately by at least 2 carbons, alternately by at least 4 carbons, alternately by at least 6 carbons.

Alternately, the polymacromonomer can comprise macromonomers that differ in total comonomer content by at least 2 wt %, preferably by at least 5 wt %, preferably by at least 10 wt %, preferably by at least 15 wt %, preferably by at least 20 wt %.

In another embodiment, the polymacromonomer comprises at least two different macromonomers where one macromonomer has a Tm of 60° C. or more (preferably 70° C. or more, preferably 80° C. or more, preferably 90° C. or more, preferably 100° C. or more, preferably 110° C. or more, preferably 120° C. or more, preferably 130° C. or more) and the second monomer has an Hm of 20 J/g or less, preferably 15 J/g or less. Preferably both monomers also have: 1) from 20 to 600 carbon atoms; 2) an Mn of 280 g/mol or more; 3) an Mw of 400 g/mol or more; 4) an Mz of 600 g/mol or more; 5) an Mw/Mn of 1.5 or more; 6) at least 70% vinyl termination (relative to total unsaturation); and 7) less than 5 wt % aromatic containing monomer. Preferably the first and second macromonomers are ethylene based (preferably each macromonomer comprises at least 50 wt % ethylene, preferably at least 60 wt %).

In additional embodiments, one could manipulate the polymerization conditions such that blocks of macromonomers can be made (e.g. pulsing in different macromonomers at certain time intervals). For example, propylene macromonomers could be polymerized then a large amount of ethylene macromonomer could be polymerized to create a diblock polymacromonomer, or a mixture of polymacromonomers could be made.

In another embodiment this invention relates to:
1. A polymacromonomer comprising at least one macromonomer and from 0 to 20 wt % of a $C_2$ to $C_{18}$ comonomer, wherein the macromonomer has:
   1) from 20 to 800 carbon atoms,
   2) an Mn of 280 g/mol or more,
   3) an Mw of 400 g/mol or more,
   4) an Mz of 600 g/mol or more,
   5) an Mw/Mn of 1.5 or more,
   6) vinyl termination of at least 70% (as determined by $^1$H NMR) relative to total unsaturations,
   7) a melting point (Tm) of 60° C. or more or an Hm of 20 J/g or less, and
   8) less than 10 wt % aromatic containing monomer, based upon the weight of the macromonomer;
and
wherein the polymacromonomer has:
   a) a g value of less than 0.6,
   b) an Mw of greater than 30,000 g/mol,
   c) an Mn of greater than 20,000 g/mol,
   d) a branching index $(g')_{vis}$ of less than 0.5,
   e) a melting point of 50° C. or more an Hm or 20 J/g or less,
   f) less than 25% vinyl terminations (as measured by $^1$H NMR) relative to total unsaturations,
   g) at least 70 wt % macromonomer, based upon the weight of the polymacromonomer, and
   h) from 0 to 20 wt % aromatic containing monomer, based upon the weight of the polymacromonomer.
2. The polymacromonomer of paragraph 1 wherein the polymacromonomer contains 0 wt % aromatic containing monomer.
3. The polymacromonomer of paragraph 1 or 2 wherein the polymacromonomer contains 0 wt % styrenic monomer.
4. The polymacromonomer of paragraph 1, 2 or 3 wherein the macromonomer is isotactic.
5. The polymacromonomer of paragraph 1, 2, 3, or 4 wherein the polymacromonomer comprises at least 70 wt % macromonomer comprising at least 50 wt % propylene.
6. The polymacromonomer of claim 1, 2, 3, 4, or 5 wherein the polymacromonomer comprises at least 70 wt % macromonomer comprising at least 50 wt % ethylene.

7. The polymacromonomer of any of paragraphs 1 to 6 wherein the polymacromonomer comprises two or more different macromonomers.

8. The polymacromonomer of paragraph 7 wherein the macromonomers differ in molecular weight (Mw) by at least 200 g/mol.

9. The polymacromonomer of paragraph 7 or 8 wherein the first macromonomer has a melting point of 60° C. or more and the second macromonomer has an Hm of 20 J/g or less.

10. The polymacromonomer of any of paragraphs 1 to 10 wherein the macromonomer comprises a propylene polymer having a $g'_{vis}$ of 0.95 or less.

11. The polymacromonomer of any of paragraphs 1 to 11 wherein the macromonomer comprises a copolymer of 65 to 80 wt % ethylene and 20 to 35 wt % propylene (based upon the weight of the copolymer) and has a Hm of 15 J/g or less.

12. A polymacromonomer comprising at least one macromonomer and from 0 to 20 wt % of a $C_2$ to $C_{18}$ comonomer, wherein the polymacromonomer has:
  a) a g value of less than 0.6,
  b) an Mw of greater than 30,000 g/mol,
  c) an Mn of greater than 20,000 g/mol,
  d) a branching index $(g')_{vis}$ of less than 0.5,
  e) less than 25% vinyl terminations (as measured by $^1$H NMR) relative to total unsaturations,
  f) at least 70 wt % macromonomer, based upon the weight of the polymacromonomer, and
  g) from 0 to 20 wt % aromatic containing monomer, based upon the weight of the polymacromonomer; and the macromonomer comprises one or more of:
    i) propylene co-oligomer having an Mn of 300 to 30,000 g/mol comprising 10 to 90 mol % propylene and 10 to 90 mol % of ethylene, wherein the oligomer has at least X % allyl chain ends (relative to total unsaturations), where: 1) X=(−0.94 (mol % ethylene incorporated)+100), when 10 to 60 mol % ethylene is present in the co-oligomer, and 2) X=45, when greater than 60 and less than 70 mol % ethylene is present in the co-oligomer, and 3) X=(1.83*(mol % ethylene incorporated)−83), when 70 to 90 mol % ethylene is present in the co-oligomer; and/or
    ii) propylene oligomer, comprising more than 90 mol % propylene and less than 10 mol % ethylene, wherein the oligomer has: at least 93% allyl chain ends, an Mn of about 500 to about 20,000 g/mol, an isobutyl chain end to allylic vinyl group ratio of 0.8:1 to 1.35:1.0, and less than 1400 ppm aluminum; and/or
    iii) propylene oligomer, comprising at least 50 mol % propylene and from 10 to 50 mol % ethylene, wherein the oligomer has: at least 90% allyl chain ends, Mn of about 150 to about 10,000 g/mol, and an isobutyl chain end to allylic vinyl group ratio of 0.8:1 to 1.3:1.0, wherein monomers having four or more carbon atoms are present at from 0 to 3 mol %; and/or
    iv) propylene oligomer, comprising at least 50 mol % propylene, from 0.1 to 45 mol % ethylene, and from 0.1 to 5 mol % C4 to C12 olefin, wherein the oligomer has: at least 87% allyl chain ends (alternately at least 90%), an Mn of about 150 to about 10,000 g/mol, and an isobutyl chain end to allylic vinyl group ratio of 0.8:1 to 1.35:1.0; and/or
    v) propylene oligomer, comprising at least 50 mol % propylene, from 0.1 to 45 wt % ethylene, and from 0.1 to 5 mol % diene, wherein the oligomer has: at least 90% allyl chain ends, an Mn of about 150 to about 10,000 g/mol, and an isobutyl chain end to allylic vinyl group ratio of 0.7:1 to 1.35:1.0; and/or
    vi) a homooligomer, comprising propylene, wherein the oligomer has: at least 93% allyl chain ends, an Mn of about 500 to about 20,000 g/mol, an isobutyl chain end to allylic vinyl group ratio of 0.8:1 to 1.2:1.0, and less than 1400 ppm aluminum.

13. The polymacromonomer of paragraph 12 wherein the macromonomer is a propylene co-oligomer having an Mn of 300 to 30,000 g/mol comprising 10 to 90 mol % propylene and 10 to 90 mol % of ethylene, wherein the oligomer has at least X % allyl chain ends (relative to total unsaturations), where: 1) X=(−0.94 (mol % ethylene incorporated)+100), when 10 to 60 mol % ethylene is present in the co-oligomer, and 2) X=45, when greater than 60 and less than 70 mol % ethylene is present in the co-oligomer, and 3) X=(1.83*(mol % ethylene incorporated)−83), when 70 to 90 mol % ethylene is present in the co-oligomer;

14. The polymacromonomer of any of paragraphs 1 to 13 wherein the macromonomers are liquid at 25° C.

15. A process to produce the polymacromonomers of paragraphs 1 to 14 comprising contacting macromonomer and up to 40 wt % of $C_2$ to $C_{18}$ comonomer with a catalyst system capable of polymerizing vinyl terminated macromonomer, wherein the macromonomer has:
  1) from 20 to 800 carbon atoms,
  2) an Mn of 280 g/mol or more,
  3) an Mw of 400 g/mol or more,
  4) an Mz of 600 g/mol or more,
  5) an Mw/Mn of 1.5 or more,
  6) at least 70% vinyl termination (as measured by $^1$H NMR) relative to total unsaturations,
  7) a melting point Tm of 60° C. or more or an Hm of 20 J/g or less, and
  8) less than 20 wt % aromatic containing monomer;
under polymerization conditions of a temperature of 60 to 130° C. and a reaction time of 1 to 90 minutes, wherein the molar ratio of all comonomer present in the reactor to all macromonomer present in the reactor is 3:1 or less and where conversion of macromonomer to polymacromonomer is 70 wt % or more;
and
obtaining a polymacromonomer having:
  a) a g value of less than 0.6,
  b) an Mw of greater than 30,000 g/mol,
  c) an Mn of greater than 20,000 g/mol,
  d) a branching index $(g')_{vis}$ of less than 0.5, and
  e) a melting point of 50° C. or more or an Hm of 20 J/g or less,
  f) less that 25% vinyl termination (as measured by $^1$H NMR) relative to total unsaturations,
  g) at least 70 wt % macromonomer, based upon the weight of the polymacromonomer, and
  h) from 0 to 20 wt % aromatic containing monomer, based upon the weight of the polymacromonomer.

16. The process of paragraph 15 wherein the degree of polymerization of the polymacomer is 6 or more.

17. The process of paragraph 15 wherein the degree of polymerization of the polymacomer is 100 or more.

18. The process of paragraph 15, 16, or 17 wherein the catalyst system capable of polymerizing vinyl terminated mac romonomer comprises the compound represented by the formula:

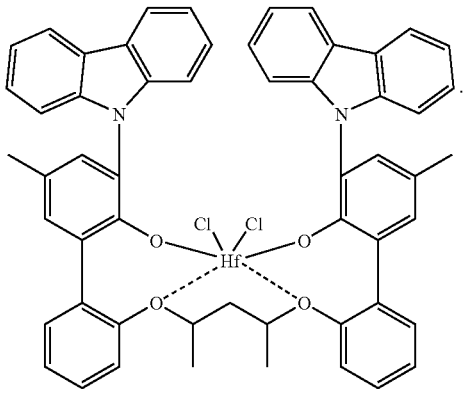

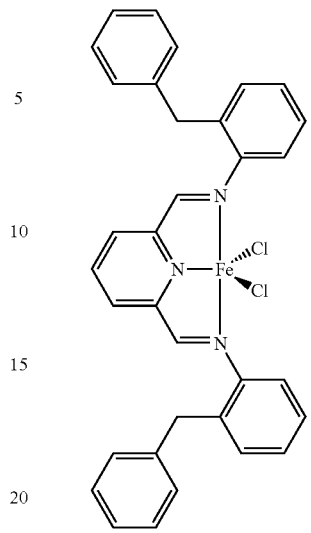

19. The process of paragraph 15, 16, 17, or 18 wherein the catalyst system capable of polymerizing vinyl terminated macromonomer comprise one or more of:

dimethylsilyl (cyclopentadienyl) (cyclododecylamido)titanium dimethyl, dibenzylmethyl(cyclopentadienyl)(fluorenyl)hafnium dimethyl, diphenylmethyl(cyclopentadienyl) (fluorenyl)hafnium dimethyl, dimethylgermanium bisindenyl hafnium dimethyl, rac-dimethylsilyl (2-methyl-4-phenylindenyl)zirconium dichloride, rac-dimethylsilyl (2-methyl-4-phenylindenyl)zirconium dimethyl, rac-dimethylsilyl (2-methyl-4-phenylindenyl)hafnium dichloride, rac-dimethylsilyl (2-methyl-4-phenylindenyl)hafnium dimethyl, rac-dimethylsilyl bis(indenyl)hafnium dimethyl, rac-dimethylsilyl bis(indenyl)hafnium dichloride, rac-dimethylsilyl bis (indenyl)ziconium dimethyl, rac-dimethylsilyl bis(indenyl) zirconium dichlorider, ac-dimethylsilanediylbis(2-methylindenyl)metal dichloride; rac-dimethylsilanediylbis (indenyl)metal dichloride; rac-dimethylsilanediylbis (indenyl)metal dimethyl; rac-dimethylsilanediylbis (tetrahydroindenyl)metal dichloride; rac-dimethylsilanediylbis(tetrahydroindenyl)metal dimethyl; rac-dimethylsilanediylbis(indenyl)metal diethyl; and rac-dibenzylsilanediylbis(indenyl)metal dimethyl; wherein the metal is chosen from Zr, Hf, or Ti.

20. The process of claim any of paragraphs 15 to 19 wherein the catalyst system capable of polymerizing vinyl terminated macromonomer comprises one or more of: dimethylanilini-umtetrakis(pentafluorophenyl)borate, N,N-dimethylanilinium tetra(perfluorophenyl)borate, triphenylcarbonium perfluorotetraphenylborate, dimethylanilinium perfluorotet-ranaphthylborate, 4-tert-butylanilinium bis(pentafluorophenyl)bis(perfluoro-2-napthyl)borate, 4-tert-butylanilinium (pentafluorophenyl)tris(perfluoro-2-napthyl)borate, dimethylanilinium tetrakis(perfluoro-2-napthyl)borate, dimethylanilinium tetrakis(3,5(pentafluorophenyl)perfluorophenylborate); and tris-perfluorophenyl boron.

21. The process of any of paragraphs 15 to 20 further comprising preparing the macromonomer by contacting monomer with a catalyst system comprising activator and catalyst represented by the formula:

or rac-Me$_2$Si-bis(2-R-indenyl)MX$_2$ or rac-Me$_2$Si-bis(2-R,4-Ph-indenyl)MX$_2$,
where R is an alkyl group, Ph is phenyl or substituted phenyl, M is Hf, Zr or Ti, and X is a halogen or alkyl group.

22. A process to produce polymacromonomers comprising contacting macromonomer and up to 40 wt % of $C_2$ to $C_{18}$ comonomer with a catalyst system capable of polymerizing vinyl terminated macromonomer, wherein the macromonomer is produced by homogenous process for making the propylene co-oligomer of paragraph 12 or 13, said process having productivity of at least $4.5 \times 10^3$ g/mmol/hr, wherein the process comprises:

contacting, at a temperature of from 35° C. to 150° C., propylene, 0.1 to 70 mol % ethylene and from 0 to about 5 wt % hydrogen in the presence of a catalyst system comprising an activator and at least one metallocene compound represented by the formula I, II, III, or IV above: where Hf is hafnium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);

each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms); each $R^1$ is, independently, a $C_1$ to $C_8$ alkyl group, preferably a $C_1$ to $C_8$ linear alkyl group, preferably methyl ethyl, propyl, butyl, pentyl, hexyl, heptyl or octyl, $R^1$ may the same or different as $R^2$;

each $R^2$ is, independently, a $C_1$ to $C_8$ alkyl group, preferably a $C_1$ to $C_8$ linear alkyl group, preferably methyl ethyl, propyl, butyl, pentyl, hexyl, heptyl or octyl, preferably $R^1$ and/or $R^2$ are not branched;

each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that at least three $R^3$ groups are not hydrogen (alternately four $R^3$ groups are not hydrogen, alternately five $R^3$ groups are not hydrogen);

each R⁴ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted $C_1$ to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);

$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;

$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;

each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);

N is nitrogen;

T is a bridge, preferably, Si or Ge, preferably Si;

each $R^a$, is independently, hydrogen, halogen or a C1 to C20 hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system;

and further provided that any two adjacent R groups may form a fused ring or multicenter fused ring system where the rings may be aromatic, partially saturated or saturated.

23. A process to produce polymacromonomers comprising contacting macromonomer and up to 40 wt % of $C_2$ to $C_{18}$ comonomer with a catalyst system capable of polymerizing vinyl terminated macromonomer, wherein the macromonomer is produced by a homogenous process for making the propylene homo-oligomer of paragraph 12 or 13, said process having a productivity of at least $4.5 \times 10^6$ g/mol/min, wherein the process comprises:

contacting, at a temperature of from 30° C. to 120° C., propylene, 0 mol % comonomer and from 0 to about 5 wt % hydrogen in the presence of a catalyst system comprising an activator and at least one metallocene compound represented by the formula I, II, III, or IV above: where Hf is hafnium;

each X is, independently, selected from the group consisting of hydrocarbyl radicals having from 1 to 20 carbon atoms, hydrides, amides, alkoxides, sulfides, phosphides, halogens, dienes, amines, phosphines, ethers, or a combination thereof, preferably methyl, ethyl, propyl, butyl, phenyl, benzyl, chloride, bromide, iodide, (alternately two X's may form a part of a fused ring or a ring system);

each Q is, independently carbon or a heteroatom, preferably C, N, P, S (preferably at least one Q is a heteroatom, alternately at least two Q's are the same or different heteroatoms, alternately at least three Q's are the same or different heteroatoms, alternately at least four Q's are the same or different heteroatoms);

each $R^1$, is independently, a $C_1$ to $C_8$ alkyl group, preferably a $C_1$ to $C_8$ linear alkyl group, preferably methyl ethyl, propyl, butyl, pentyl, hexyl, heptyl or octyl, $R^1$ may the same or different as $R^2$;

each $R^2$ is, independently, a $C_1$ to $C_8$ alkyl group, preferably a $C_1$ to $C_8$ linear alkyl group, preferably methyl ethyl, propyl, butyl, pentyl, hexyl, heptyl or octyl, preferably $R^1$ and/or $R^2$ are not branched;

each $R^3$ is, independently, hydrogen, or a substituted or unsubstituted hydrocarbyl group having from 1 to 8 carbon atoms, preferably 1 to 6 carbon atoms, preferably a substituted or unsubstituted $C_1$ to $C_8$ linear alkyl group, preferably methyl ethyl, propyl, butyl, pentyl, hexyl, heptyl, octyl, provided however that: 1) all five $R^3$ groups are methyl, or 2) four $R^3$ groups are not hydrogen and at least one $R^3$ group is a $C_2$ to $C_8$ substituted or unsubstituted hydrocarbyl (preferably at least two, three, four or five $R^3$ groups are a $C_2$ to $C_8$ substituted or unsubstituted hydrocarbyl);

each R⁴ is, independently, hydrogen or a substituted or unsubstituted hydrocarbyl group, a heteroatom or heteroatom containing group, preferably a substituted or unsubstituted hydrocarbyl group having from 1 to 20 carbon atoms, preferably 1 to 8 carbon atoms, preferably a substituted or unsubstituted C1 to $C_8$ linear alkyl group, preferably methyl ethyl, propyl, butyl, pentyl, hexyl, heptyl, octyl, substituted phenyl (such as propyl phenyl), phenyl, silyl, substituted silyl, (such as $CH_2SiR'$, where R' is a $C_1$ to $C_{12}$ hydrocarbyl, such as methyl, ethyl, propyl, butyl, phenyl);

$R^5$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;

$R^6$ is hydrogen or a $C_1$ to $C_8$ alkyl group, preferably a $C_1$ to $C_8$ linear alkyl group, preferably methyl, ethyl, propyl, butyl, pentyl, hexyl, heptyl or octyl;

each $R^7$ is, independently, hydrogen, or a $C_1$ to $C_8$ alkyl group, preferably a $C_1$ to $C_8$ linear alkyl group, preferably methyl ethyl, propyl, butyl, pentyl, hexyl, heptyl or octyl, provided however that at least seven $R^7$ groups are not hydrogen, alternately at least eight $R^7$ groups are not hydrogen, alternately all $R^7$ groups are not hydrogen, (preferably the $R^7$ groups at the 3 and 4 positions on each Cp ring of Formula IV are not hydrogen);

N is nitrogen;

T is a bridge, preferably, Si or Ge, preferably Si;

each $R^a$, is independently, hydrogen, halogen or a C1 to C20 hydrocarbyl, such as methyl, ethyl, propyl, butyl, pentyl, hexyl, heptyl, octyl, phenyl, benzyl, substituted phenyl, and two $R^a$ can form a cyclic structure including aromatic, partially saturated, or saturated cyclic or fused ring system;

and further provided that any two adjacent R groups may form a fused ring or multicenter fused ring system where the rings may be aromatic, partially saturated or saturated.

EXPERIMENTAL

All molecular weights are number average in g/mol unless otherwise noted.

Materials

Catalyst 1 is 1,1'diphenylmethylene(cyclopentadienyl)(fluorenyl)hafnium dimethyl, Catalyst 2 is rac-dimethylsilylbis(indenyl)hafnium dimethyl, Catalyst 3 is rac-dimethylsilylbis(2-methyl 4-phenyl indenyl) hafnium dimethyl, Catalyst 4 is:

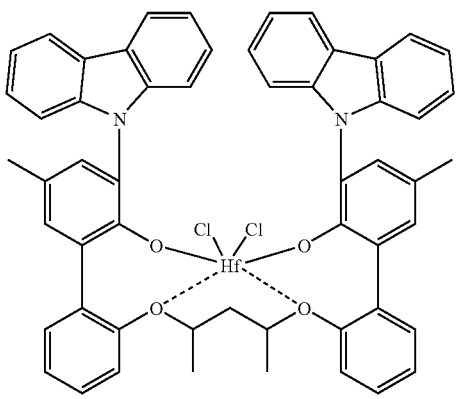

Catalyst 5 is:

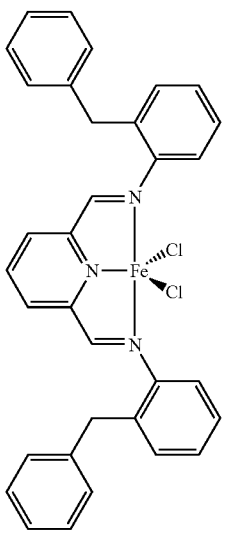

Catalyst 4 was prepared according to the procedures in U.S. Pat. No. 7,126,031. Catalyst 5 was prepared and purified according to the procedure in G. J. P. Britovsek, V. C. Gibson, S. J. McTavish, G. A. Solan, B. S. Kimberley, P. J. Maddox, A. J. P. White, Williams, Chem. Comm. 1998, 849.

Activator A is N,N-dimethylanilinium tetra(perfluorophenyl)borate.

Activator B is methylalumoxane (30 wt % in toluene) purchased from Albemarle.

Characterization

Gel Permeation Chromotography

Mw, Mz number of carbon atoms, g value and $g'_{vis}$ are determined by using a High Temperature Size Exclusion Chromatograph (either from Waters Corporation or Polymer Laboratories), equipped with three in-line detectors, a differential refractive index detector (DRI), a light scattering (LS) detector, and a viscometer. Experimental details, including detector calibration, are described in: T. Sun, P. Brant, R. R. Chance, and W. W. Graessley, Macromolecules, Volume 34, Number 19, 6812-6820, (2001) and references therein. Three Polymer Laboratories PLgel 10 mm Mixed-B LS columns are used. The nominal flow rate is 0.5 cm³/min, and the nominal injection volume is 300 µL. The various transfer lines, columns and differential refractometer (the DRI detector) are contained in an oven maintained at 145° C. Solvent for the experiment is prepared by dissolving 6 grams of butylated hydroxy toluene as an antioxidant in 4 liters of Aldrich reagent grade 1, 2, 4 trichlorobenzene (TCB). The TCB mixture is then filtered through a 0.7 µm glass pre-filter and subsequently through a 0.1 µm Teflon filter. The TCB is then degassed with an online degasser before entering the Size Exclusion Chromatograph. Polymer solutions are prepared by placing dry polymer in a glass container, adding the desired amount of TCB, then heating the mixture at 160° C. with continuous agitation for about 2 hours. All quantities are measured gravimetrically. The TCB densities used to express the polymer concentration in mass/volume units are 1.463 g/ml at room temperature and 1.324 g/ml at 145° C. The injection concentration is from 0.75 to 2.0 mg/ml, with lower concentrations being used for higher molecular weight samples. Prior to running each sample the DRI detector and the injector are purged. Flow rate in the apparatus is then increased to 0.5 ml/minute, and the DRI is allowed to stabilize for 8 to 9 hours before injecting the first sample. The LS laser is turne on 1 to 1.5 hours before running the samples. The concentration, c, at each point in the chromatogram is calculated from the baseline-subtracted DRI signal, $I_{DRI}$, using the following equation:

$$c = K_{DRI} I_{DRI}/(dn/dc)$$

where $K_{DRI}$ is a constant determined by calibrating the DRI, and (dn/dc) is the refractive index increment for the system. The refractive index, n=1.500 for TCB at 145° C. and λ=690 nm. For purposes of this invention and the claims thereto (dn/dc)=0.104 for propylene polymers, 0.098 for butene polymers and 0.1 otherwise. Units on parameters throughout this description of the SEC method are such that concentration is expressed in g/cm³, molecular weight is expressed in g/mole, and intrinsic viscosity is expressed in dL/g.

The LS detector is a Wyatt Technology High Temperature mini-DAWN. The molecular weight, M, at each point in the chromatogram is determined by analyzing the LS output using the Zimm model for static light scattering (M. B. Huglin, LIGHT SCATTERING FROM POLYMER SOLUTIONS, Academic Press, 1971):

$$\frac{K_o c}{\Delta R(\theta)} = \frac{1}{MP(\theta)} + 2A_2 c$$

Here, $\Delta R(\theta)$ is the measured excess Rayleigh scattering intensity at scattering angle θ, c is the polymer concentration determined from the DRI analysis, $A_2$ is the second virial coefficient [for purposes of this invention, $A_2$=0.0006 for propylene polymers, 0.0015 for butene polymers and 0.001 otherwise], (dn/dc)=0.104 for propylene polymers, 0.098 for butene polymers and 0.1 otherwise, $P(\theta)$ is the form factor for a monodisperse random coil, and $K_o$ is the optical constant for the system:

$$K_o = \frac{4\pi^2 n^2 (dn/dc)^2}{\lambda^4 N_A}$$

where $N_A$ is Avogadro's number, and (dn/dc) is the refractive index increment for the system. The refractive index, n=1.500 for TCB at 145° C. and λ=690 nm.

A high temperature Viscotek Corporation viscometer, which has four capillaries arranged in a Wheatstone bridge configuration with two pressure transducers, is used to determine specific viscosity. One transducer measures the total pressure drop across the detector, and the other, positioned between the two sides of the bridge, measures a differential pressure. The specific viscosity, $\eta_s$, for the solution flowing through the viscometer is calculated from their outputs. The intrinsic viscosity, $[\eta]$, at each point in the chromatogram is calculated from the following equation:

$$\eta_s = c[\eta] + 0.3(c[\eta])^2$$

where c is concentration and was determined from the DRI output.

The branching index ($g'_{vis}$) is calculated using the output of the SEC-DRI-LS-VIS method as follows. The average intrinsic viscosity, $[\eta]_{avg}$, of the sample is calculated by:

$$[\eta]_{avg} = \frac{\sum c_i [\eta]_i}{\sum c_i}$$

where the summations are over the chromatographic slices, i, between the integration limits. The branching index $g'_{vis}$ is defined as:

$$g'vis = \frac{[\eta]_{avg}}{k M_v^\alpha}$$

where, for purpose of this invention and claims thereto, $\alpha=0.695$ and $k=0.000579$ for linear ethylene polymers, $\alpha=0.705$ $k=0.000262$ for linear propylene polymers, and $\alpha=0.695$ and $k=0.000181$ for linear butene polymers. $M_v$ is the viscosity-average molecular weight based on molecular weights determined by LS analysis.

"g" also called a "g value" is defined to be $Rg^2_{pm}/Rg^2_{ls}$, where $Rg_{pm}$ is the radius of gyration for the polymacromer, $Rg^2_{ls}$ is the radius of gyration for the linear standard, and $Rg_{ls} = K_s M^{0.58}$ where $K_s$ is the power law coefficient (0.023 for linear polyethylene, 0.0171 for linear polypropylene, and 0.0145 for linear polybutene), and M is the molecular weight as described above, $Rg_{pm} = K_T M^{\alpha_s}$. $\alpha_s$ is the size coefficient for the polymacromer, $K_T$ is the power law coefficient for the polymacromer. See Macromolecules, 2001, 34, 6812-6820, for guidance on selecting a linear standards having the molecular weight and comonomer content, and determining K coefficients and α exponents.

$^{13}$C NMR $^{13}$C NMR data was collected at 120° C. in a 10 mm probe using a Varian spectrometer with a Hydrogen frequency of at least 400 MHz. A 90 degree pulse, an acquisition time adjusted to give a digital resolution between 0.1 and 0.12 Hz, at least a 10 second pulse acquisition delay time with continuous broadband proton decoupling using swept square wave modulation without gating was employed during the entire acquisition period. The spectra were acquired using time averaging to provide a signal to noise level adequate to measure the signals of interest. Samples were dissolved in tetrachloroethane-$d_2$ at concentrations between 10 to 15 wt % prior to being inserted into the spectrometer magnet. Prior to data analysis spectra were referenced by setting the chemical shift of the $(-CH_2-)_n$ signal where n>6 to 29.9 ppm. Chain ends for quantization were identified using the signals shown in the table below. N-butyl and n-propyl were not reported due to their low abundance (less than 5%) relative to the chain ends shown in the table below.

| Chain End | $^{13}$CNMR Chemical Shift |
|---|---|
| P~i-Bu | 23-5 to 25.5 and 25.8 to 26.3 ppm |
| E~i-Bu | 39.5 to 40.2 ppm |
| P~Vinyl | 41.5 to 43 ppm |
| E~Vinyl | 33.9 to 34.4 ppm |

Polypropylene microstructure is determined by $^{13}$C-NMR spectroscopy, including the concentration of isotactic and syndiotactic diads ([m] and [r]), triads ([mm] and [rr]), and pentads ([mmmm] and [rrrr]). The designation "m" or "r" describes the stereochemistry of pairs of contiguous propylene groups, "m" referring to meso and "r" to racemic. Samples are dissolved in $d_2$-1,1,2,2-tetrachloroethane, and spectra recorded at 125° C. using a 100 MHz (or higher) NMR spectrometer. Polymer resonance peaks are referenced to mmmm=21.8 ppm. Calculations involved in the characterization of polymers by NMR are described by F. A. Bovey in POLYMER CONFORMATION AND CONFIGURATION (Academic Press, New York 1969) and J. Randall in POLYMER SEQUENCE DETERMINATION, $^{13}$C-NMR METHOD (Academic Press, New York, 1977).

The "propylene tacticity index", expressed herein as [m/r], is calculated as defined in H. N. Cheng, Macromolecules, 17, 1950 (1984). When [m/r] is 0 to less than 1.0, the polymer is generally described as syndiotactic, when [m/r] is 1.0 the polymer is atactic, and when [m/r] is greater than 1.0 the polymer is generally described as isotactic.

The "mm triad tacticity index" of a polymer is a measure of the relative isotacticity of a sequence of three adjacent propylene units connected in a head-to-tail configuration. More specifically, in the present invention, the mm triad tacticity index (also referred to as the "mm Fraction") of a polypropylene homopolymer or copolymer is expressed as the ratio of the number of units of meso tacticity to all of the propylene triads in the copolymer:

$$mm \text{ Fraction} = \frac{PPP(mm)}{PPP(mm) + PPP(mr) + PPP(rr)}$$

where PPP(mm), PPP(mr) and PPP(rr) denote peak areas derived from the methyl groups of the second units in the possible triad configurations for three head-to-tail propylene units, shown below in Fischer projection diagrams:

PPP(mm):

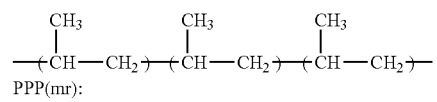

PPP(mr):

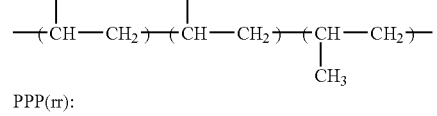

PPP(rr):

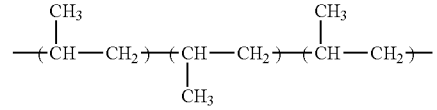

The calculation of the mm Fraction of a propylene polymer is described in U.S. Pat. No. 5,504,172 (homopolymer: column 25, line 49 to column 27, line 26; copolymer: column 28, line 38 to column 29, line 67). For further information on how the mm triad tacticity can be determined from a $^{13}$C-NMR spectrum, see 1) J. A. Ewen, CATALYTIC POLYMERIZATION OF OLEFINS: PROCEEDINGS OF THE INTERNATIONAL SYMPOSIUM ON FUTURE ASPECTS OF OLEFIN POLYMERIZATION, T. Keii and K. Soga, Eds. (Elsevier, 1986), pp. 271-292; and 2) U.S. Patent Application US2004/054086 (paragraphs [0043] to [0054]).

$^1$H NMR $^1$H NMR data was collected at either room temperature or 120° C. (for purposes of the claims, 120° C. shall be used) in a 5 mm probe using a Varian spectrometer with a $^1$Hydrogen frequency of at least 400 MHz. Data was recorded using a maximum pulse width of 45°, 8 seconds between pulses and signal averaging 120 transients. Spectral signals were integrated and the number of unsaturation types per 1000 carbons was calculated by multiplying the different groups by 1000 and dividing the result by the total number of carbons.

The $^1$HNMR chemical shift regions for the olefin types are defined to be between the following spectral regions.

| Unsaturation Type | Region (ppm) | Number of hydrogens per structure |
|---|---|---|
| Vinyl | 4.95-5.10 | 2 |
| Vinylidene | 4.70-4.84 | 2 |
| Vinylene | 5.31-5.55 | 2 |
| Trisubstituted | 5.11-5.30 | 1 |

Differential Scanning Calorimetry (DSC)

Crystallization temperature ($T_c$), melting temperature (or melting point, $T_m$), glass transition temperature ($T_g$) and heat of fusion ($H_f$) are measured using Differential Scanning Calorimetry (DSC) on a commercially available instrument (e.g., TA Instruments 2920 DSC). Typically, 6 to 10 mg of molded polymer or plasticized polymer are sealed in an aluminum pan and loaded into the instrument at room temperature. Data are acquired by heating the sample to at least 30° C. above its melting temperature, typically 220° C. for polypropylene, at a heating rate of 10° C./min. The sample is held for at least 5 minutes at this temperature to destroy its thermal history. Then the sample is cooled from the melt to at least 50° C. below the crystallization temperature, typically –100° C. for polypropylene, at a cooling rate of 20° C./min. The sample is held at this temperature for at least 5 minutes, and finally heated at 10° C./min to acquire additional melting data (second heat). The endothermic melting transition (first and second heat) and exothermic crystallization transition are analyzed according to standard procedures. The melting temperatures (Tm) reported are the peak melting temperatures from the second heat unless otherwise specified. For polymers displaying multiple peaks, the melting temperature is defined to be the peak melting temperature from the melting trace associated with the largest endothermic calorimetric response (as opposed to the peak occurring at the highest temperature). Likewise, the crystallization temperature is defined to be the peak crystallization temperature from the crystallization trace associated with the largest exothermic calorimetric response (as opposed to the peak occurring at the highest temperature).

Areas under the DSC curve are used to determine the heat of transition (heat of fusion, $H_f$, upon melting or heat of crystallization, $H_c$, upon crystallization), which can be used to calculate the degree of crystallinity (also called the percent crystallinity). The percent crystallinity (X %) is calculated using the formula: [area under the curve (in J/g)/H° (in J/g)]*100, where H° is the ideal heat of fusion for a perfect crystal of the homopolymer of the major monomer component. These values for H° are to be obtained from the *Polymer Handbook, Fourth Edition*, published by John Wiley and Sons, New York 1999, except that a value of 290 J/g is used for H°(polyethylene), a value of 140 J/g is used for H° (polybutene), and a value of 207 J/g is used for H°(polypropylene).

Heat of melting (Hm) is determined using the DSC procedure above except that the sample is cooled to –100° C., held for 5 minutes then heated at 10° C./min to 200° C. Hm is measured on the first melt, no the second melt. The Hm sample must have been aged at least 48 hours at room temperature and should not be heated to destroy thermal history.

Ethylene Content

Ethylene content in ethylene copolymers is determined by ASTM D 5017-96, except that the minimum signal-to-noise should be 10,000:1. Propylene content in propylene copolymers is determined by following the approach of Method 1 in Di Martino and Kelchermans, *J. Appl. Polym. Sci.* 56, 1781 (1995), and using peak assignments from Zhang, *Polymer* 45, 2651(2004) for higher olefin comonomers.

Example 1

Three vinyl-PE-Macromonomers were prepared using Catalyst 5 and Activator B. Catalyst solutions were prepared in a nitrogen purged Vacuum Atmospheres dry box by adding nearly equimolar (1.00:1.05) quantities of the iron complex and activator to 4 mL dry toluene in a 10 mL glass vial. The mixture was stirred for 5 min. and then transferred to a clean, oven dried catalyst tube. The basic polymerization procedure for synthesis of vinyl $PE_{mac}$-1 is as follows: 2 mL 25 wt % Tri n-octylaluminum-in-hexanes scavenger and 400 mL hexanes were added to a 2 L stainless steel autoclave reactor. The reactor was heated to 100° C. During this time the catalyst tube was attached to the reactor. Once the reactor temperature equilibrated at 100° C., the catalyst solution was flushed from the catalyst tube into the reactor with 300 mL hexanes. Following this addition, the reactor was pressurized with 200 psig ethylene. In this example, polymerization was carried out for 12 minutes, after which time the reactor was cooled and depressurized. Once the reactor was depressurized, yet maintained under positive pressure via a gentle dry nitrogen flush, this polyethylene macromonomer product was cannulated into septum sealed vials using a slight nitrogen gas overpressure. The charged vials were transferred into the purged Vacuum Atmospheres dry box. PEmac-2 and PEmac-3 were produced following the same polymerization process, unless noted otherwise. Table A lists polymerization conditions used for preparing the macromonomers.

TABLE A

Syntheses of Vinyl-PE Macromonomers with Catalyst 5/Activator B

| Sample | Time, min. | Temp, (° C.) | Yield, g | Productivity, g/mmol/hr |
|---|---|---|---|---|
| $PE_{mac}$-1 | 12 | 100 | 25 | 155 |
| $PE_{mac}$-2 | 30 | 80 | 45 | 1395 |
| $PE_{mac}$-3 | 60 | 60 | 100 | 3100 |

The properties of these three macromonomers are listed in Table B.

TABLE B

Properties of Vinyl-PE Macromonomers

| $PE_{mac}$ | $^1$H NMR | | GPC-DRI, PE Std | | | DSC Tm, °C. ($\Delta$H, J/g) |
|---|---|---|---|---|---|---|
| | $M_N$ | % vinyl | $M_N$ | $M_W$ | $M_Z$ | |
| $PE_{mac}$-1 | 536 | 93 | 240 | 434 | 751 | 76.6, (184) |
| $PE_{mac}$-2 | 1129 | 93 | 1019 | 4100 | 87,175 | 77.9, (128.8) |
| $PE_{mac}$-3 | 688 | 94 | 489 (862)[a] | 3793 (3793)[a] | 235,395 (241,617)[a] | 120.5, (199.5) |

[a]Light scattering values from GPC-3D; g' = 1.00 (versus PE std), data in this table from second melt.

Example 2

Polymerizations with $PE_{mac}$'s were done inside a purged Vacuum Atmospheres dry box. The basic polymerization procedure follows: 2.0 g. of $PE_{mac}$ was placed into an oven dried 10 mL glass vial along with a Teflon coated stir bar. The vial was then heated to 85° C. (above the melting point of this $PE_{mac}$) on a hot plate. Once the $PE_{mac}$ was molten, catalyst and activator were added. In several examples no further solvent was added. The contents of the vial are stirred for 1 hour on the hot plate and then cooled to ambient temperature. A summary of polymerizations carried out using the three $PE_{mac}$'s is provided in Table C.

TABLE C

Summary of $PE_{brush}$ Syntheses Using $PE_{mac}$

| Example | $PE_{mac}$ | Catalyst | Act | Cat/Activator (mg)[a] | $T_p$. (C.) | Time (min) | Condition |
|---|---|---|---|---|---|---|---|
| 1 | 1 | 1 | A | 2/3 | 85 | 60 | Neat |
| 2 | 1 | 4/MAO | A | 2/0.2/1.6 | 85 | 120 | Neat |
| 3 | | 4MAO | A | 2/1/2 | 110 | 60 | Toluene |
| 4 | 3 repeat | 4/MAO | A | 20/0.2/16.1 | 120 | 30 | Neat |
| 5 | 3 | 2 | A | 2/3.4 | 165 | 60 | Neat |
| 6 | 3 | 1 | A | 2/3.0 | 195 | 60 | Neat |
| 7 | 3 | 1 | A | 2/3.0 | 195 | 30 | Neat |
| 8 | 3 | 3 | B | 2/1 | 195 | 60 | Toluene |
| 9 | 3 | 3 | B | 2/1 | 115 | 60 | Neat |

[a]Value in italics is volume of MAO in mL added in addition to Activator A.

TABLE D $^1$H NMR Unsaturation Analysis

| | $PE_{mac}$-1 | Example 2t |
|---|---|---|
| | Olefinic Groups per 1000 Carbons* | |
| Vinyl | 30.8 | Not Detected |
| Vinylene | 0.9 | 1.0 |
| Vinylidene | Not Detected | Not Detected |
| Trisubstituted | Not Detected | Not Detected |

A summary is provided in Table E of the $^1$H NMR results recorded for the eight polymerizations with $PE_{mac}$'s. The percentage of total unsaturations that are vinyls has decreased from the ~95% range to between 0 (not detected) and 25%. Accounting for the impacts of residual vinyls as well as unreacted vinylenes, we can calculate number average molecular weights for the brush structures, and these are also tabulated below.

TABLE E

Summary $^1$H NMR Results for Polymacromonomers ($PE_{brush}$)

| | (Unsat/1000 C.) | | | | | | $M_N$ |
|---|---|---|---|---|---|---|---|
| Example | vinylenes | olefins | vinyls | vinylidenes | % vinyls | DP* | $^1$H NMR* |
| 1 | 0.91 | 0.20 | 0.04 | 0.36 | 2.7 | 340 | 9,524 |
| 2 | 1.03 | 0.07 | 0.00 | 0.00 | 0.00 | 456 | 12,727 |
| 3 | 0.60 | 0.17 | 0.26 | 0.01 | 25 | 641 | 17,949 |
| 53 | 1.48 | 1.15 | 0.03 | 0.09 | 1 | 184 | 5147 |
| 6 | 1.32 | 0.57 | 0.47 | 0.62 | 16 | 199 | 5577 |
| 7 | 1.49 | 0.65 | 0.64 | 0.80 | 18 | 170 | 4762 |
| 9 | 0.63 | 0.25 | 0.09 | 0.45 | 6 | 376 | 10526 |
| 8 | 1.48 | 1.15 | 0.03 | 0.09 | 1 | 184 | 5147 |

*Degree of Polymerization corrected for residual vinyl and vinylene contributions from unconsumed $PE_{mac}$ The $^{13}$C NMR spectrum recorded for Example 1 is shown, along with major peak assignments, in FIG. 1. The peak resonance positions and assignments for Example 1 are organized in Table F. These assignments and intensities, within reasonable limitations, are consistent with the material being a product that has a branch on alternating carbons. Assignment nomenclature is described in FIG. 3.

TABLE F

| ppm* | Carbon Type** | Assignment | Integral Area*** |
|---|---|---|---|
| 41.04 | CH2 | $\alpha\alpha$ | 65 |
| 35.57 | CH2 | $\alpha\delta^+$ | 60 |
| 33.20 | CH | Branch Point | 60 |
| 32.22 | CH2 | 3S | 73 |
| 30.72 | CH2 | $\gamma\delta^+$ | 1620 |
| 29.98 | CH2 | $\delta^+\delta^+$ | |
| 29.59 | CH2 | 4S | |
| 26.99 | CH2 | $\beta\delta^+$ | 58 |
| 22.91 | CH2 | 2S | 81 |
| 14.24 | CH3 | 1S | 82 |

$^{13}$C NMR Spectral Assignments for Example 2
*Shifts relative to backbone methylene signal set to 29.98 ppm in tetrachloroethane-d2 at 120 C.
**From DEPT experiment
***Intensity from gated decoupling experiment (suppressed NOE)

Figure 3:
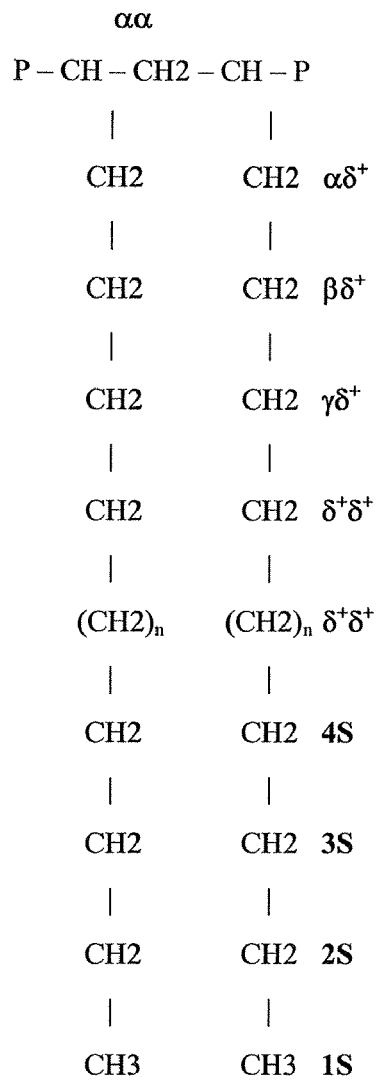
FIG. 3 is an illustration of a naming convention described herein.
Figure 4:
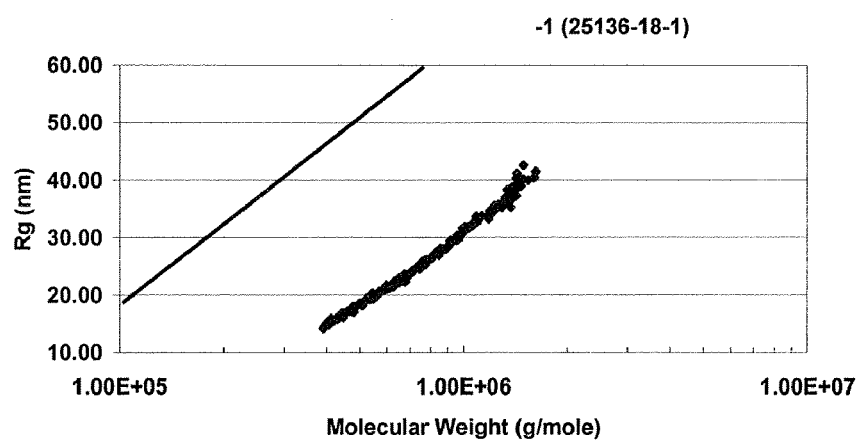
FIG. 4 is a graph of Rg versus MW for Example 2 as determined by GPC-MALLS.
Figure 5:
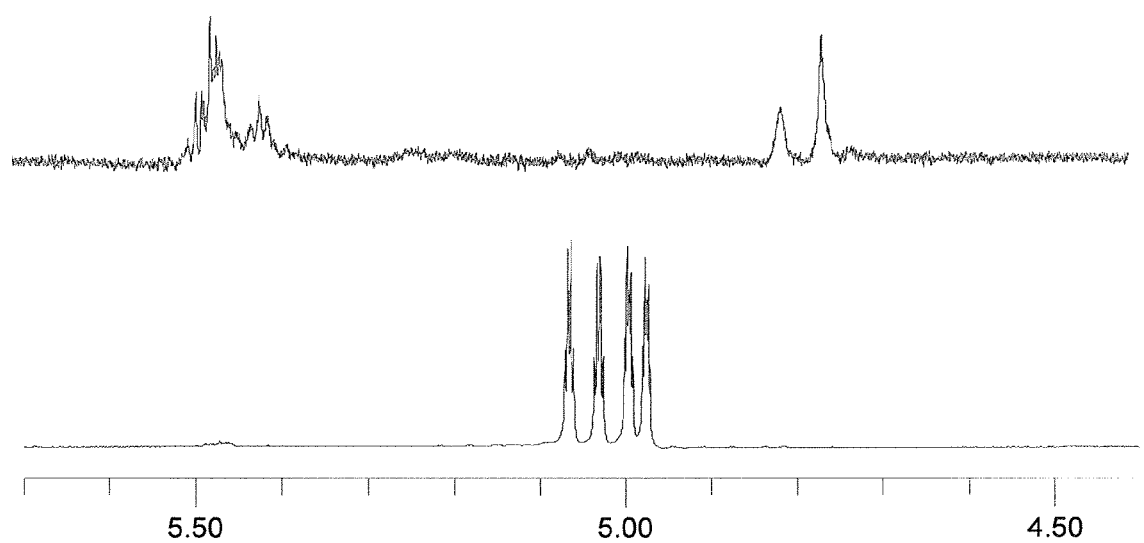
FIG. 5 is an overlay of the $^1HNMR$ spectra for $PE_{mac-1}$ (bottom) showing the vinyl groups and the $^1HNMR$ spectra for Example 1 showing the lack of vinyl groups.

Assignment Nomenclature:

Methylene carbons are identified by a pair of Greek letters or a number preceeding a S. The Greek symbols are used to indicate the number of carbons a methylene is from a methine in either direction. A + sign is used when the closest methine is 4 more carbons away from the methylene of interest. The 'S' terminology identifies carbons at or near the end of saturated n-alkyl chains. The number specifies how many carbons a methylene is from the terminal —CH$_3$ with the 1S carbon defined as the terminal carbon. FIG. 3 illustrates this particular naming convention.

TABLE G

GPC-3D Results for (PE$_{mac}$)$_x$ Brushes Made with PE$_{mac}$'s 1 and 3

| Example | $^1$H NMR brush | | Mol Wt Moments, DRI (Viscometry) | | | |
|---|---|---|---|---|---|---|
| | M$_N{}^a$ | % vinyl | M$_N$ | M$_W$ | M$_Z$ | g'$_{vis}$ |
| 1 | 9,524 | ~5 | 2,766 | 18,771 | 35,649 | 0.131 |
| | | | (29,525) | (55,732) | (101,875) | |
| 2 | 12,727 | ~0 | 4,802 | 56,259 | 139,819 | 0.122 |
| | | | (84,641) | (207,202) | (462,453) | |
| 11 | | 40 | 1,371 | 12,624 | 24,466 | — |
| 3 | 17,949 | 25 | 6,715 | 41,019 | 86,999 | 0.187 |
| | | | (52,631) | (111,907) | (198,094) | |
| 10 | | 50 | 3,325 | 18,227 | 80,842 | — |
| 5 | 5,147 | 1 | 3,177 | 8,356 | 35,673 | 0.50 |
| | | | (4420) | (10,600) | (46,288) | |
| 6 | 5,577 | 16 | 3,660 | 13,038 | 838,876 | 0.49 |
| | | | (6,149) | (13,689) | (103,392) | |
| 7 | 4,762 | 18 | 2,896 | 9,183 | 135,219 | 0.494 |
| | | | (6,691) | (11,491) | (63784) | |
| 9 | 10,526 | 6 | 1,595 | 10,640 | 28,794 | 0.370 |
| | | | (7,937) | (13,762) | (26,460) | |

In Table G, (g') vis is defined as g'=[η$_{polymacromonomer}$/η$_{linear\ HDPE}$] (1). Values span the range from 0.122 to 0.50. These values reflect the relative chain mass per unit volume. Due to their topology, the brushes are much more compact than polyethylene, and the smallest value of g'$_{vis}$ is comparable to those measured for poly(decene-1) and poly(dodecene-1).

Further Macromonomers were synthesized in a continuous polymerizations in a 0.5 liter stainless steel continuous autoclave reactor equipped with a stirrer, steam heating/water cooling element and a pressure controller. Solvent, macromonomer and comonomer (if any) are typically first chilled to −15° C. prior to entering a manifold, and then pumped into the reactor. The preactivated catalyst solution ((CpMe$_5$)((1, 3-dimethyl Ind)Hf Me$_2$ and N,N-dimethylanilinium tetra(p-erfluorophenyl)borate, where Cp=cyclopentadienyl, Me=methyl, Ind=indenyl) is fed into the reactor from a dry box through metering pumps in a separate line. Solvent (such as hexanes) are pumped into the reactor at a desired rate to control the residence time. The reactor was first fed with solvent, and heated to the desired temperature and controlled at a set pressure. The monomers and catalyst were then pumped into the reactor. Catalyst feed rate was constant at 2.23×10$^{-7}$ mol/min for all runs. The speed of the stirrer was high enough so the reactor was operated under continuous stirred tank reactor conditions. Polymer samples were collected for 20 minutes each in a collection box when the system reached steady state. Products were dried in a vacuum oven. Reactions were carried out at a pressure of 350 psig and in the temperature range of 70 to 90° C. A summary of the polymerizations and characterization data are provided in Tables H to L.

TABLE H

E-co-P Macromonomer Synthesis Conditions

| Example Number | Reaction temp (° C.) | Propylene feed rate (g/min) | Ethylene feed rate (SLPM) | Productivity (g poly/ g catalyst) | Conversion (%) |
|---|---|---|---|---|---|
| H-1 | 60 | 5.09 | 3 | 1773 | 57.9 |
| H-2 | 60 | 5.09 | 6 | 3887 | 93.8 |
| H-3 | 60 | 5.09 | 9 | 4971 | 93.3 |
| H-4 | 80 | 5.09 | 3 | 1639 | 55.4 |
| H-5 | 80 | 5.09 | 6 | 2890 | 69.7 |
| H-6 | 80 | 5.09 | 9 | 4802 | 90.1 |

TABLE I

Summary of Unsaturations in E-co-P Macromonomers Measured by $^1$H NMR

| | Unsat/1000 C. | | | | | | |
|---|---|---|---|---|---|---|---|
| Sample | vinylenes | olefins | vinyls | vinylidenes | % vinyls | DP$^a$ | MN$^a$ |
| H-1 | 0.06 | 0.13 | 16.36 | 0.35 | 96.8 | 19.7 | 828 |
| H-4 | 0.28 | 0.7 | 19.88 | 0.54 | 92.9 | 15.6 | 654 |

$^a$Calculated assuming one unsaturation per chain

TABLE J

Ethylene Content in E-P Macromonomer Products by $^1$H NMR

| | $^1$H NMR | |
|---|---|---|
| Sample | Mol fraction C$_2{}^=$ | Wt Fraction C$_2{}^=$ |
| H-1 | 0.72 | 0.63 |
| H-4 | 0.73 | 0.64 |

TABLE K

Molecular Weight Moments from GPC-DRI (LS) E-P Macromers

| | Wt % C$_2{}^{=a}$ | MN | MW | MZ | MWD | g'$_{vis}$ |
|---|---|---|---|---|---|---|
| H-1 | 63 | 465 | 1229 | 5069 | 2.65 | 0.678 |
| H-4 | 64 | 374 | 1035 | 4227 | 2.77 | 0.516 |

$^a$calculated from $^1$H NMR, g'vis relative to HDPE standard.

TABLE L

Differential Scanning Calorimetry Data

| Sample | Wt % C$_2{}^=$ | Crystallinity, melting endotherm |
|---|---|---|
| H-1 | 63 | Broad, sub-ambient peak |
| H-2 | 74 | Weak peak 110 C., broad peak ~50 C. |
| H-3 | 80 | Weak peaks 110, 120 C.; broad peak ~ 68 C. |
| H-4 | 64 | Broad, weak peak around 25 C. |
| H-5 | 78 | Weak peak 112 C.; Broad peak ~58 C. |
| H-6 | 83 | Weak peak ~111 C.; broad peak ~68 C. |

E-co-P Macromonomer Polymerization Reactions

Macromonomer was added to a solution of catalyst and activator in toluene (1,1'diphenylmethylene(cyclopentadienyl)(fluorenyl)hafnium dimethyl and N,N-dimethylanilinium tetra (perfluorophenyl)borate) All catalysts dissolved in toluene and simply added to the macromonomer at the designated polymerization temperature.

TABLE M

Polymerization with Macromers form Table H

| Macromer | Catalyst prep | µM | E-co-P Macromonomer | | Temperature, C. | Time, min |
| --- | --- | --- | --- | --- | --- | --- |
| | | | wt, g | mM vinyls | | |
| H-4 | | 3.32 | 2.18 g | 3.32 | 85 | 100 |
| H-4 | | 3.32 | 3.28 g | 5.01 | 85 | 100 |
| H-4 | | 3.32 | 4.36 g | 6.67 | 85 | 100 |

TABLE N

E-co-P Polymacromonomer Polymerization

| NB# | Wt % $C_2^-$ $^1$H NMR | GPC Mn | GPC Mw | GPC Mz | GPC g'(vis) |
| --- | --- | --- | --- | --- | --- |
| H-4 | 64 | 70101 | 132006 | 216733 | 0.125 |
| H-4 | 64 | 43164 | 83147 | 136449 | 0.132 |
| H-4 | 64 | 85470 | 157365 | 253983 | 0.125 | g'vis relative to linear standard EP coplymer having 64 wt % ethylene.

All documents described herein are incorporated by reference herein, including any priority documents and/or testing procedures to the extent they are not inconsistent with this text. As is apparent from the foregoing general description and the specific embodiments, while forms of the invention have been illustrated and described, various modifications can be made without departing from the spirit and scope of the invention. Accordingly, it is not intended that the invention be limited thereby. Likewise, the term "comprising" is considered synonymous with the term "including" for purposes of Australian law.

What is claimed is:

1. A polymacromonomer comprising at least one macromonomer and from 0 to 20 wt % of a $C_2$ to $C_{18}$ comonomer, wherein the macromonomer, prior to polymerization has:
   1) from 20 to 600 carbon atoms,
   2) an Mn of 280 g/mol or more,
   3) an Mw of 400 g/mol or more,
   4) an Mz of 600 g/mol or more,
   5) an Mw/Mn of 1.5 or more,
   6) vinyl termination of at least 70% (as determined by $^1$H NMR) relative to total unsaturations,
   7) a melting point (Tm) of 60° C. or more or an Hm of 20 J/g or less, and
   8) less than 10 wt % aromatic containing monomer, based upon the weight of the macromonomer; and
wherein the polymacromonomer has:
   a) a g value of less than 0.6,
   b) an Mw of greater than 30,000 g/mol,
   c) an Mn of greater than 20,000 g/mol,
   d) a branching index (g')$_{vis}$ of less than 0.5,
   e) a melting point of 50° C. or more or an Hm of 20 J/g or less,
   f) less than 25% vinyl terminations (as measured by $^1$H NMR) relative to total unsaturations,
   g) at least 70 wt % macromonomer, based upon the weight of the polymacromonomer, and
   h) from 0 to 20 wt % aromatic containing monomer, based upon the weight of the polymacromonomer.

2. The polymacromonomer of claim 1 wherein the polymacromonomer contains 0 wt % aromatic containing monomer.

3. The polymacromonomer of claim 1 wherein the polymacromonomer contains 0 wt % styrenic monomer.

4. The polymacromonomer of claim 1 wherein the macromonomer is isotactic.

5. The polymacromonomer of claim 1 wherein the polymacromonomer comprises at least 70 wt % macromonomer comprising at least 50 wt % propylene.

6. The polymacromonomer of claim 1 wherein the polymacromonomer comprises at least 70 wt % macromonomer comprising at least 50 wt % ethylene.

7. The polymacromonomer of claim 1 wherein the polymacromonomer comprises two or more different macromonomers.

8. The polymacromonomer of claim 7 wherein the macromonomers differ in molecular weight (Mw) by at least 200 g/mol.

9. The polymacromonomer of claim 7 wherein the first macromonomer has a melting point of 60° C. or more and the second macromonomer has an Hm of 20 J/g or less.

10. The polymacromonomer of claim 7 wherein the different macromonomers are one of the combinations in the table below:

| Macro-monomer | Vinyl-PE | Vinyl-aPP | Vinyl-iPP | Vinyl-EP | Vinyl-PS | Vinyl-pe |
| --- | --- | --- | --- | --- | --- | --- |
| Vinyl-PE | X | X | X | X | X | X |
| Vinyl-aPP | X | X | X | X | X | X |
| Vinyl-iPP | X | X | X | X | X | X |
| Vinyl-EP | X | X | X | X | X | X |
| Vinyl-PS | X | X | X | X | X | X |
| Vinyl-pe | X | X | X | X | X | X | where Vinyl-PE is an ethylene macromonomer having a Tm of 60° C. or more and 0 to 10 wt % comonomer; Vinyl-aPP is a propylene macromonomer with an amorphous content of at least 10% and having from 0 to 10 wt % comonomer; Vinyl iPP is a propylene macromonomer with an isotactic pentad content of at least 50% and having from 0 to 10 wt % comonomer; Vinyl-EP is an ethylene-propylene macromonomer having 10 to 50 wt % propylene and 90 to 50 wt % ethylene; Vinyl-PS is a styrene macromonomer, having from 0 to 50 wt % comonomer; Vinyl-pe is a propylene-ethylene macromonomer having 10 to 50 wt % ethylene and 90 to 50 wt % propylene, provided that where the macromonomers have the same name in the table, they differ in another parameter.

11. The polymacromonomer of claim 10 wherein the Vinyl-aPP has an amorphous content of at least 50%.

12. The polymacromonomer of claim 10 wherein the Vinyl-aPP has an amorphous content of at least 95%.

13. The polymacromonomer of claim 1 wherein the macromonomer comprises a propylene polymer having a g'$_{vis}$ of 0.95 or less.

14. The polymacromonomer of claim 1 wherein the macromonomer comprises a copolymer of 65 to 80 wt % ethylene and 20 to 35 wt % propylene (based upon the weight of the copolymer) and has a Hm of 15 J/g or less.

15. The polymacromonomer of claim 1 wherein polymacromonomer comprises at least 50 wt % propylene, alternately 100 wt % propylene with the balance being made up of one or more of ethylene and or $C_4$ to $C_{12}$ olefin monomers.

16. The polymacromonomer of claim 1 wherein the polymacromonomer comprises at least 80 wt % ethylene with the balance being made up of one or more $C_3$ to $C_{12}$ olefin monomers.

17. The polymacromonomer of claim 1 wherein the degree of polymerization of the polymacromonomer is 3 or more.

18. The polymacromonomer of claim 1 wherein the degree of polymerization of the polymacromonomer is 5 or more.

19. The polymacromonomer of claim 1 wherein the degree of polymerization of the polymacromonomer is 6 or more.

20. The polymacromonomer of claim 1 wherein the macromonomer has an Mw of from 400 to 50,000 g/mol.

21. The polymacromonomer of claim 1 wherein the macromonomer has an Mw of from 450 to 20,000 g/mol.

22. The polymacromonomer of claim 1 wherein the macromonomer has an Mw of from 450 to 15,000 g/mol.

23. The polymacromonomer of claim 1 wherein the macromonomer has an Mw/Mn of 1.5 to 7.

24. The polymacromonomer of claim 1 wherein the macromonomer has an Mn of from 300 to 15,000 g/mol.

25. The polymacromonomer of claim 1 wherein the macromonomer has an Mn of from 300 to 12,000 g/mol.

26. The polymacromonomer of claim 1 wherein the macromonomer has an Mn of from 350 to 10,000 g/mol.

27. The polymacromonomer of claim 1 wherein the polymacromonomer has an Mn of 40,000 to 1,000,000 g/mol.

28. The polymacromonomer of claim 1 wherein the macromonomer has an Mn of from 300 to 12,000 g/mol and the polymacromonomer has an Mn of from 30,000 to 200,000 g/mol.

29. The polymacromonomer of claim 1 wherein the macromonomer has a Hm of 15 J/g or less.

30. The polymacromonomer of claim 1 wherein the macromonomer has a Hm of 15 J/g or less and the polymacromonomer has an Mw of 40,000 to 700,000 g/mol.

31. The polymacromonomer of claim 1 wherein the degree of polymerization of the polymacromonomer is 3 or more and the macromonomer has an Mw of 450 to 50,000 g/mol.

32. The polymacromonomer of claim 1 wherein the macromonomer consists essentially of propylene.

33. The polymacromonomer of claim 1 wherein the macromonomer consists essentially of ethylene.

34. The polymacromonomer of claim 1 wherein the C2 to C18 comonomer is selected from the group consisting of ethylene, propylene, butene, hexene, 4-methyl pentene-1, and 3-methyl pentene-1 and norbornene.

35. The polymacromonomer of claim 1 wherein the macromonomer comprises less than 1000 ppm aluminum.

36. A polymacromonomer comprising at least one macromonomer and from 0 to 20 wt % of a $C_2$ to $C_{18}$ comonomer, wherein the polymacromonomer has:
  a) a g value of less than 0.6,
  b) an Mw of greater than 30,000 g/mol,
  c) an Mn of greater than 20,000 g/mol,
  d) a branching index $(g')_{vis}$ of less than 0.5,
  e) less than 25% vinyl terminations (as measured by $^1$H NMR) relative to total unsaturations,
  f) at least 70 wt % macromonomer, based upon the weight of the polymacromonomer, and
  g) from 0 to 20 wt % aromatic containing monomer, based upon the weight of the polymacromonomer; and the macromonomer comprises one or more of:
  i) propylene co-oligomer having an Mn of 300 to 30,000 g/mol comprising 10 to 90 mol % propylene and 10 to 90 mol % of ethylene, wherein the oligomer has at least X % allyl chain ends (relative to total unsaturations), where: 1) X=(−0.94 (mol % ethylene incorporated)+100), when 10 to 60 mol % ethylene is present in the co-oligomer, and 2) X=45, when greater than 60 and less than 70 mol % ethylene is present in the co-oligomer, and 3) X=(1.83*(mol % ethylene incorporated)−83), when 70 to 90 mol % ethylene is present in the co-oligomer; and/or
  ii) propylene oligomer, comprising more than 90 mol % propylene and less than 10 mol % ethylene, wherein the oligomer has: at least 93% allyl chain ends, an Mn of about 500 to about 20,000 g/mol, an isobutyl chain end to allylic vinyl group ratio of 0.8:1 to 1.35:1.0, and less than 1400 ppm aluminum; and/or
  iii) propylene oligomer, comprising at least 50 mol % propylene and from 10 to 50 mol % ethylene, wherein the oligomer has: at least 90% allyl chain ends, Mn of about 150 to about 10,000 g/mol, and an isobutyl chain end to allylic vinyl group ratio of 0.8:1 to 1.3:1.0, wherein monomers having four or more carbon atoms are present at from 0 to 3 mol %; and/or
  iv) propylene oligomer, comprising at least 50 mol % propylene, from 0.1 to 45 mol % ethylene, and from 0.1 to 5 mol % C4 to C12 olefin, wherein the oligomer has: at least 87% allyl chain ends (alternately at least 90%), an Mn of about 150 to about 10,000 g/mol, and an isobutyl chain end to allylic vinyl group ratio of 0.8:1 to 1.35:1.0; and/or
  v) propylene oligomer, comprising at least 50 mol % propylene, from 0.1 to 45 wt % ethylene, and from 0.1 to 5 mol % diene, wherein the oligomer has: at least 90% allyl chain ends, an Mn of about 150 to about 10,000 g/mol, and an isobutyl chain end to allylic vinyl group ratio of 0.7:1 to 1.35:1.0; and/or
  vi) a homooligomer, comprising propylene, wherein the oligomer has: at least 93% allyl chain ends, an Mn of about 500 to about 20,000 g/mol, an isobutyl chain end to allylic vinyl group ratio of 0.8:1 to 1.2:1.0, and less than 1400 ppm aluminum.

37. The polymacromonomer of claim 36 wherein the macromonomer is a propylene co-oligomer having an Mn of 300 to 30,000 g/mol comprising 10 to 90 mol % propylene and 10 to 90 mol % of ethylene, wherein the oligomer has at least X % allyl chain ends (relative to total unsaturations), where: 1) X=(−0.94 (mol % ethylene incorporated)+100), when 10 to 60 mol % ethylene is present in the co-oligomer, and 2) X=45, when greater than 60 and less than 70 mol % ethylene is present in the co-oligomer, and 3) X=(1.83*(mol % ethylene incorporated)−83), when 70 to 90 mol % ethylene is present in the co-oligomer.

38. The polymacromonomer of claim 36 wherein the macromonomers are liquid at 25° C.

39. The polymacromonomer of claim 36 wherein the macromonomer is a propylene co-oligomer having an Mn of 300 to 30,000 g/mol comprising 10 to 90 mol % propylene and 10 to 90 mol % of ethylene, wherein the oligomer has at least X% allyl chain ends (relative to total unsaturations), where: 1) X=(−0.94 (mol % ethylene incorporated)+100), when 10 to 60 mol % ethylene is present in the co-oligomer, and 2) X=45, when greater than 60 and less than 70 mol % ethylene is present in the co-oligomer, and 3) X=(1.83*(mol % ethylene incorporated)−83), when 70 to 90 mol % ethylene is present in the co-oligomer; and has an isobutyl chain end to allylic vinyl group ratio of 0.8:1 to 1.35:1.0.

40. The polymacromonomer of claim 36 wherein the macromonomer has an isobutyl chain end to allylic vinyl group ratio of 0.9:1 to 1.20:1.0.

41. The polymacromonomer of claim 36 wherein the macromonomer has an isobutyl chain end to allylic vinyl group ratio of 0.9:1 to 1.1:1.0.

42. A polymacromonomer comprising at least one macromonomer and from 0 to 20 wt % of a $C_2$ to $C_{18}$ comonomer, wherein the macromonomer, prior to polymerization, has:
  1) from 20 to 600 carbon atoms,
  2) an Mn of 280 g/mol or more,
  3) an Mw of 400 g/mol or more,
  4) an Mz of 600 g/mol or more,
  5) an Mw/Mn of 1.5 or more,
  6) vinyl termination of at least 70% (as determined by $^1$H NMR) relative to total unsaturations,
  7) a melting point (Tm) of 60° C. or more or an Hm of 20 J/g or less, and
  8) less than 10 wt % aromatic containing monomer, based upon the weight of the macromonomer; and wherein the polymacromonomer has:
a) a g value of less than 0.6,
b) an Mw of greater than 30,000 g/mol,
c) a branching index (g')$_{vis}$ of less than 0.5,
d) a melting point of 50° C. or more or an Hm of 20 J/g or less,
e) less than 25% vinyl terminations (as measured by $^1$H NMR) relative to total unsaturations,
f) at least 70 wt % macromonomer, based upon the weight of the polymacromonomer, and
g) from 0 to 20 wt % aromatic containing monomer, based upon the weight of the polymacromonomer.

43. A process to produce polymacromonomers comprising contacting macromonomer and up to 40 wt % of $C_2$ to $C_{18}$ comonomer with a catalyst system capable of polymerizing vinyl terminated macromonomer, wherein the macromonomer, prior to polymerization, has:
1) from 20 to 600 carbon atoms,
2) an Mn of 280 g/mol or more,
3) an Mw of 400 g/mol or more,
4) an Mz of 600 g/mol or more,
5) an Mw/Mn of 1.5 or more,
6) at least 70% vinyl termination (as measured by $^1$H NMR) relative to total unsaturations,
7) a melting point Tm of 60° C. or more or an Hm of 20 J/g or less, and
8) less than 20 wt % aromatic containing monomer;
under polymerization conditions of a temperature of 60 to 130° C. and a reaction time of 1 to 90 minutes, wherein the molar ratio of all comonomer present in the reactor to all macromonomer present in the reactor is 3:1 or less and where conversion of macromonomer to polymacromonomer is 70 wt % or more; and
obtaining a polymacromonomer having:
a) a g value of less than 0.6,
b) an Mw of greater than 30,000 g/mol,
c) an Mn of greater than 20,000 g/mol,
d) a branching index (g')$_{vis}$ of less than 0.5, and
e) a melting point of 50° C. or more or an Hm of 20 J/g or less,
f) less that 25% vinyl termination (as measured by $^1$H NMR) relative to total unsaturations,
g) at least 70 wt % macromonomer, based upon the weight of the polymacromonomer, and
h) from 0 to 20 wt % aromatic containing monomer, based upon the weight of the polymacromonomer.

44. The process of claim 43 wherein the degree of polymerization of the polymacromonomer is 6 or more.

45. The process of claim 43 wherein the degree of polymerization of the polymacromonomer is 100 or more.

46. The process of claim 43 wherein the catalyst system capable of polymerizing vinyl terminated macromonomer comprises the compound represented by the formula:

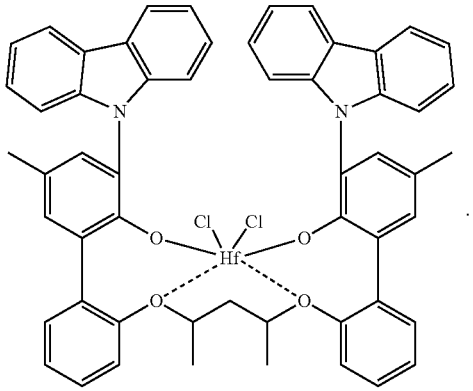

47. The process of claim 43 wherein the catalyst system capable of polymerizing vinyl terminated macromonomer comprises one or more of:
dimethylsilyl(cyclopentadienyl)(cyclododecylamido)titanium dimethyl, dibenzylmethyl(cyclopentadienyl)(fluorenyl)hafnium dimethyl, diphenylmethyl(cyclopentadienyl)(fluorenyl)hafnium dimethyl, dimethylgermanium bisindenyl hafnium dimethyl, rac-dimethylsilyl (2-methyl-4-phenylindenyl)zirconium dichloride, rac-dimethylsilyl (2-methyl-4-phenylindenyl)zirconium dimethyl, rac-dimethylsilyl (2-methyl-4-phenylindenyl)hafnium dichloride, rac-dimethylsilyl (2-methyl-4-phenylindenyl)hafnium dimethyl, rac-dimethylsilanediylbis(2-methylindenyl)metal dichloride; rac-dimethylsilanediylbis(indenyl)metal dichloride; rac-dimethylsilanediylbis(indenyl)metal dimethyl; rac-dimethylsilanediylbis(tetrahydroindenyl)metal dichloride; rac-dimethylsilanediylbis(tetrahydroindenyl)metal dimethyl; rac-dimethylsilanediylbis(indenyl) metal diethyl; and rac-dibenzylsilanediylbis(indenyl) metal dimethyl; wherein the metal is chosen from Zr, Hf, or Ti.

48. The process of claim 43 wherein the catalyst system capable of polymerizing vinyl terminated macromonomer comprises one or more of: N,N-dimethylanilinium tetrakis (pentafluorophenyl) borate, triphenylcarbenium perfluorotetraphenylborate, dimethylanilinium perfluorotetranaphthylborate, 4-tert-butylanilinium bis(pentafluorophenyl)bis (perfluoro-2-naphthyl)borate, 4-tert-butylanilinium (pentafluorophenyl)tris(perfluoro-2-naphthyl)borate, dimethylanilinium tetrakis(perfluoro-2-naphthyl)borate, dimethylanilinium tetrakis(3,5(pentafluorophenyl)perfluorophenylborate); and tris-perfluorophenyl boron.

49. The process of claim 43 further comprising preparing the macromonomer by contacting monomer with a catalyst system comprising activator and catalyst represented by the formula:

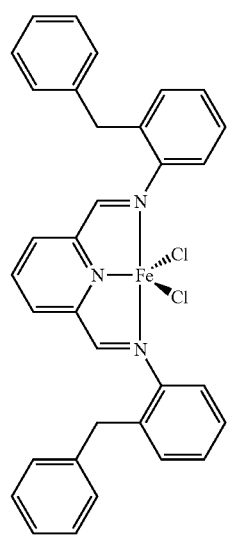

or rac-Me$_2$Si-bis(2-R-indenyl)MX$_2$ or rac-Me$_2$Si-bis(2-R,4-Ph-indenyl)MX$_2$,
where R is an alkyl group, Ph is phenyl or substituted phenyl, M is Hf, Zr or Ti, and X is a halogen or alkyl group.

50. The process of claim 43 wherein the degree of polymerization of the polymacromonomer is 3 or more.

51. The process of claim 43 wherein the degree of polymerization of the polymacromonomer is 5 or more.

52. The process of claim 43 wherein the macromonomer is polymerized with alpha- omega diene.

* * * * *